(12) United States Patent
Ishihara

(10) Patent No.: US 7,385,745 B2
(45) Date of Patent: Jun. 10, 2008

(54) TWO-DIMENSIONAL SCANNING APPARATUS AND SCANNING TYPE IMAGE DISPLAYING APPARATUS USING THE SAME

(75) Inventor: Keiichiro Ishihara, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 147 days.

(21) Appl. No.: 11/061,929

(22) Filed: Feb. 18, 2005

(65) Prior Publication Data

US 2005/0190419 A1 Sep. 1, 2005

(30) Foreign Application Priority Data

Feb. 19, 2004 (JP) .............................. 2004-042278

(51) Int. Cl.
*G02B 26/08* (2006.01)
(52) U.S. Cl. ...................... 359/202; 359/207; 359/205; 359/208
(58) Field of Classification Search ................. 359/202
See application file for complete search history.

(56) References Cited

U.S. PATENT DOCUMENTS

| | | |
|---|---|---|
| 4,003,080 A | 1/1977 | Maiman et al. |
| 5,025,268 A | 6/1991 | Arimoto et al. |
| 5,359,434 A | 10/1994 | Nakao et al. |
| 5,625,613 A | 4/1997 | Kato et al. |
| 6,211,988 B1 * | 4/2001 | Engelhardt et al. ......... 359/201 |
| 6,282,008 B1 | 8/2001 | Togino |
| 6,657,763 B2 * | 12/2003 | Kobayashi ................. 359/212 |
| 2002/0125325 A1 * | 9/2002 | Plesko .................... 235/462.49 |
| 2003/0030897 A1 | 2/2003 | Suzuki |
| 2004/0196571 A1 * | 10/2004 | Shinohara ................. 359/680 |

FOREIGN PATENT DOCUMENTS

| | | |
|---|---|---|
| DE | 19860017 | 6/2000 |
| EP | 1291681 | 3/2003 |
| EP | 1291681 A1 * | 3/2003 |
| EP | 1450558 | 8/2004 |
| JP | 5-127091 A | 5/1993 |
| JP | 5-208523 A | 8/1993 |
| JP | 5-289011 A | 11/1993 |
| JP | 6-246839 A | 9/1994 |

(Continued)

OTHER PUBLICATIONS

"High-Resolution, Wide-Aspect, and Wide-Viewing Displays on DELL Portable Computers", May 2003, Dell's White Paper, pp. 1-5.*

(Continued)

*Primary Examiner*—Jessica T Stultz
(74) *Attorney, Agent, or Firm*—Morgan & Finnegan, L.L.P.

(57) ABSTRACT

The invention is to provide an optical scanning apparatus which scans light from a light source onto a surface to be scanned, comprising a light scanning optical system having at least one reflecting surface of non-rotation symmetrical shape, and guiding a deflected beam two-dimensionally deflected by a deflection optical system onto the surface to be scanned by using the one reflecting surface of non-rotation symmetrical shape, wherein a principal ray of a beam incident onto the center of an angle of view of the surface to be scanned is made inclined incident onto the surface to be scanned in the first scanning direction.

12 Claims, 30 Drawing Sheets

FOREIGN PATENT DOCUMENTS

| | | |
|---|---|---|
| JP | 6-294924 A | 10/1994 |
| JP | 7-234382 A | 9/1995 |
| JP | 9-80335 A | 3/1997 |
| JP | 11-84291 A | 3/1999 |
| JP | 11-101948 A | 4/1999 |
| JP | 11-119106 A | 4/1999 |
| JP | 11-149128 A | 6/1999 |
| JP | 11-267873 A | 10/1999 |
| JP | 2000-36085 A | 2/2000 |
| JP | 2001-281583 A | 10/2001 |
| JP | 2003-57554 A | 2/2003 |
| JP | 2003-149577 A | 5/2003 |
| JP | 2004252012 A * | 9/2004 |
| JP | 2004341411 A * | 12/2004 |

OTHER PUBLICATIONS

European Search Report of EP Application No. EP05250975—Date of Completion of Search—Jun. 28, 2006.

* cited by examiner

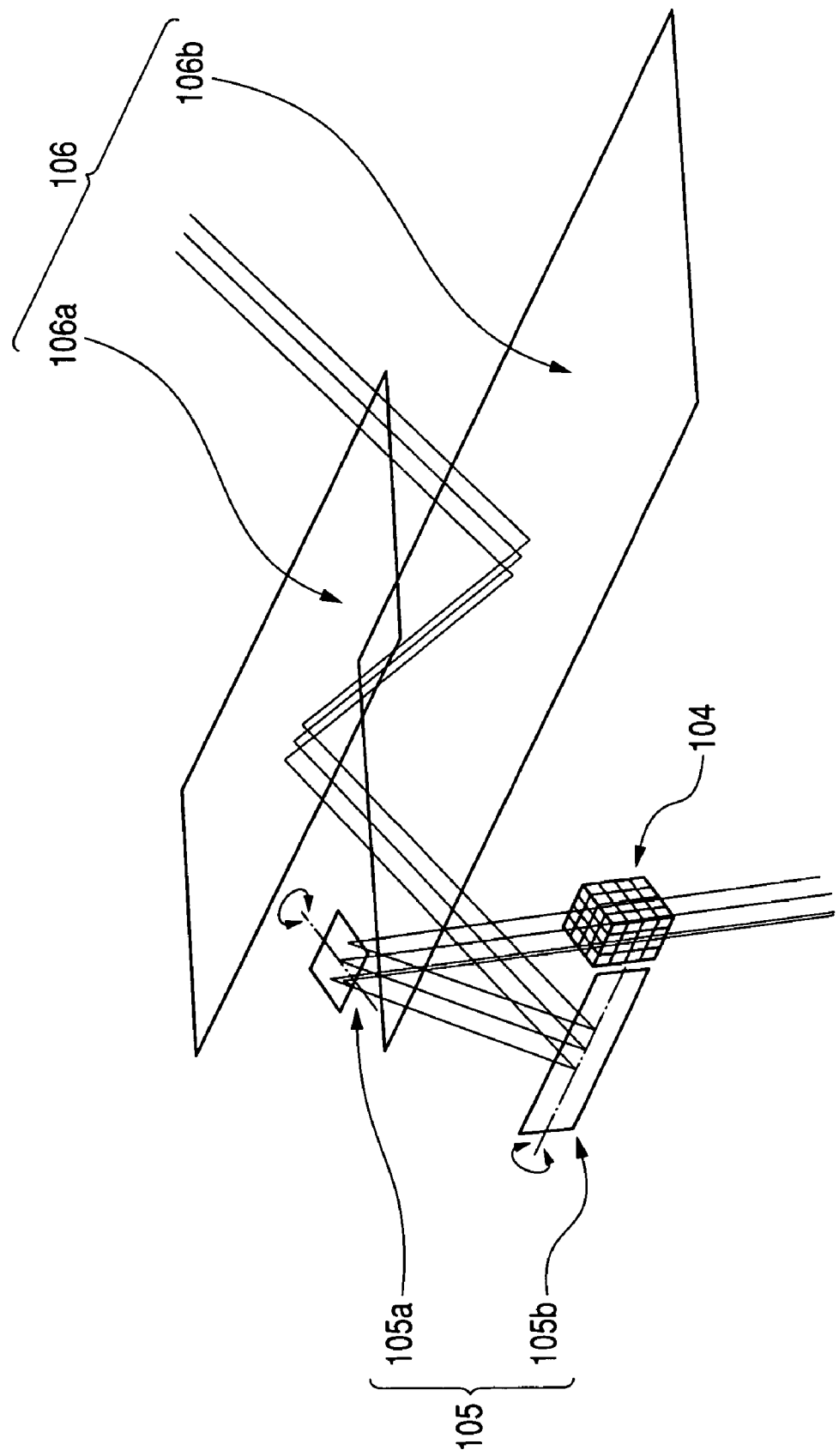

TWO-DIMENSIONAL SCANNING APPARATUS AND SCANNING TYPE IMAGE DISPLAYING APPARATUS USING THE SAME

BACKGROUND OF THE INVENTION

1. Field of the Invention

This invention relates to a two-dimensional scanning apparatus and a scanning type image displaying apparatus using the same, and particularly is adapted to two-dimensionally scan a beam (deflected beam) deflected by deflecting means to thereby project and display a two-dimensional image on a surface to be scanned (a screen surface).

2. Related Background Art

There have been proposed various two-dimensional scanning apparatuses which two-dimensionally deflect a beam emitted from light source means by deflecting means, two-dimensionally optically scan on a surface to be scanned by a spot, and form a two-dimensional image by the afterimage effect thereof (see, for example, Japanese Patent Application Laid-open No. H11-084291 and Japanese Patent Application Laid-open No. 2001-281583).

Now, it is known that by a beam being two-dimensionally deflected and scanned, so-called distortion occurs to a two-dimensional image on a surface to be scanned. The distortion includes trapezoid distortion, distortion of a uniform speed scanning property, distortion of a rectilinear scanning property and further, TV distortion which refers to the curving of the frame of an image depicted on the surface to be scanned.

In Japanese Patent Application Laid-open No. H11-084291 and Japanese Patent Application Laid-open No. 2001-281583, there is disclosed a two-dimensional scanning apparatus using an optical element including a refracting surface and a reflecting surface, and adapted to turn back an optical path in the interior of the optical element (prism member), and in which in order to correct eccentric aberration, the refracting surface or the reflecting surface is constituted by a non-rotation symmetric surface having no rotation symmetry axis either inside or outside the surface.

This is a two-dimensional scanning apparatus constituted by the use of an optical element, and yet well corrects uniform velocity property of scanning light on the surface to be scanned over a wide scanning angle. It can also achieve telecentricity necessary for highly accurate image depiction.

However, the two-dimensional scanning apparatus disclosed in Japanese Patent Application Laid-open No. H11-084291 and Japanese Patent Application Laid-open No. 2001-281583 does not at all correct TV distortion. Further, when an image has been obliquely projected onto a surface to be scanned such as a screen, trapezoid distortion has occurred to thereby deteriorate the dignity of the image, the two-dimensional scanning apparatus disclosed in Japanese Patent Application Laid-Open No. H11-084291 and Japanese Patent Application Laid-open No. 2001-281583 neither correct trapezoid distortion.

SUMMARY OF THE INVENTION

It is an object of the present invention to provide a two-dimensional scanning apparatus which can well correct TV distortion caused by a beam being two-dimensionally deflected by deflecting means and trapezoid distortion caused by an image being obliquely projected onto a surface to be scanned. It is a further object of the present invention to provide a two-dimensional scanning apparatus in which a scanning optical system can be downsized and chromatic aberration does not occur, and a scanning type image displaying apparatus using the same.

In order to solve the above-noted problem, a two-dimensional scanning apparatus according to the present invention is provided with:

deflecting means for deflecting a beam emitted from light source means in a first scanning direction and a second scanning direction orthogonal to the first scanning direction; and a scanning optical system for directing the deflected beam deflected by the deflecting means onto a surface to be scanned;

wherein the principal ray of the beam incident on the center of the angle of view of the surface to be scanned is incident obliquely with respect to the surface to be scanned, in at least the first scanning direction of the first and second scanning directions, and the scanning optical system has at least two reflecting surfaces of a non-rotation symmetrical shape, and the at least two reflecting surfaces are disposed so as to fold the optical path of the deflected beam in the first scanning direction.

In the above-described two-dimensional scanning apparatus, it is preferable that when the optical path from after the principal ray of the deflected beam is reflected by one of the at least two reflecting surfaces until it arrives at the other reflecting surface is defined as a reference axis, the shapes of the at least two reflecting surfaces be asymmetric with respect to the reference axis in the first scanning direction.

Or it is preferable that when the optical path from after the principal ray of the deflected beam is reflected by one of the at least two reflecting surfaces until it arrives at the other reflecting surface is defined as a reference axis, in a first scanning section containing the reference axis and formed by the reference axis and the first scanning direction, the at least two reflecting surfaces be curvature monotonously changing anamorphic surfaces of which the curvature in the second scanning direction in the first scanning section gradually changes from great to small or from small to great as it moves along the first scanning direction.

Also, in this case, it is more preferable that one of the at least two reflecting surfaces be convex in the shape thereof in the second scanning direction in the first scanning section, and the other reflecting surface be concave in the shape thereof in the second scanning direction in the first scanning section.

Or it is preferable that one of the at least two reflecting surfaces be such that a side thereof on which the power thereof in the second scanning direction in the first scanning section is strong as compared with the power of the other reflecting surface and a side thereof on which the power of the other reflecting surface in the second scanning direction in the first scanning section is weak as compared with the power of the other reflecting surface are arranged properly.

Also, in the above-described two-dimensional scanning apparatus, it is preferable that the beam emitted from the light source means be made incident obliquely from the first scanning direction onto the deflecting surface of the deflecting means.

Further, in this case, it is preferable that when in the first scanning direction, it is viewed in an optical path from the deflecting means to the scanning optical system, the beam emitted from the light source means be made obliquely incident from a side on which a deflected beam small in the incidence angle onto the surface to be scanned passes onto the deflecting surface of the deflecting means.

Also, in the above-described two-dimensional scanning apparatus, it is preferable that the scanning optical system have negative power as a whole, and a convergent beam having a natural converging point between the deflecting means and the surface to be scanned be condensed near the surface to be scanned by the scanning optical system.

Also, in the above-described two-dimensional scanning apparatus, it is preferable that the pupil of the scanning optical system be disposed near the deflecting means to thereby form the virtual image of the pupil.

Also, in the above-described two-dimensional scanning apparatus, it is preferable that the scanning optical system have two reflecting surfaces of a non-rotation symmetrical shape.

Also, in the above-described two-dimensional scanning apparatus, it is preferable that the scanning optical system have a prism including at least two reflecting surfaces of a non-rotation symmetrical shape.

Also, in the above-described two-dimensional scanning apparatus, it is preferable that when an angle of view in the first scanning direction is defined as $\theta d1$, and an angle of view in the second scanning direction is defined as $\theta d2$, and a width of the beam incident on the surface to be scanned in the first scanning direction is defined as Wi1, and the width thereof in the second scanning direction is defined as Wi2, a condition that $$0.1 \times \frac{Wi1}{Wi2} < \frac{\theta d1}{\theta d2} < 0.9 \times \frac{Wi1}{Wi2}$$

be satisfied.

Also, in the above-described two-dimensional scanning apparatus, it is preferable that when the width of the scanning optical system in the second scanning direction is defined as Dx, and the width thereof in the first scanning direction is defined as Dy, and the width thereof in the Z-axis direction perpendicular to a horizontal scanning direction and a vertical scanning direction is defined as Dz, conditions that Dx≦40 (mm)

Dy≦30 (mm)

Dz≦35 (mm)

be satisfied.

Also, in the above-described two-dimensional scanning apparatus, it is preferable that the light source means emit a plurality of beams of different wavelengths.

Also, in the above-described two-dimensional scanning apparatus, it is preferable that the light source means have a light emitting element capable of effecting light modulation.

Further, in order to solve the above-noted problem, a scanning type image displaying apparatus according to the present invention is provided with:

light source means; and the above-described two-dimensional scanning apparatus for forming an image on the surface to be scanned by the use of light from the light source means.

In order to solve the above-noted problems, an optical scanning apparatus which is a further aspect of the present invention is provided with:

deflecting means for deflecting a beam from a light source; and a scanning optical system for imaging the deflected beam from the deflecting means as a spot on a surface to be scanned;

wherein the scanning optical system has a scanning mirror and folds in a first scanning direction, and positions at which beams arriving at the same position on the surface to be scanned in a second scanning direction orthogonal to the first scanning direction are reflected by the scanning mirror are disposed on a straight line when viewed in the second scanning direction, and optical paths after emerging from the scanning optical system are made incident on the surface to be scanned in superposed relationship with one another.

Also, a scanning type image displaying apparatus which is a further aspect of the present invention is provided with:

a light source; and the above-described optical scanning apparatus for displaying an image on the surface to be scanned with light from the light source.

Also, an optical scanning apparatus for scanning a surface to be scanned with light from a light source which is a further aspect of the present invention is provided with:

a deflecting optical system for deflecting a beam from light source means in a first scanning direction and a second scanning direction orthogonal to the first scanning direction; and a scanning optical system including at least one reflecting surface of a non-rotation symmetrical shape and for directing the deflected beam deflected by the deflecting optical system onto a surface to be scanned by the use of the aforementioned at least one reflecting surface of a non-rotation symmetrical shape;

wherein the principal ray of the beam incident on the center of the angle of view of the surface to be scanned is incident while being inclined with respect to the surface to be scanned in at least the first scanning direction of the first and second scanning directions.

In the above-described optical scanning apparatus, it is preferable that the aforementioned at least one reflecting surface of a non-rotation symmetrical shape be formed so that along the direction of a line of intersection between a plane including an optical path of the optical paths of the principal ray which is incident on the reflecting surface and an optical path emergent from the reflecting surface and the reflecting surface, optical power in a plane perpendicular to the line of intersection may gradually become great.

Or it is preferable that the aforementioned at least one reflecting surface of a non-rotation symmetrical surface be such that optical power on one end side along the direction of a line of intersection between a plane including an optical path of the optical paths of the principal ray which is incident on the reflecting surface and an optical path emergent from the reflecting surface and the reflecting surface and in a plane perpendicular to the line of intersection is greater than optical power on the other end side and in the plane perpendicular to the line of intersection.

Or it is preferable that the aforementioned at least one reflecting surface of a non-rotation symmetrical shape include two reflecting surfaces of a non-rotation symmetrical shape.

Or it is preferable that the two reflecting surfaces of a non-rotation symmetrical shape be disposed in opposed relationship with each other.

Or it is preferable that the two reflecting surfaces of a non-rotation symmetrical shape be disposed so as to fold the principal ray.

Also, a scanning type image displaying apparatus which is a further aspect of the present invention is provided with:

a light source; and the above-described optical scanning apparatus for displaying an image on the surface to be scanned with light from the light source.

Also, an optical scanning apparatus which is a further aspect of the present invention is provided with:

an optical system for two-dimensionally scanning a surface to be scanned with light from a light source;

wherein when the principal ray of a beam incident on the substantial center of an angle of view in the surface to be scanned is defined as a reference axis ray, the reference axis ray is obliquely incident on the surface to be scanned, and wherein in a case where the direction of a line of intersection between a plane including the reference axis ray incident on the surface to be scanned and a normal to the surface to be scanned at the incidence position of the reference axis ray and the surface to be scanned is defined as a first direction, a direction perpendicular to the first direction in the surface to be scanned is defined as a second direction, beams incident on two different points differing in the coordinates of the first direction from each other and substantially coincident with each other in the coordinates of the second direction, in the surface to be scanned, are defined as a first beam and a second beam, and the principal ray of the first beam is defined as a first principal ray, and the principal ray of the second beam is defined as a second principal ray, the first principal ray emergent from the optical system and the second principal ray emergent from the optical system substantially overlap each other when viewed from the first direction.

In the above-described optical scanning apparatus, it is preferable that the optical system include:

a deflecting optical system for deflecting the light from the light source; and a scanning optical system including at least one reflecting surface and for directing the light deflected by the deflecting optical system to the surface to be scanned.

Also, a scanning type image displaying apparatus which is a further aspect of the present invention is provided with:

a light source; and the above-described optical scanning apparatus for displaying an image on the surface to be scanned with light from the light source.

BRIEF DESCRIPTION OF THE DRAWINGS

FIG. 1B is an enlarged perspective view of a part of apparatus shown in FIG. 1A.

DESCRIPTION OF THE PREFERRED EMBODIMENTS

Some embodiments of the present invention will hereinafter be described with reference to the drawings.

First Embodiment

Figure 1A:
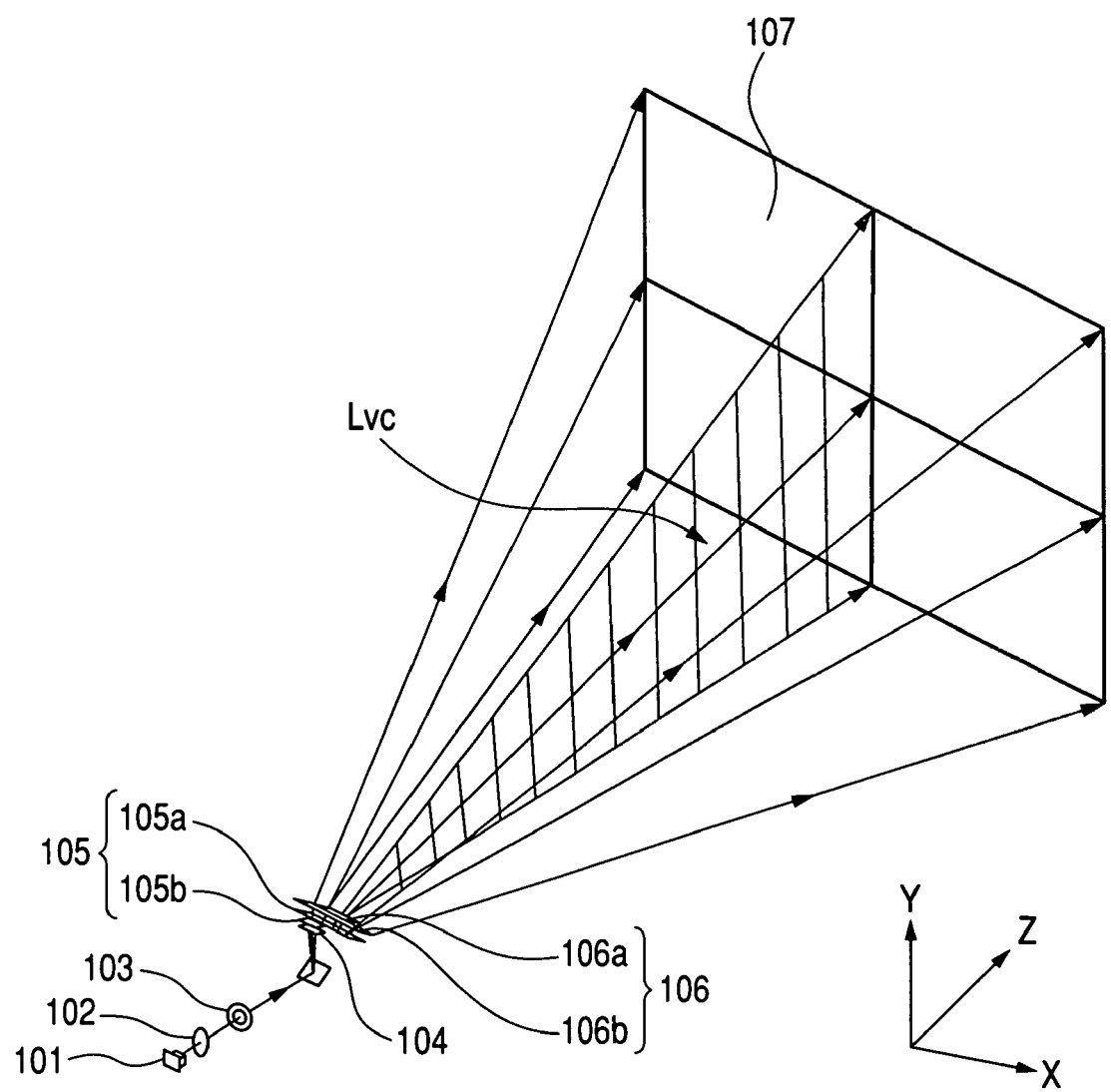
FIG. 1A is a perspective view of the essential portions of a two-dimensional scanning apparatus according to First Embodiment of the present invention.
Figure 2A:
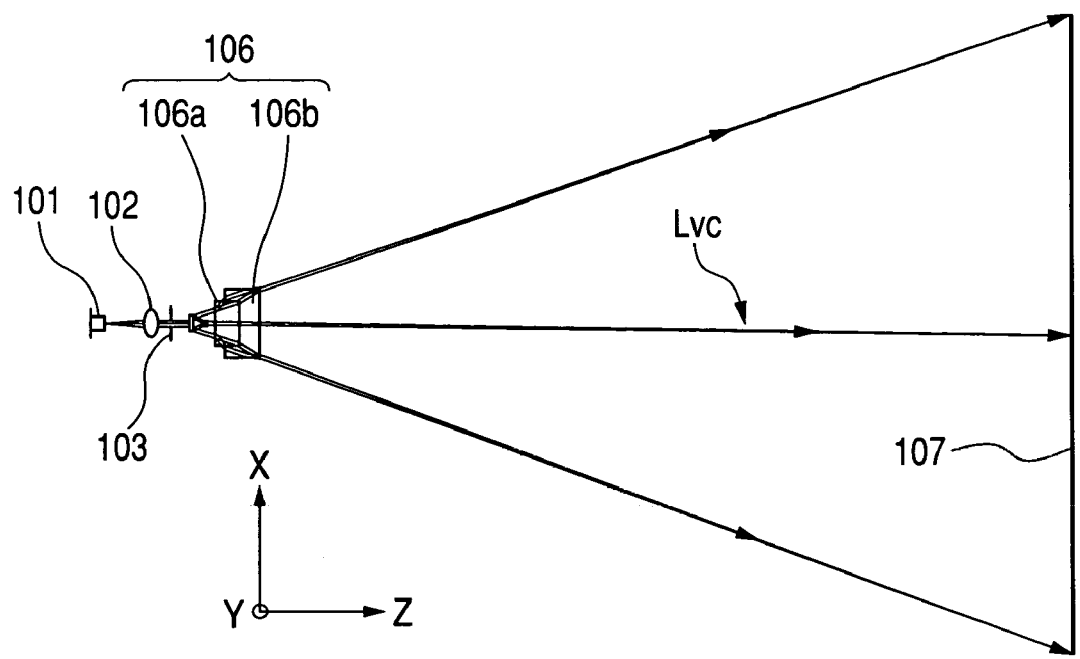
FIGS. 2A and 2B are cross-sectional views of the essential portions of the two-dimensional scanning apparatus according to First Embodiment of the present invention.
Figure 2B:
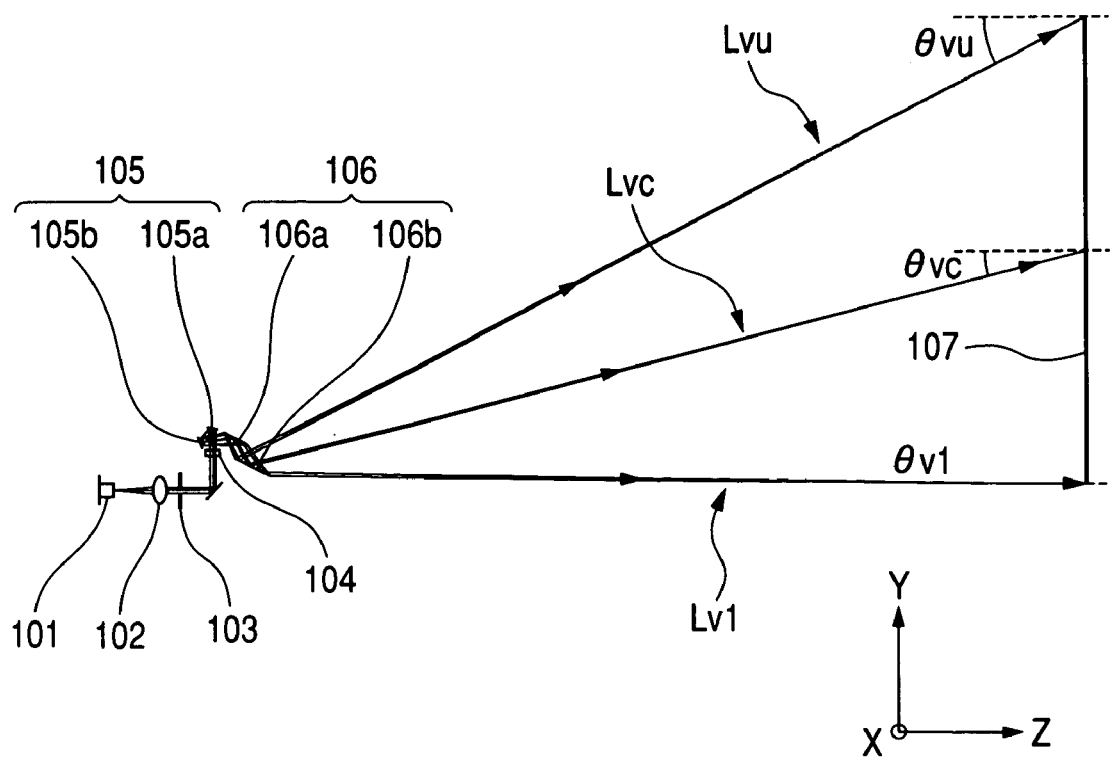

FIG. 1 is a perspective view of the essential portions of a two-dimensional scanning apparatus according to First Embodiment of the present invention, FIG. 2A is a cross-sectional view (horizontal scanning sectional view, or XZ cross section) of the essential portions of First Embodiment of the present invention in a horizontal scanning direction, and FIG. 2B is a cross-sectional view (vertical scanning sectional view, or YZ cross section) of the essential portions of First Embodiment of the present invention in a vertical scanning direction.

In these figures, the reference numeral 101 designates light source means having a semiconductor laser capable of effecting light modulation (which need not be a semiconductor laser if it is a light emitting element), for example, a red semiconductor laser (or a green semiconductor laser, or a blue semiconductor laser or a semiconductor laser emitting light of other color within a visible light area). However, a red semiconductor laser alone can display (project) only a red image and therefore, this light source means 101 may be designed to have a red semiconductor laser, a blue semiconductor laser, a green semiconductor laser, etc., and a color combining system (a color combining prism or the like) for color-combining lights emitted from these lasers, and be capable of displaying a color image. Also, the light source means may have a semiconductor laser emitting white light (modulation is effected by the semiconductor laser, and it is desirable that the two-dimensional scanning apparatus in that case be designed to have a filter (such as a color wheel) time-divisionally transmitting lights of different colors (red, green and blue) therethrough. Also, it may be designed to have a color resolving optical system for color-resolving white light into red, green and blue lights, light modulating elements for modulating the respective color lights (light modulating elements corresponding to red, green and blue lights, respectively), and a color combining system for color-combining the lights from the light modulating elements. When it is designed to have a color combining system, it is desirable that the color combining system be disposed more adjacent to the semiconductor laser side than to a condensing lens which will be described later.

The reference numeral 102 denotes a condensing lens (collimator lens) which converts a divergent beam emitted from the light source means 101 into a parallel beam (or a convergent beam or a divergent beam). The reference numeral 103 designates an aperture stop which limits the beam passing therethrough and shapes a beam shape. The reference numeral 104 denotes a convergent light converting optical system which comprises a single condensing lens and converts the beam passed through the aperture stop 103 into a convergent beam.

The reference numeral 105 designates deflecting means (two-dimensional deflecting means) having a first deflector 105a having a reflecting surface capable of resonating (vibrating) in a one-dimensional direction (here, a rotational direction about a predetermined first axis), and a second deflector 105b having a reflecting surface rotatable in a rotational direction about a second axis substantially perpendicular to the aforementioned predetermined first axis. Here, the reflecting surface the first deflector 105a has substantially singly vibrates in the rotational direction about the first axis, and the reflecting surface the second deflector 105b has effects rotating motion (here, reciprocal motion in the rotational direction) at a frequency differing from that of the reflecting surface the aforedescribed first deflector 105a has, in the rotational direction about the second axis. Also, the reflecting surface the second deflector 105b has effects uniform velocity motion with respect to the rotational direction about the second axis. Also, the reflecting surface the second deflector 105b has may be designed to effect rotating motion so that the interval between lights (lights condensed in a dot shape) directed onto a projection surface (such as a screen) may be substantially equal intervals (in other words, the lights may move at a uniform velocity on the projection surface with respect to a direction perpendicular to the aforedescribed second axis).

In the present embodiment, the beam emitted from the light source means 101 is deflected in a horizontal scanning direction (a second scanning direction or the direction of the X-axis) by the rotation of the first deflector 105a, and the beam (deflected beam) from the first deflector 105a is deflected in a vertical scanning direction (a first scanning direction or the direction of the Y-axis) perpendicular to the horizontal scanning direction by the rotation of the second deflector 105b, whereby the beam emitted from the light source means 101 is two-dimensionally deflected.

The reference numeral 106 denotes a scanning optical system (two-dimensional scanning optical system which has two first and second scanning mirrors 106a and 106b comprising reflecting surfaces of a non-rotation symmetrical shape, and causes the deflected beam deflected in a two-dimensional direction by the deflecting means 105 to be imaged as a spot near a surface 107 to be scanned.

The reference numeral 107 designates a screen surface as the surface to be scanned. Here, this screen surface is substantially an imaging surface, i.e., a position at which the image of light modulated by a light modulating element is formed (the light modulating element and the screen surface are substantially conjugate with each other).

In the present embodiment, the divergent beam emitted from the light source means 101 is converted into a parallel beam by the condensing lens 102, and has its beam width limited by the aperture stop 103. The beam passed through the aperture stop 103 is converted into a convergent beam having a desired degree of convergence by the convergent beam converting optical system 104. The converted beam is deflected in the horizontal scanning direction by the first deflector 105a, and is further deflected in the vertical scanning direction by the second deflector 105b, whereby the beam emitted from the light source means 101 is deflected in a two-dimensional direction. The deflected beam deflected by the deflecting means 105 is directed onto the screen surface 107 through the scanning optical system 106, and optically scans on the screen surface 107. As described above, the deflected beam optionally scans in the horizontal scanning direction at a high speed by the first deflector 105a to thereby describe a scanning line, and optically scans in the vertical scanning direction at a low speed by the second deflector 105b and displays a two-dimensional image on the screen surface 107.

In the present embodiment, as the first deflector 105a, use is made of an MEMS device manufactured by micro electro-mechanical systems (MEMS) technique or the like.

In the present embodiment, as shown in FIG. 2B, the deflected beam deflected by the first deflector 105a and the second deflector 105b optically scans on the screen surface 107 through the scanning optical system 106. At this time, of the deflected beam deflected in the two-dimensional direction by the deflecting means 105, the principal ray of the deflected beam at the central angle of view which is the center of the horizontal scanning direction (the direction of the X-axis) and the vertical scanning direction (the direction of the Y-axis) (the center of an area and an angle range in which an image is projected, or the center of an area and an angle range in which the projection of an image is possible) is defined as the "reference ray Lvc".

The scanning line in the horizontal direction by the reference ray Lvc corresponds to the X-axis, and the scanning line in the vertical direction by the reference ray Lvc corresponds to the Y-axis. A plane containing the reference ray Lvc and the horizontal direction (the direction of the X-axis) is defined as a horizontal scanning section (a second scanning section, or XZ section), and a plane containing the reference ray Lvc and the vertical direction (the direction of the Y-axis) is defined as a vertical scanning section (a first scanning section, or YZ section).

Figure 3:
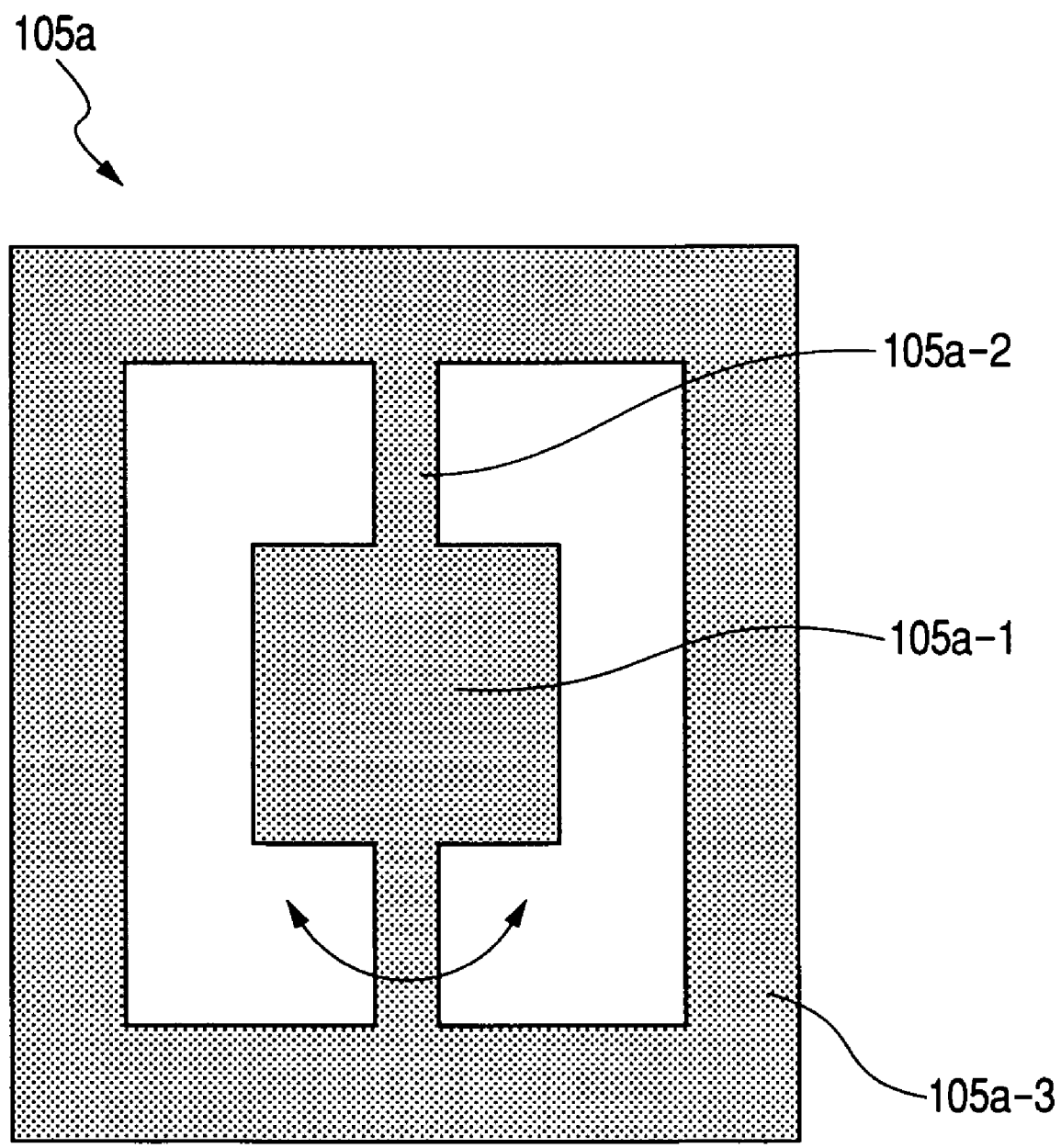
FIG. 3 is a schematic view of the essential portions of an MEMS device.

FIG. 3 shows a schematic view of the essential portions of the MEMS device.

In FIG. 3, the reference character 105a designates the MEMS device as a one-dimensional deflector. A reflecting surface 105a-1 is supported on a housing 105a-3 by a torsion bar 105a-2, and a magnet provided on the back of the reflecting surface 105a-1 reacts on a magnetic force generated from a coil, not shown, and vibrates in a one-dimensional direction (effects reciprocal movement, i.e., vibrates in a rotational direction about a predetermined axis. Ideally, it is desirable that the magnet effect simple harmonic oscillation substantially in the rotational direction about the predetermined axis in accordance with a predetermined natural frequency.) By this vibration, the direction of the MEMS device 105a is adjusted so that the deflected beam may be deflected in the horizontal scanning direction.

Also, as the second deflector 105b, use is made of a plane mirror mounted on a stepping motor displaced at a uniform angular speed. In the present embodiment, the MEMS device 105a which is the first deflector and the deflecting mirror 105b which is the second deflector are disposed in proximity to each other, and the interval therebetween is 7.0 (mm). Of course, this second deflector 105b may also be constituted by an MEMS device (MEMS mirror).

It is desirable that the scanning image described on the screen surface 107 by the two-dimensional scanning apparatus be displayed as per an inputted image signal. In the two-dimensional scanning apparatus, however, in addition to the distortion of the scanning optical system 106 and isometric distortion, TV distortion occurs and image strain occurs from a desired shape given by the image signal and deteriorates the dignity of the scanning image, and this has posed a problem. Particularly, TV distortion attributable to two-dimensional scanning is a frame line which usually ought to be of a rectangular shape or a grating-shaped image displayed curvedly, and has remarkably deteriorated the dignity of the image.

Also, the two-dimensional scanning apparatus according to the present embodiment displays the scanning image on the screen surface 107 by an oblique projecting process.

In the two-dimensional scanning apparatus according to the present embodiment, in the vertical scanning direction (a plane parallel to the vertical direction), the reference ray Lvc is made incident on the screen surface 107 at a finite angle $\theta vc$ ($\neq 0$ deg.). Particularly, with regard to all beams, the incidence angle in the vertical scanning direction (the incidence angle of each ray onto the screen surface in a plane parallel to the vertical direction and containing each ray) is $\theta vi \leq 0$ (deg.) or greater.

Thus, by the oblique projecting process, the scanning image displayed on the screen surface 107 can be upwardly shifted to thereby display the scanning image at a position easy for an observer to see. Also, when a scanning type image displaying apparatus carrying this two-dimensional scanning apparatus thereon is placed on a stand such as a desk, all images are designed to be capable of being displayed above the desk, namely, on the screen surface 107, without the scanning image being displayed at the same height as the desk.

In the present embodiment, the scanning image is displayed on the screen surface 107 as the surface to be scanned by the use of the oblique projecting process, and it is in the vertical scanning section that the scanning image is obliquely projected. At this time, in the vertical scanning section, the reference ray Lvc is obliquely incident on the screen surface 107, and the incidence angle is 15.1 (deg.). Here, when a side on which the angle at which the deflected beam (the beam deflected by the aforedescribed first and second deflectors and emitted) is incident on the screen surface 107 is great is defined as upper, and a side on which the incidence angle is small is defined as lower, the principal ray of the beam incident on the uppermost portion of the screen surface 107 is incident on the screen surface 107 at an incidence angle $\theta vu=28.2$ (deg.), and the principal ray of the beam incident on the lowermost portion of the screen surface 107 is incident on the screen surface 107 perpendicularly thereto, i.e., at an incidence angle $\theta v1=0.00$ (deg.). Consequently, in the present embodiment, with regard to all beams, the incidence angle in the vertical scanning direction is $\theta vi \leq 0.00$ (deg.). On the other hand, in the horizontal scanning section, the reference ray Lvc is incident on the screen surface 107 perpendicularly thereto.

When as described above, an image is displayed on the screen surface 107 by the oblique projecting process, there arises the problem that trapezoid distortion occurs greatly and reduces the dignity of the displayed image.

Also, in the present embodiment, the beam (incident beam) emitted from the light source means 101 to the first deflector 105a for deflecting the beam in the horizontal scanning direction at an angle from the vertical scanning direction which is a direction perpendicular to the deflecting direction thereof is made incident on the deflecting surface of the first deflector 105a, and the construction of so-called oblique incidence is adopted.

In the case of the incidence in the deflecting surface in which the incident beam is made incident from the horizontal scanning direction which is the deflecting direction of the first deflector 105a onto the first deflector 105a, the width of the beam which can be deflected differs depending on the direction of the first deflector 105a, and particularly when the beam is deflected in a direction away from the incidence direction, the incident beam comes to be greatly eclipsed, whereby the loss of the light amount becomes a problem.

The incidence angle at which the beam is made incident from the light source means 101 onto the deflecting means 105 is defined by the angle formed between the principal ray of the incident beam and the reference ray Lvc.

Description will be made here of the case of the incidence in the deflecting surface.

When supposing an angle of view similar to that in the present embodiment, the horizontal angle of view of the scanning optical system is 37.80 (deg.) and the vertical angle of view thereof is 21.17 (deg.), and the incidence angle from in the deflecting surface is 30 (deg.), the width of the deflectable beam changes at 98-66% relative to the width of the reflecting surface of the first deflector 150a with a change in the direction of the reflecting surface of the first deflector 105a. The width of the deflectable beam decreases, whereby the light amount of the deflected beam also decreases and the loss of the light amount occurs.

On the other hand, when as in the present embodiment, the beam is made obliquely incident from the vertical scanning direction, the width of the deflectable beam is hardly affected by the direction of the reflecting surface of the first deflector 105a. In the present embodiment, the incidence angle in oblique incidence is 20 (deg.), and if the width of the deflectable beam is 94-93% relative to the width of the reflecting surface of the first deflector 105a (if it is of the order of 88-99%, there is no problem, but yet if possible, 93 to 94% is desirable). Thus, the reflecting surface of the first deflector 105a becomes effectively usable, and the decrease in the width of the deflectable beam becomes extremely small and the problem of the loss of the light amount is improved.

Description will now be made of the two first and second scanning mirrors 106a and 106b constituting the scanning optical system 106.

Figure 4A:
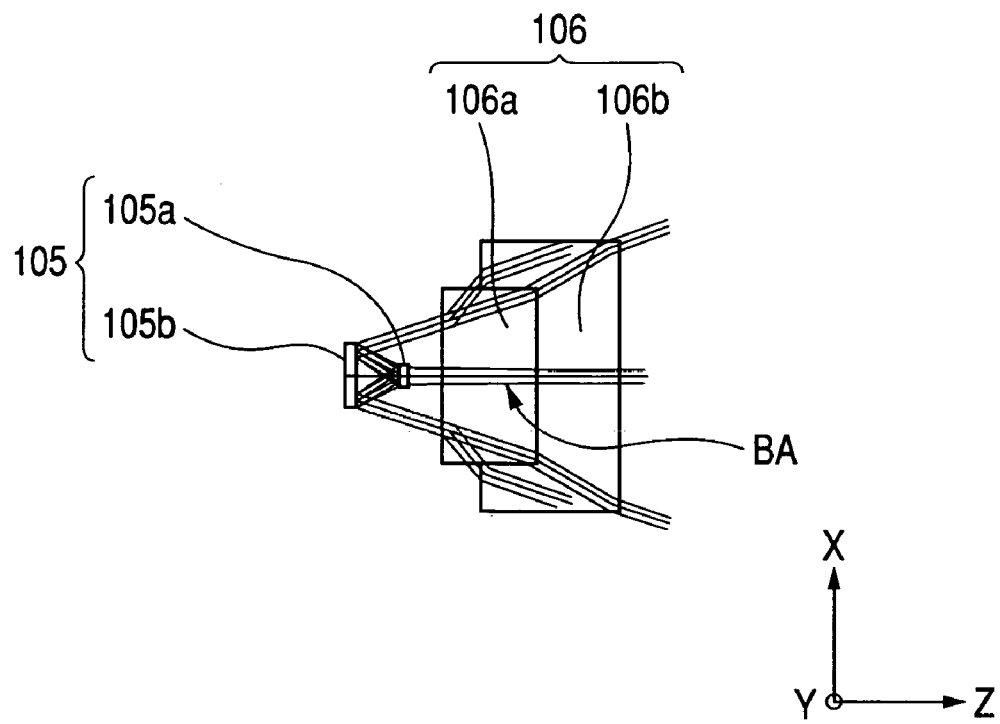
FIGS. 4A and 4B are schematic views of the essential portions of a scanning optical system in First Embodiment of the present invention.
Figure 4B:
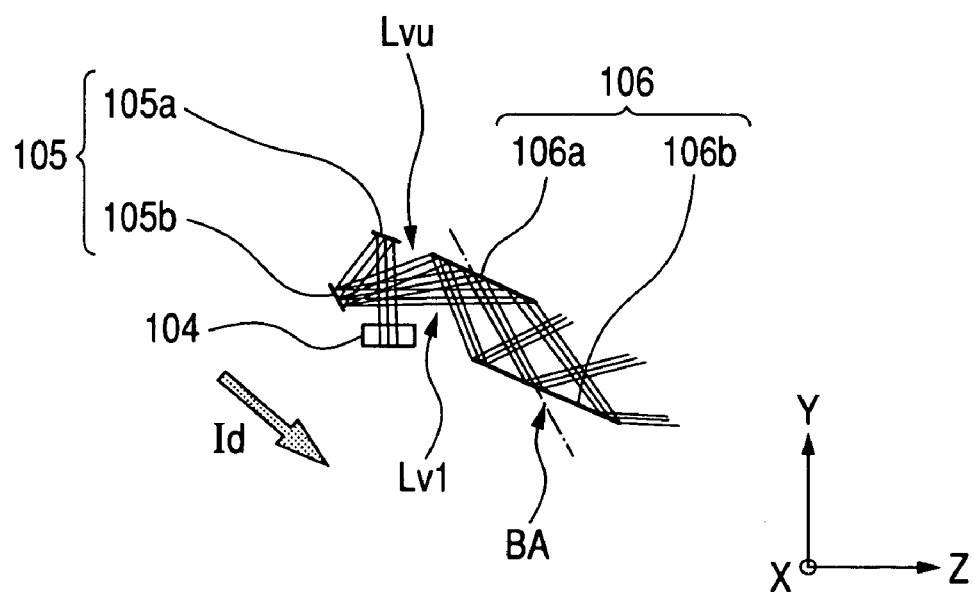
Figure 28:
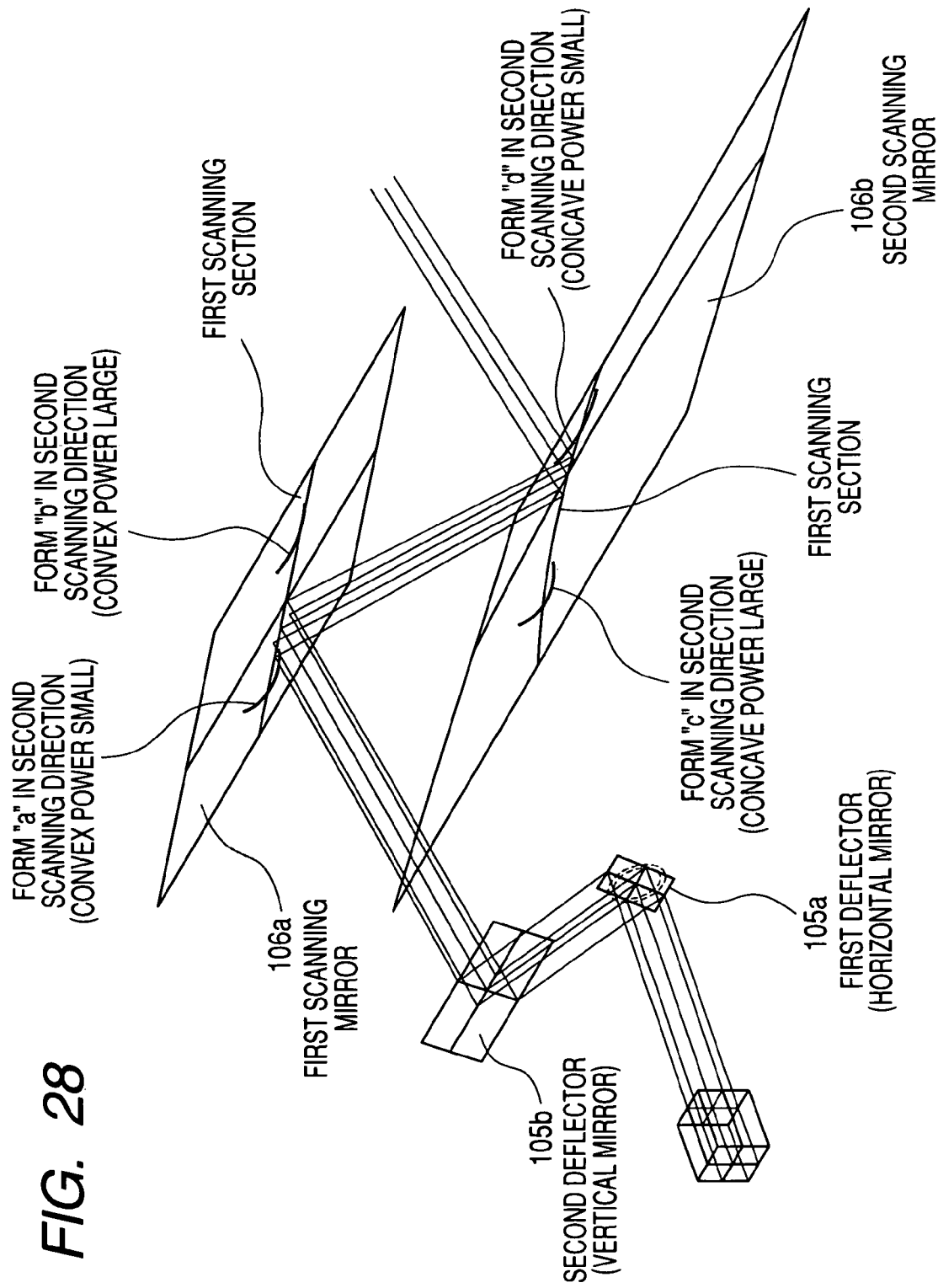
FIG. 28 is a schematic view of the essential portions of the two-dimensional scanning apparatus according to First Embodiment of the present invention.

FIG. 4A is a schematic view of the essential portions of the two-dimensional scanning apparatus according to the present embodiment in the horizontal scanning direction, and FIG. 4B is a schematic view of the essential portions in the vertical scanning direction of FIG. 4A. FIG. 28 is a schematic view of the essential portions of the two-dimensional scanning apparatus according to the present embodiment.

In the present embodiment, the scanning optical system 106 comprises two scanning mirrors, i.e., the first scanning mirror 106a and the second scanning mirror 106b in succession from the deflecting means 105 side. Of course, the optical elements this scanning optical system has are not restricted to the two mirrors, but may be three or more mirrors, or the scanning optical system may have a refractive lens, a diffracting optical element or the like besides the mirrors.

The optical path from after the reference ray Lvc is reflected by the reflecting surface of the first scanning mirror 106a of the scanning optical system 106 until it arrives at the reflecting surface of the second scanning mirror 106b is defined as the "reference axis BA" of the scanning optical system 106.

The first and second scanning mirrors 106a and 106b are tilted (and shifted) only in the vertical scanning section (in YZ cross section), and in the vertical scanning direction, they are disposed so as to fold the optical path of the deflected beam (so as to face each other in the vertical direction, or in other words, so that the ray may reciprocally move in the vertical direction when viewed from the horizontal direction). Also, in the horizontal scanning section, they are disposed symmetrically with respect to a plane including the reference axis BA, and further the shape of the reflecting surfaces of the first and second scanning mirrors 106a and 106b is made into a shape symmetrical with respect to a plane including the reference axis BA.

The term "fold" means that the angle of the reference ray Lvc reflected from the first scanning mirror and incident on the second scanning mirror with respect to the reference ray Lvc incident on the first scanning mirror and the angle of the reference ray Lvc emergent from the second scanning mirror with respect to the reference ray Lvc reflected from the first scanning mirror and incident on the second scanning mirror are of different signs, or in other words, the direction in which the reference ray Lvc is deflected by the first scanning mirror and the direction in which the reference ray Lvc is deflected by the second scanning mirror are opposite to each other. Also, it is preferable that the angle formed between the reference ray Lvc incident on the first scanning mirror and the reference ray Lvc emergent from the second scanning mirror be smaller than the angle formed between the reference ray Lvc incident on the first scanning mirror and the reference ray Lvc reflected from the first scanning mirror and incident on the second scanning mirror, and/or smaller than the angle formed between the reference ray Lvc reflected from the first scanning mirror and incident on the second scanning mirror and the reference ray Lvc emergent from the second scanning mirror.

Here, it is desirable that the angle formed between the reference ray Lvc incident on the first scanning mirror and the reference ray Lvc emergent from the second scanning mirror be 0 degree or greater and 40 degrees or less (preferably 25 degrees or less). Further, it is desirable that the angle formed between the reference ray Lvc incident on the first scanning mirror and the reference ray Lvc emergent from the first scanning mirror and incident on the second scanning mirror, and/or the angle formed between the reference ray Lvc emergent from the second scanning mirror and the reference ray Lvc emergent from the first scanning mirror and incident on the second scanning mirror be 60 degrees or greater (preferably 85 degrees or greater) and within 160 degrees (preferably within 120 degrees).

In FIG. 4B, the reference numeral 104 designates the convergent light converting optical system constituted by a single-piece condensing lens as previously described. This convergent light converting optical system 104 has positive power which converges the incident beam at a position separate by 239.71 (mm) from the first deflector 105a. The distance from the first deflector 105a to the surface 107 to be scanned is 357.90 (mm) along the reference axis BA, and the natural converging point of the incident beam converted into a convergent beam by the convergent light converting optical system 104 is disposed between the first deflector 105a and the surface 107 to be scanned. Further, the distance between the first deflector 105a and the last surface of the scanning optical system 106 (the reflecting surface of the second scanning mirror 106b) is 31.70 (mm) along the reference axis BA, and the natural converging point of the incident beam is disposed between the scanning optical system 106 and the surface 107 to be scanned.

The scanning optical system 106 has negative power as a whole, and converts the deflected beam meeting the natural converging point on this side of the surface 107 to be scanned into a weak convergent beam and causes it to be imaged near the surface 107 to be scanned.

Table 1 below shows the construction of the scanning optical system 106 in the present embodiment.

TABLE 1

Construction of Scanning Optical System

| lens | surface | surface shape | Ry | Rx | thickness | Nd | vd | surface vertex coordinates | | | | | |
|---|---|---|---|---|---|---|---|---|---|---|---|---|---|
| | | | | | | | | coordinates | | | inclination | | |
| | | | | | | | | x | y | z | a | b | c |
| convergent light converting optical system 104 | incidence surface | spherical surface | 123.47 | 123.47 | | | | | | | | | |
| | emergence surface | flat surface | flat | flat | 2.00 | 1.51633 | 64.1 | | | | | | |
| first deflector 105a | reflecting surface | flat surface | flat | flat | | | | 0.00 | 5.52 | 4.31 | 72.00 | 0.00 | 0.00 |
| second deflector 105b | reflecting surface | flat surface | flat | flat | | | | 0.00 | 0.00 | 0.00 | −31.76 | 0.00 | 0.00 |
| first scanning mirror 106a | reflecting surface | XY polynominal | flat* | flat* | | | | 0.00 | −0.42 | 18.85 | 65.39 | 0.00 | 0.00 |
| second scanning mirror 106b | reflecting surface | XY polynominal | flat* | flat* | | | | 0.00 | −13.85 | 30.83 | 57.73 | 0.00 | 0.00 |
| surface 107 to be scanned | | flat surface | flat | flat | | | | 0.00 | 77.11 | 332.97 | 0.00 | 0.00 | 0.00 |

The mark * is an aspherical surface shape, and indicates the radius of the base curved surface.

Aspherical Surface Coefficients

| lens | surface | surface shape | K | $C_{01}$ | $C_{20}$ | $C_{02}$ |
|---|---|---|---|---|---|---|
| first scanning mirror 106a | reflecting surface | XY polynominal | 0.0000E+00 | 8.2514E−02 | −2.9326E−03 | −2.8905E−03 |
| | | | $C_{04}$ | $C_{41}$ | $C_{23}$ | $C_{05}$ |
| | | | −2.1065E−05 | 4.7882E−07 | −1.5387E−07 | 1.7319E−06 |
| lens second scanning mirror 106b | surface reflecting surface | surface shape XY polynominal | K | $C_{01}$ | $C_{20}$ | $C_{02}$ |
| | | | 0.0000E+00 | 8.2514E−02 | −2.9326E−03 | −2.8905E−03 |
| | | | $C_{04}$ | $C_{41}$ | $C_{23}$ | $C_{05}$ |
| | | | −2.1065E−05 | 4.7882E−07 | −1.5387E−07 | 1.7319E−06 |
| first scanning mirror 106a | surface reflecting surface | surface shape XY polynominal | $C_{21}$ | $C_{03}$ | $C_{40}$ | $C_{22}$ |
| | | | −1.9746E−05 | 1.0062E−04 | 4.6042E−06 | 9.4047E−06 |
| | | | $C_{60}$ | $C_{42}$ | $C_{24}$ | $C_{06}$ |
| | | | −2.5514E−08 | −1.0474E−07 | 1.0481E−07 | −4.6873E−08 |
| lens second scanning mirror 106b | surface reflecting surface | surface shape XY polynominal | $C_{21}$ | $C_{03}$ | $C_{40}$ | $C_{22}$ |
| | | | −1.9746E−05 | 1.0062E−04 | 4.6042E−06 | 9.4047E−06 |
| | | | $C_{60}$ | $C_{42}$ | $C_{24}$ | $C_{06}$ |
| | | | −2.5514E−08 | −1.0474E−07 | 1.0481E−07 | −4.6873E−08 |

A free curved surface shape expressed by the following XY polynominal (A) is used for the first and second scanning mirrors 106a and 106b in the present embodiment.

$$Z = \frac{\frac{Y^2}{R}}{1 + \sqrt{1-(1+\kappa)\times\left(\frac{Y}{R}\right)^2}} + \Sigma C_{mn}X^m Y^n, \text{ where} \quad (A)$$

R: radius of curvature

κ: Conic constant

Each of the reflecting surfaces of the first and second scanning mirrors 106a and 106b comprises a non-rotation symmetrical surface not having a rotation symmetrical axis having, in the horizontal scanning direction, a shape symmetrical with respect to the reference axis BA, having, in the vertical scanning direction, a shape asymmetrical with respect to the reference axis BA, and further in the vertical scanning direction, is disposed while being shifted or tilted.

In the case of a scanning type image displaying apparatus in which as in the present embodiment, the beam is obliquely projected in the vertical scanning direction, the trapezoid distortion of the scanning image displayed on the screen surface 107 is of a shape in which the width of the scanning image in the horizontal scanning direction gradually widens from below toward above (as it faces in a direction in which the incidence angle becomes greater).

So, in the present embodiment, the scanning optical system 106 is made to include two or more scanning mirrors having reflecting surfaces formed into a non-rotation symmetrical shape, and at least two of these reflecting surfaces are tilted (and shifted) in the vertical scanning direction and are disposed so as to fold the optical path of the deflected beam to thereby correct the trapezoid distortion well.

Figure 5A:
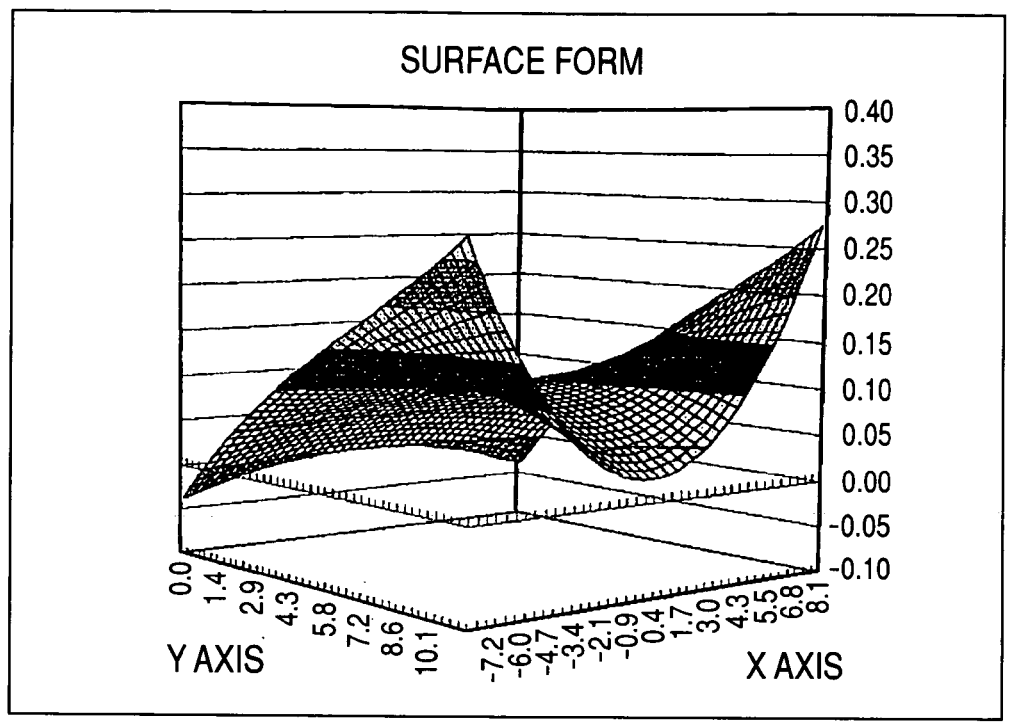
FIGS. 5A and 5B are illustrations of the shapes of scanning mirrors in First Embodiment of the present invention.
Figure 5B:
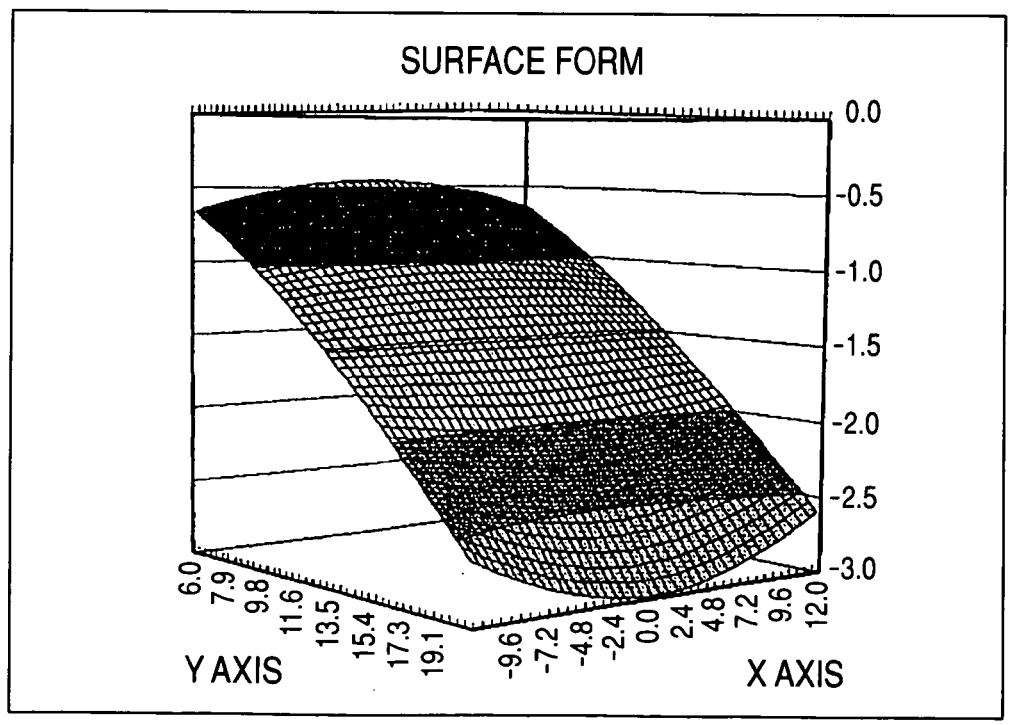

FIG. 5A is an illustration typically showing the shape of the first scanning mirror 106a, and FIG. 5B is an illustration typically showing the shape of the second scanning mirror 106b. The shape of the first scanning mirror 106a of FIG. 5A is a shape as it is viewed from the deflecting means 105 side, and the lower surface thereof is a reflecting surface. The shape of the second scanning mirror 106b of FIG. 5B is a shape as it is viewed from the deflecting means 105 side, and the upper surface thereof is a reflecting surface.

Figure 6A:
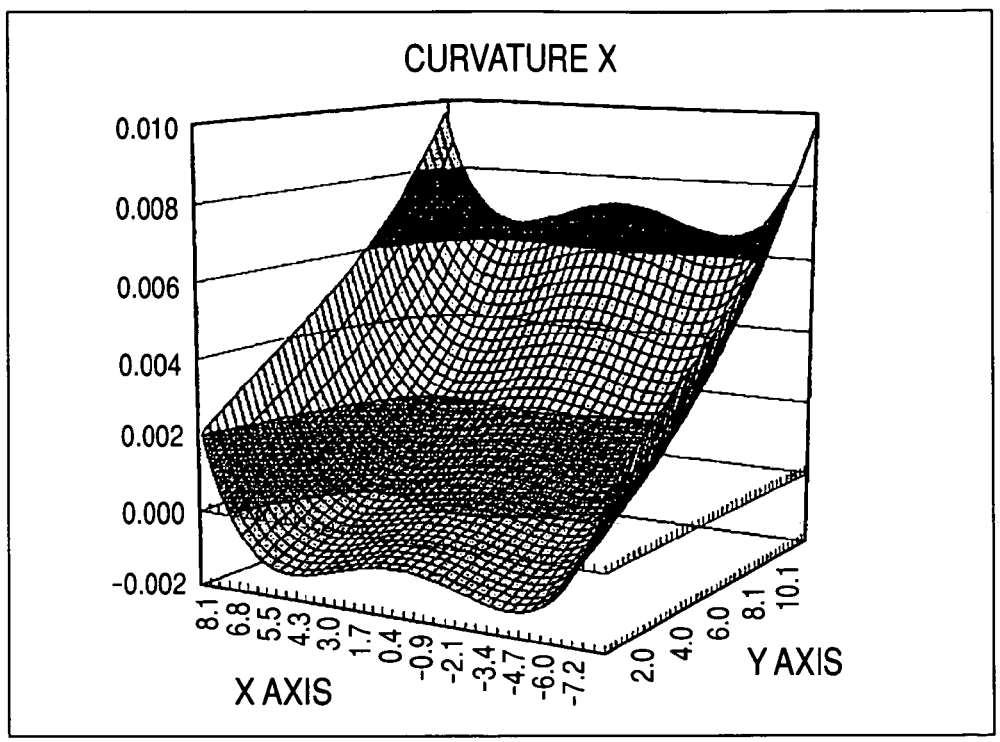
FIGS. 6A and 6B are illustrations of changes in the curvature of a first scanning mirror in First Embodiment of the present invention.
Figure 6B:
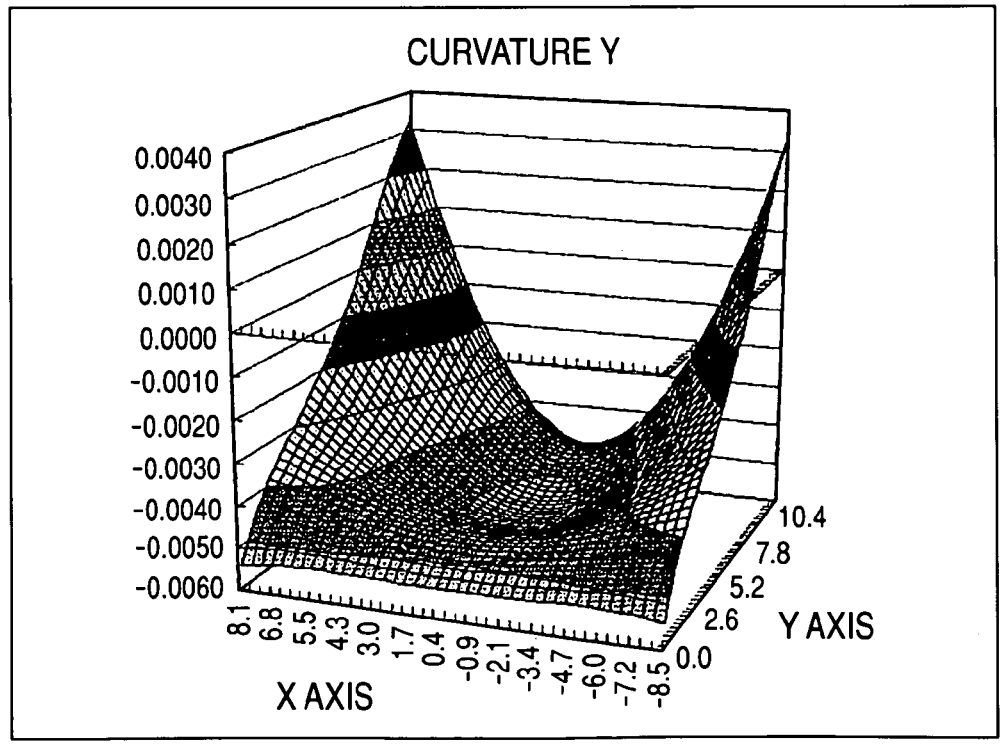

FIG. 6A is an illustration showing a change in the curvature of the first scanning mirror 106a in the horizontal scanning direction (the direction of the X-axis), and FIG. 6B is an illustration showing a change in the curvature of the first scanning mirror 106a in the vertical scanning direction (the direction of the Y-axis).

Figure 7A:
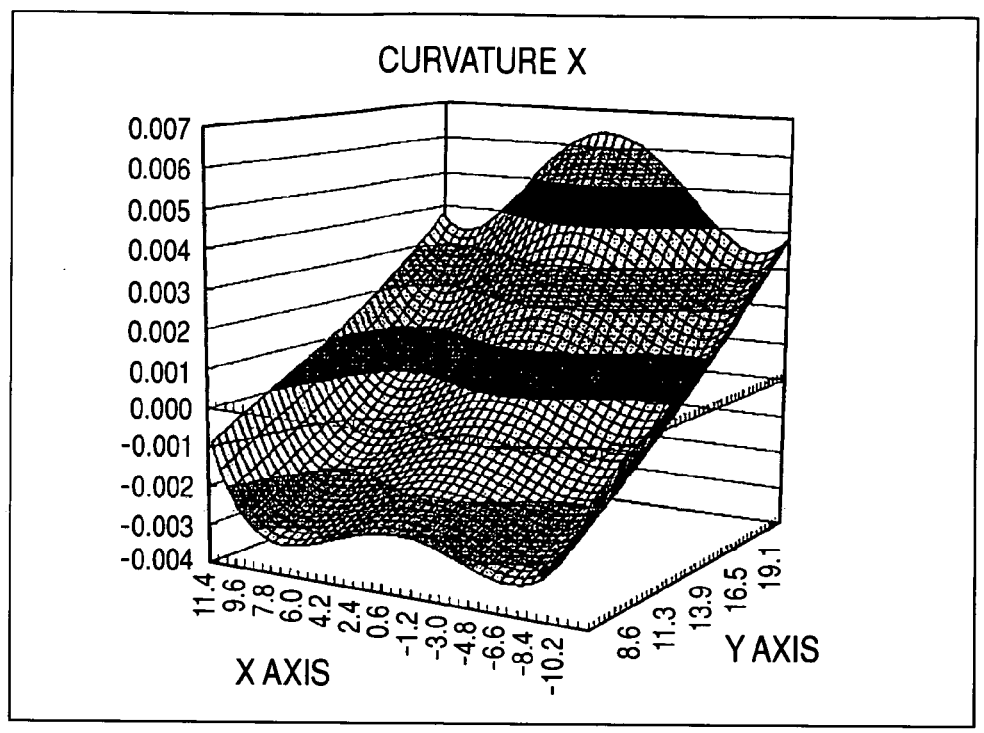
FIGS. 7A and 7B are illustrations of changes in the curvature of a second scanning mirror in First Embodiment of the present invention.
Figure 7B:
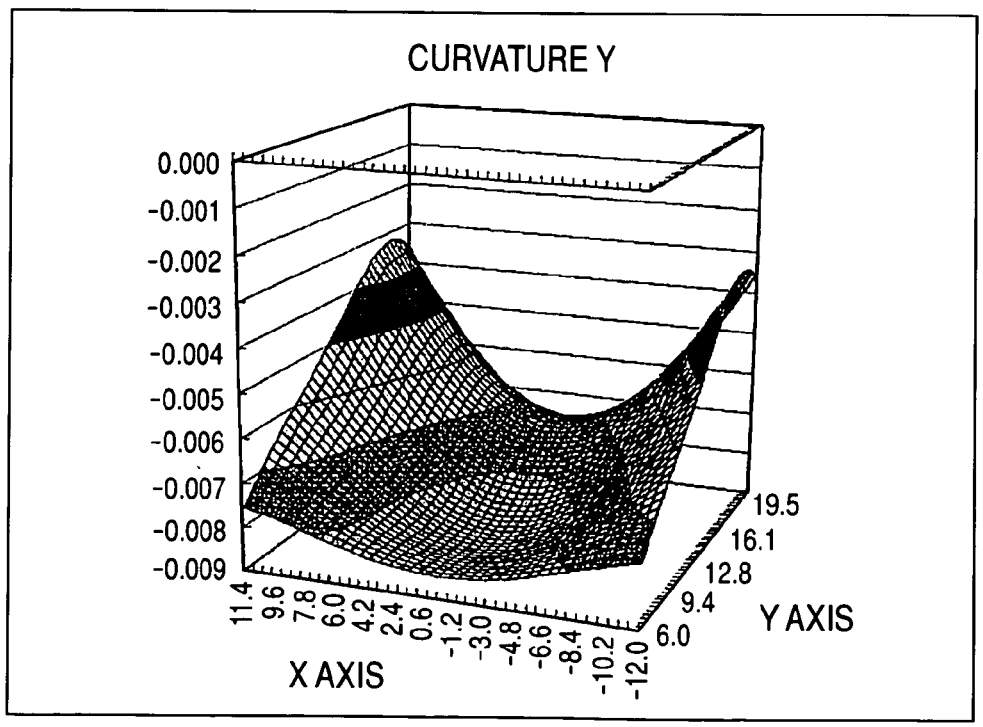

FIG. 7A is an illustration showing a change in the curvature of the second scanning mirror 106b in the horizontal scanning direction (the direction of the X-axis), and FIG. 7B is an illustration showing a change in the curvature of the second scanning mirror 106b in the vertical scanning direction (the direction of the Y-axis).

At this time, each illustration of the change in curvature represents the case where the first scanning mirror 106a or the second scanning mirror 106b is viewed from the screen surface 107 side.

Description will now be made of the surface shape of the first scanning mirror 106a.

The reflecting surface of the first scanning mirror 106a in the present embodiment is formed by a curvature monotonously changing anamorphic surface which will be described later.

The first scanning mirror 106a, in the vertical scanning section containing the reference axis BA, is negative in the curvature in the vertical scanning direction (the direction of the Y-axis), and the shape of the reflecting surface thereof is a concave surface, and this scanning mirror has positive power. In the vertical scanning section containing the reference axis BA, the curvature in the horizontal scanning direction (the direction of the X-axis) is deformed from negative to positive when it moves along the vertical scanning direction, and the shape of the reflecting surface is also deformed from a concave surface to a flat surface, and is further deformed to a convex surface. That is, the reflecting surface of the first scanning mirror 106a is a surface deformed from a barrel type toric surface to a saddle type toric surface depending on the position in the vertical scanning direction.

In this surface shape, when it moves from one end to the other end of the reflecting surface in the vertical scanning direction, the curvature in the horizontal scanning direction monotonously (gradually) changes from small to great (or from great to small). This surface shape will hereinafter be referred to as the "curvature monotonously changing anamorphic surface".

The curvature monotonously changing anamorphic surface refers to a surface shape in which when in the vertical scanning direction (first scanning direction) in which the reference ray Lvc is inclinedly incident on the surface 107 to be scanned, it moves from one end to the other end of the reflecting surface, the curvature in the horizontal scanning direction (second scanning direction) orthogonal to the vertical scanning direction monotonously increases from small to great or monotonously decreases from great to small. Therefore, the shape of the reflecting surface in the vertical scanning direction is a shape asymmetrical with respect to the reference axis BA, and is an anamorphic surface differing in curvature between the vertical scanning direction and the horizontal scanning direction, and is formed by a non-rotation symmetrical surface not having a rotation symmetrical axis.

Description will now be made of the surface shape of the second scanning mirror 106b.

The reflecting surface of the second scanning mirror 106b is formed by a curvature monotonously changing anamorphic surface.

The second scanning mirror 106b is such that in the vertical scanning section containing the reference axis BA, the surface shape thereof in the horizontal scanning direction, when it moves along the vertical scanning direction, is a surface deformed from a convex surface to a flat surface, and is further deformed to a concave surface, and the power thereof also changes from negative to positive. It is a curvature monotonously changing anamorphic surface of which the curvature in the horizontal scanning direction, when it moves from one end to the other end in the vertical scanning direction, monotonously changes from negative to positive.

Also, when in the vertical scanning section containing the reference axis BA, the surface shape in the vertical scanning direction, when it moves along the vertical scanning direction, is a surface deformed from a convex surface to a flat surface, and further deformed to a concave surface, and the power thereof also changes from negative to positive. It is a surface of which the curvature in the vertical scanning direction, when it moves from one end to the other end in the vertical scanning direction, monotonously changes from negative to positive.

In the present embodiment, as shown in FIG. 28, design is made such that the shape of the reflecting surface of the first scanning mirror 106a in the horizontal scanning direction in the vertical scanning section (in YZ cross section) is convex (the sagittal line R is convex when viewed in the vertical section), and the shape of the reflecting surface of the second scanning mirror 106b in the horizontal scanning direction in the vertical scanning section is concave (the sagittal line R is concave when viewed in the vertical section).

Also, design is made such that a side on which the power of the reflecting surface of the first scanning mirror 106a in the horizontal scanning direction in the vertical scanning section is strong as compared with the power of other reflecting surface and a side on which the power of the reflecting surface of the second scanning mirror 106b in the horizontal scanning direction in the vertical scanning section is weak as compared with the power of other reflecting surface are arranged properly.

Here, the power in the horizontal scanning direction (second scanning direction) being strong refers to designing such that in the curvature in the horizontal scanning direction in the vertical scanning section (in the first scanning section), a ray impinging on a surface strong in power (because of being a reflecting surface, strong in power in the order of sharply concave (a concave surface strong in power and having a small radius of curvature)>loosely concave (a concave surface weak in power and having a somewhat small radius of curvature)>flat surface>loosely convex (a convex surface strong in power and having a somewhat small radius of curvature)>sharply convex (a convex surface weak in power and having a small radius of curvature)) arrives at a portion of weak power, on other mirror surface, of the curvature of that mirror in the horizontal scanning direction in the vertical scanning direction.

Specifically, as shown in FIG. 28, light impinging on and reflected by that portion of the first scanning mirror 106a which is adjacent to the deflector 105 also impinges on the deflector 105 side on the second scanning mirror 106b. So, when the shape a of that portion of the first scanning mirror 106a which is adjacent to the deflector 105 in the horizontal scanning direction in the vertical section is made sharply convex (weak in power), it is coped with by making the shape c of that portion of the second scanning mirror 106b which is adjacent to the deflector 105 in the horizontal scanning direction in the vertical section sharply concave (strong in power), and when the shape b of that portion of the first scanning mirror 106a which is adjacent to the surface 107 to be scanned in the horizontal scanning direction in the vertical section is made loosely convex (strong in power), it is coped with by making the shape d of that portion of the second scanning mirror 106b which is adjacent to the surface 107 to be scanned in the horizontal scanning direction in the vertical section loosely concave (weak in power).

That is, comparing the power of the surfaces 106a and 106b, the shape a<the shape b, the shape c>the shape d and therefore, construction is made into a combination of the shape a and the shape c, and a combination of the shape b and the shape d.

Also, in the present embodiment, the pupil of the scanning optical system 106 is disposed near the deflecting means 105, and the image of the pupil is made into a virtual image.

In the present embodiment, the deflected beam deflected by the deflecting means 105 is reflected between the first scanning mirror 106a and the second scanning mirror 106b and is directed to the screen surface 107. Therefore, the reflecting surface of the first scanning mirror 106a is a downwardly facing reflecting surface, where as the reflecting surface of the second scanning mirror 106b is an upwardly facing reflecting surface. Therefore, even the same positive curvature represents a convex surface shape in the case of the first scanning mirror 106a, and a concave surface shape in the case of the second scanning mirror 106b.

By constructing thus, in the present embodiment, TV distortion occurring due to two-dimensional scanning and trapezoid distortion occurring due to the oblique projecting process can be corrected well.

The direction in which the curvature of the first scanning mirror 106a in the horizontal scanning direction in the vertical scanning section containing the reference axis BA is great and the direction in which the curvature of the second scanning mirror 106b in the horizontal scanning direction in the vertical scanning section containing the reference axis BA is great are disposed in the same direction so that the beam reflected by the convex surface portion of the first scanning mirror 106a may be reflected by the concave surface portion of the second scanning mirror 106b.

The first scanning mirror 106a is designed such that the deflected beam travelling toward the upper portion of the screen surface 107 is reflected by that portion of the first scanning mirror of which the curvature in the horizontal scanning direction is positive, i.e., the convex surface portion, whereby the angle at which each reflected beam widens in the horizontal scanning portion becomes great, and the second scanning mirror 106b is designed such that the deflected beam is subsequently reflected by that portion of the second scanning mirror 106b of which the curvature in the horizontal scanning direction is positive, i.e., the concave surface portion, whereby the angle at which each reflected beam widens in the horizontal scanning direction can be narrowed.

Also, the second scanning mirror 106b is designed such that the deflected beam travelling toward the lower portion of the screen surface 107 is reflected by that portion of the second scanning mirror 106b of which the curvature in the horizontal scanning direction is negative, i.e., the convex surface portion, whereby the angle at which each reflected beam widens in the horizontal scanning direction can be made great.

In the present embodiment, by the two first and second scanning mirrors 106a and 106b, the direction cosine of the beam travelling toward the upper portion of the screen surface 107 in the horizontal scanning direction when the horizontal scanning directions are the same is made smaller than the direction cosine of the beam travelling toward the lower portion of the screen surface 107 in the horizontal scanning direction so that these beams may become substantially parallel to each other when they are projected into the horizontal scanning section. Therefore, the TV distortion of lines extending in the vertical scanning direction such as the right side and the left side and trapezoid distortion can be corrected well.

Description will hereinafter be made in detail. The optical paths of the light arriving at the same position in the horizontal (scanning) direction (a position assuming the same coordinates value in the coordinates axis in the horizontal direction, or in other words, a position which looks overlapping when viewed from the vertical direction) between the scanning optical system 106 and the screen 107 (the imaging plane, or the projection surface) are designed to substantially overlap one another when viewed from the vertical direction. That is, all of the beam arriving at a certain point (first point) on the upper end of the screen, the beam arriving at a second point beneath the first point and near the center of the screen with respect to the vertical direction, and the beam arriving at a third point beneath the first point and on the lower end of the screen (in short, all of the beams incident on the same position (coordinates position) on the screen in the horizontal direction) look substantially overlapping one another when viewed from the vertical direction.

In other words, the positions at which the beams arriving at the same position in the horizontal direction (three or more rays differing from one another in the vertical direction) are reflected by the second scanning mirror 106b are designed to lie on a straight line when viewed from the vertical direction.

In the present embodiment, the shapes of the two scanning mirrors 106a and 106b are determined so as to satisfy the above-noted requirement. Specifically, the direction of travel of the beam deflected by the deflecting means (deflecting optical system) 105 is changed by the first scanning mirror 106a, and the beam is reflected toward a desired position on the screen by the second scanning mirror 106b. At this time, the two scanning mirrors 106a and 106b fold the optical path in the vertical direction, whereby the degree of freedom with which the position at which the beam is reflected by the second scanning mirror 106b is determined can be improved. As described above, the effect of using two scanning mirrors can be displayed.

Here, the expression "the vertical direction" or "the horizontal direction" applies to a case where as in the present embodiment, the screen (the imaging plane or the projection surface) is parallel to the vertical direction. That is, in a case where the screen is inclined with respect to the vertical direction or the screen is parallel to the horizontal plane, the expression "the vertical direction" or "the horizontal direction" changes in direction correspondingly thereto. That is, the vertical direction referred to in the present embodiment means the direction of a straight line perpendicular to the normal to the screen in a plane defined by the principal ray of the beam arriving at the center of the angle of view (the center of an area onto which an image can be projected, or the center of the image) and a normal to the screen at the center of the angle of view. Likewise, the horizontal direction means a direction perpendicular to a plane defined by the principal ray of the beam arriving at the center of the angle of view and the normal to the screen at the center of the angle of view.

Figure 8:
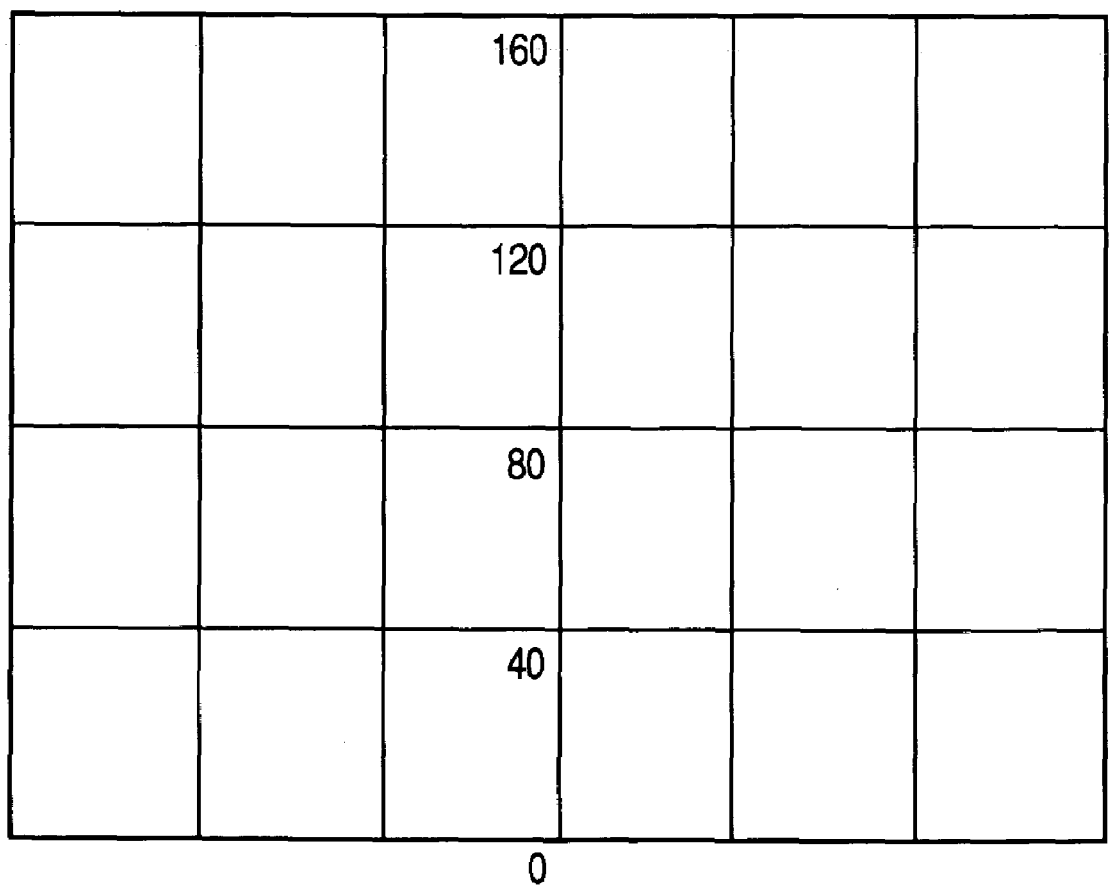
FIG. 8 is an illustration of a scanning image (grating) in First Embodiment of the present invention.

FIG. 8 is an illustration showing the scanning image (grating) in the two-dimensional scanning apparatus according to the present embodiment. Table 2 below shows the values of the TV distortion and the trapezoid distortion.

TABLE 2

|  | TV Dist. | Trapezoid Dist. |  |
| --- | --- | --- | --- |
| Upper side | 0.26 | 0.00 | (%) |
| Lower side | 0.07 | 0.00 | (%) |
| Left side | 0.28 | 0.04 | (%) |
| Right side | 0.28 | −0.04 | (%) |

Methods of calculating the TV distortion and the trapezoid distortion will now be described with reference to FIGS. 9A and 9B.

Figure 9A:
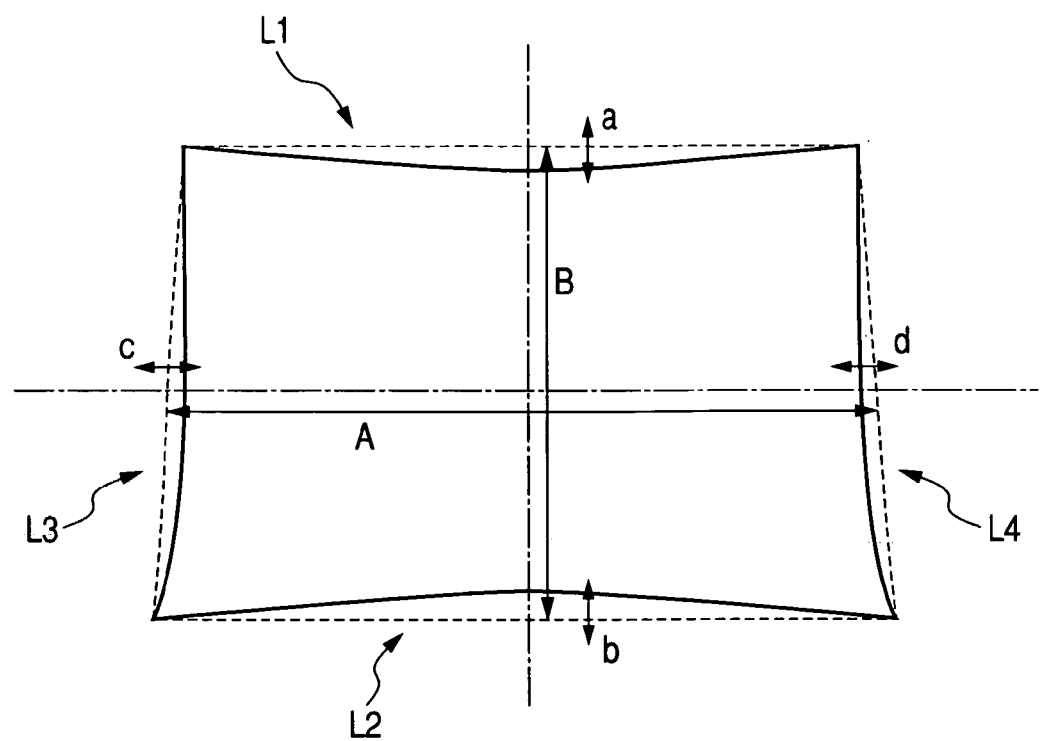
FIGS. 9A and 9B are illustrations of methods of calculating TV distortion and trapezoid distortion.

FIG. 9A illustrates the method of calculating the TV distortion. The TV distortion is an aberration amount indicative of an amount by which the frame of the displayed screen is curved, and is a mutation amount along an axis passing the center of the screen divided by the width of the screen. Consequently, the TV distortion in each side of the frame of the screen is represented by the following expressions.

Upper side L1:a/B×100(%)

Lower side L2:b/B×100(%)

Left side L3:c/A×100(%)

Right side L4:d/A×100(%)

Figure 9B:
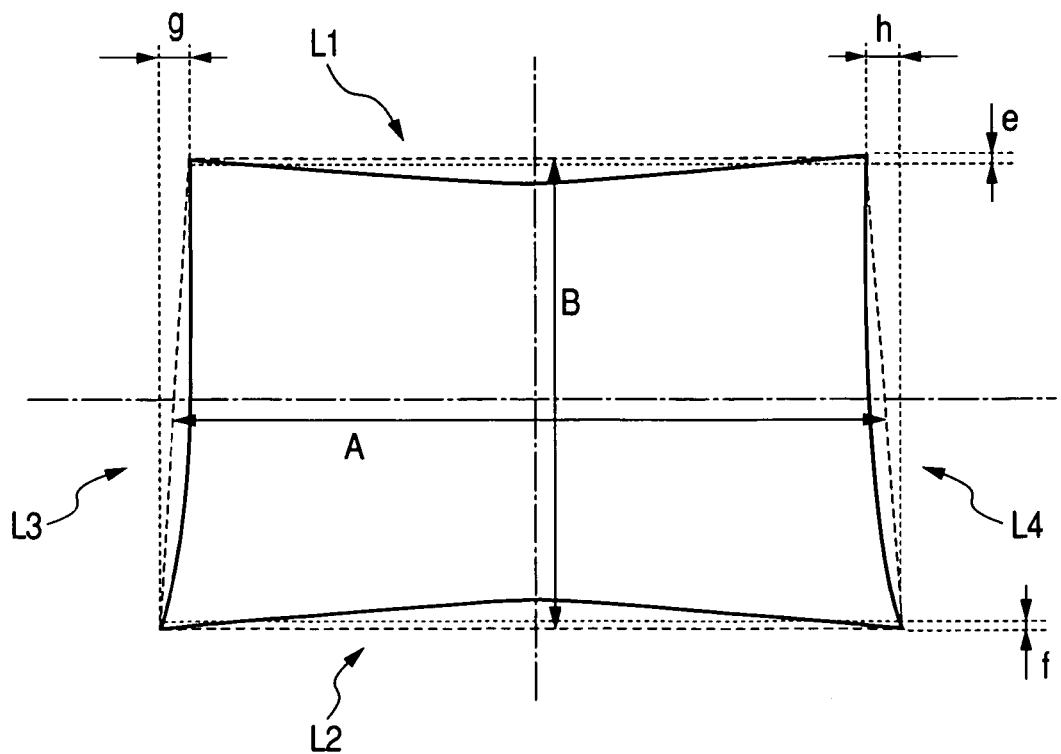

Also, FIG. 9B illustrates the method of calculating the trapezoid distortion. The trapezoid distortion is an aberration amount indicative of an amount by which the frame of the displayed screen is inclined, and is the mutation amount of the corner of the screen divided by the width of the screen. Consequently, the trapezoid distortion in each side of the frame of the screen is represented by the following expressions.

Upper side L1:e/2/B×100(%)

Lower side L2:f/2/B×100(%)

Left side L3:g/2/A×100(%)

Right side L4:h/2/A×100(%)

Also, as a comparative example, use is made of an example in which the surface 107 to be scanned was optically scanned by the first deflector 105a and the second deflector 105b to thereby display an image. The comparative example is a construction in which the scanning optical system of the two-dimensional scanning apparatus according to the present embodiment is omitted, and is similar to the construction of the present embodiment in that the surface 107 to be scanned is optically scanned by the oblique projecting process, and that the beam is made incident on the first scanning mirror 106a at an angle of 20 (deg.) from the vertical scanning direction.

Figure 10:
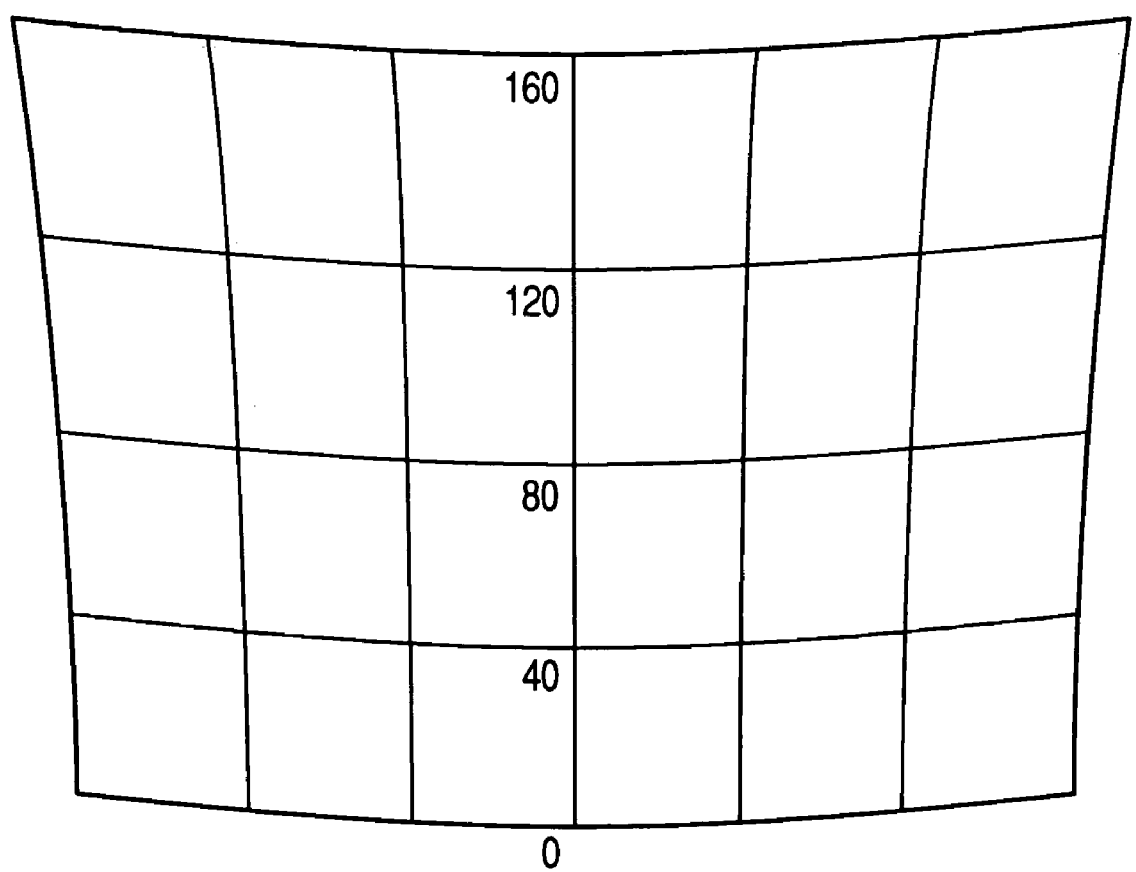
FIG. 10 is an illustration of a scanning image (grating) in a comparative example.

FIG. 10 is an illustration showing a scanning image (grating) in the two-dimensional scanning apparatus of the comparative example. Table 3 below shows the values of the TV distortion and the trapezoid distortion.

TABLE 3

|  | TV Dist. | Trapezoid Dist. |  |
| --- | --- | --- | --- |
| Upper side | 4.69 | 0.00 | (%) |
| Lower side | 3.34 | 0.00 | (%) |

TABLE 3-continued

|  | TV Dist. | Trapezoid Dist. |  |
| --- | --- | --- | --- |
| Left side | 1.33 | 4.03 | (%) |
| Right side | 1.33 | 4.03 | (%) |

As shown in FIG. 10, the scanning image in the comparative example has great image distortion. Particularly in the TV distortion, the upper side is curved as much as 4.69% and the lower side is curved as much as 3.34%, and in the trapezoid distortion, the right side and the left side suffer from distortion of 4.03%, and the remarkable deterioration of the dignity of the image was a problem.

On the other hand, in the two-dimensional scanning apparatus according to the present embodiment, as shown in FIG. 8, the TV distortion and the trapezoid distortion are corrected well by the use of the aforedescribed scanning optical system 106. In the TV distortion, the upper side, the lower side, and the right side and the left side are corrected to very small curvatures of 0.26(%), 0.07(%) and 0.00(%), respectively. Also, in the trapezoid distortion, the upper side and the lower side, the right side and the left side are corrected to very small distortion of 0.00(%), 0.04(%) and −0.04(%), respectively. Thus, by using the aforedescribed scanning optical system, it is possible to correct the TV distortion and trapezoid distortion of the scanning image well, and always display an image of high dignity on the surface 107 to be scanned.

In a case where as in the present embodiment, in the vertical scanning direction, the reference ray Lvc is inclinedly incident on the screen surface 107, the TV distortion and trapezoid distortion occurring to the scanning image can be corrected well by the scanning optical system 106 having at least two scanning mirrors having reflecting surfaces formed into a non-rotation symmetrical shape.

Particularly, the reflecting surfaces of the first and second scanning mirrors 106a and 106b are anamorphic surfaces and are formed in a surface shape asymmetrical with respect to the reference ray Lvc in the vertical scanning direction, whereby a correcting effect for the TV distortion and trapezoid distortion becomes great.

Further, use is made of a curvature monotonously changing anamorphic surface of which the curvature in the horizontal scanning direction monotonously changes from small to great (or from great to small) from one end to the other end in the vertical scanning direction in the vertical scanning section containing the reference axis BA, whereby the TV distortion and trapezoid distortion can be corrected well.

At this time, curvature monotonously changing anamorphic surfaces are used for the two first and second scanning mirrors 106a and 106b, and the sides on which the curvatures of the respective curvature monotonously changing anamorphic surfaces are great are arranged properly at one end in the horizontal scanning direction so that the convex portion of one scanning mirror and the concave portion of the other scanning mirror may be combined together, whereby the correcting effect for the TV distortion and trapezoid distortion can be made greater.

It also becomes possible to correct the curvature of the image plane by the bending of negative power and positive power, and an image of high resolution can be displayed in the entire surface of the scanning image.

In the present embodiment, the beam emitted from the light source means 101 is made obliquely incident on the deflecting means 105 at an angle of 20 (deg.). At this time, the beam is made obliquely incident from the vertical scanning direction in which the reference ray Lvc is inclinedly incident on the screen surface 107. The direction of the oblique incidence in the vertical scanning section is determined by the manner in which the beam is incident on the screen surface 107.

Here, with reference to FIGS. 2B and 4B, the direction of oblique incidence will be described with attention paid to the optical path between the second deflector 105b of the deflector means 105 and the first scanning mirror 106a.

In the vertical scanning section in which the beam is obliquely incident, the beam is made obliquely incident from a side (the lower side in FIG. 4B) on which in contrast with the reference ray Lvc, the deflected beam Lv1 arriving at a lower portion passes onto the first scanning mirror 106a. The optical path from the first deflector 105a to the second deflector 105b is folded, but the above-mentioned direction can be considered with that optical path developed. In the present embodiment, the incident beam is made obliquely incident from a side indicated by arrow Id (the right lower side in FIG. 4B) onto the first deflector 105a.

When the TV distortion of the scanning image is to be corrected by the scanning optical system 106, it is also possible to correct the TV distortion in the horizontal scanning direction and the TV distortion in the vertical scanning direction at a time, but it becomes possible to correct one of them easily if it is desired.

In the present embodiment, the beam is made obliquely incident from the vertical scanning direction to thereby produce a curvature in a scanning line described on the screen surface 107. The angle of the oblique incidence is set to a desired value to thereby adjust the curvature amount of the scanning line, and it is offset by the amount of TV distortion in the horizontal scanning direction produced when the scanning optical system 106 corrects the TV distortion in the vertical scanning direction, to thereby correct the TV distortion in the horizontal scanning direction and the TV distortion in the vertical scanning direction at a time. The adoption of the construction of oblique incidence is effective particularly for the correction of the TV distortion occurring to lines in the horizontal scanning direction such as the upper side and lower side of a grating image shown in FIG. 8.

That is, when in the vertical scanning direction in which the reference ray Lvc is inclinedly incident on the screen surface 107, the incident beam is viewed in the optical path from the deflecting means 105 to the scanning optical system 106, the incident beam is made obliquely incident on the deflecting surface of the deflecting means 105 from a side on which the deflected beam small in the incidence angle onto the screen surface 107 in contrast with the reference ray Lvc passes.

In the present embodiment, the beam emitted from the light source means 101 is deflected at an angle of view of 37.80 (deg.) in the horizontal scanning direction and an angle of view of 21.17 (deg.) in the vertical scanning direction by the deflecting means 105. Also, width in the horizontal scanning direction of an image displayed on the screen surface 107 with the deflected beam of each angle of view corrected by the scanning optical system 106 is 238.37 (mm) and the width thereof in the vertical scanning direction is 176.93 (mm), and an image of diagonally 11.7 (inch) is displayed. The width of the displayed image is defined by a position passing through the center of the image.

In the present embodiment, oblique projection in which, in the vertical scanning direction, the reference ray Lvc is inclinedly incident on the screen surface 107 is effected, and the vertical scanning direction is a first scanning direction.

Here, when the angle of view in the vertical scanning direction is defined as $\theta_{d1}$, and the angle of view in the horizontal scanning direction (second scanning direction) is defined as $\theta_{d2}$, and the width of the beam incident on the screen surface in the vertical scanning direction is defined as Wi1, and the width thereof in the horizontal scanning direction is defined as Wi2, the condition that $$0.1 \times \frac{Wi1}{Wi2} < \frac{\theta_{d1}}{\theta_{d2}} < 0.9 \times \frac{Wi1}{Wi2} \quad (1)$$

is satisfied.

In present embodiment, the angle of view in the vertical scanning direction is $\theta_{d1}$=21.17 (deg.), and the angle of view in the horizontal scanning direction is $\theta_{d2}$=37.80 (deg.), and the width of the displayed image in the vertical scanning direction is Wi1=176.93 (mm), and the width thereof in the horizontal scanning direction is Wi2=238.37 (mm), and $$\frac{\theta_{d1}}{\theta_{d2}} = 0.755 \times \frac{Wi1}{Wi2},$$

and this satisfies conditional expression (1).

Preferably, the above-mentioned conditional expression (1) may be set as follows:

$$0.3 \times \frac{Wi1}{Wi2} < \frac{\theta_{d1}}{\theta_{d2}} < 0.9 \times \frac{Wi1}{Wi2} \quad (1a)$$

Also, more preferably, the above-mentioned conditional expression (1a) may be set as follows:

$$0.5 \times \frac{Wi1}{Wi2} < \frac{\theta_{d1}}{\theta_{d2}} < 0.85 \times \frac{Wi1}{Wi2} \quad (1b)$$

Description will now be made of the technical meaning of the above-mentioned conditional expression (1). If the lower limit value of conditional expression (1) is exceeded, the correction of the curvature of image field in the vertical scanning direction will become difficult, and the enlargement of the spot will result and resolution will be deteriorated, and this is not good. If the upper limit value of conditional expression (1) is exceeded, the correction of the trapezoid distortion will become difficult, and this is not good.

In the present embodiment, by the above-mentioned conditional expression (1) being satisfied, the trapezoid distortion can be corrected well and the curvature of image field in the first scanning direction is corrected well, and the spot can be made into a desired size.

As described above, the angle of view in the vertical scanning direction which is the first scanning direction is set small, whereby the downsizing of the scanning optical system 106 is achieved, and in contrast with the horizontal scanning direction which is the second scanning direction, the angle of view in the vertical scanning direction is set to a small ratio whereby the substantial focal length in the vertical scanning direction is set short, and the correction of the TV distortion and trapezoid distortion of the scanning image is made easy.

Also, in a case where as in the present embodiment, the deflecting means 105 is constituted by two first and second deflectors 105a and 105b, it is preferable that the wider side of the image displayed on the screen surface 107 be disposed at a position separate from the screen surface 107. Thereby, it becomes easy to correct the optical performance of the scanning optical system 106.

When in the present embodiment, the width of the scanning optical system 106 in the horizontal scanning direction is defined as Dx, and the width thereof in the vertical scanning direction is defined as Dy, and the width thereof in the direction of the Z-axis perpendicular to the horizontal scanning direction and the vertical scanning direction is defined as Dz, respective elements are set so as to satisfy the conditions that $$Dx \leq 40 \text{ (mm)} \qquad (2)$$

$$Dy \leq 30 \text{ (mm)} \qquad (3)$$

$$Dz \leq 35 \text{ (mm)} \qquad (4).$$

In the present embodiment, $$Dx = 25.16 \text{ (mm)}$$

$$Dy = 16.06 \text{ (mm)}$$

$$Dz = 18.16 \text{ (mm)}$$

and these satisfy all of the above-mentioned conditional expressions (2), (3) and (4).

Preferably, the above-mentioned conditional expressions (2), (3) and (4) may be set as follows:

$$Dx \leq 30 \text{ (mm)} \qquad (2a)$$

$$Dy \leq 23 \text{ (mm)} \qquad (3a)$$

$$Dz \leq 25 \text{ (mm)} \qquad (4a).$$

Further, when the distance in the direction of the Z-axis from the second deflector 105b of the deflecting means 105 nearest to the screen surface 107 to the position of the scanning optical system 106 nearest to the screen surface 107 is defined as Ld, the condition that $$Ld \leq 40 \text{ (mm)} \qquad (5)$$

is satisfied. In the present embodiment, $$Ld = 26.67 \text{ (mm)}$$

and this satisfies the above-mentioned conditional expression (5).

Preferably, the above-mentioned conditional expression (5) may be set as follows:

$$Ld \leq 30 \text{ (mm)} \qquad (5a).$$

In the present embodiment, these conditional expressions are satisfied, whereby the two-dimensional scanning apparatus becomes very compact, and this leads to the merit that a scanning type image displaying apparatus carrying this two-dimensional scanning apparatus thereon can be downsized. Also, the prices of the optical parts, the expense of the material of a mechanical member holding these, and the occupied volume of a depository therefor can be reduced, and this also leads to the merit that a reduction in cost can be achieved.

As described above, in the two-dimensional scanning apparatus, in a case where the beam is optically scanned in the two-dimensional direction by the use of the deflecting means to thereby display an image on the screen surface, the beam is deflected in the two-dimensional direction, whereby TV distortion occurs, and further, by the image being displayed by the oblique projecting process, trapezoid distortion occurs in addition to the TV distortion, and this has remarkably deteriorated the dignity of the image, but as described above, the TV distortion and trapezoid distortion can be corrected well by the effect of the present embodiment. Thereby, there can be achieved a two-dimensional scanning apparatus which can always display a scanning image of high dignity.

While in the present embodiment, the two first and second scanning mirrors 106a and 106b constituting the scanning optical system 106 are formed by free curved surfaces of a plane base, this is not restrictive, but even if use is made, for example, of free curved surfaces of a spherical base or free curved surfaces of a parabola base, the present invention can obtain an effect similar to that of the above-described First Embodiment.

Also, while in the present embodiment, the scanning optical system 106 is constituted by the two scanning mirrors 106a and 106b, this is not restrictive, but the scanning optical system 106 may be constituted by three or more scanning mirrors.

Figure 11:
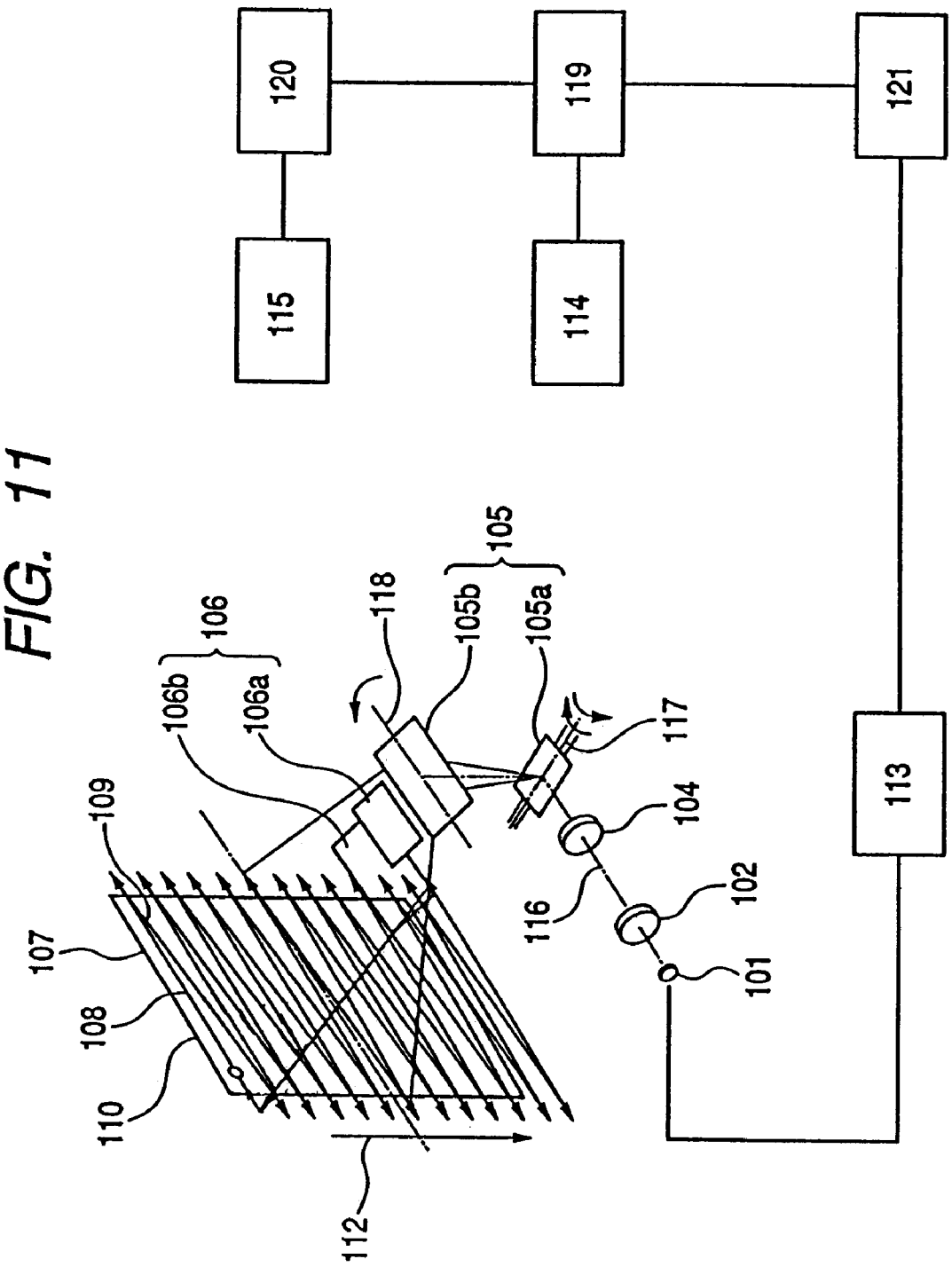
FIG. 11 is a schematic view of the essential portions of the scanning type image displaying apparatus of the present invention.

FIG. 11 is a schematic view of the essential portions of a scanning type image displaying apparatus using the two-dimensional scanning apparatus of the present invention.

In FIG. 11, a beam emitted from light source means 101 is incident on deflecting means 105 through a condensing lens 102 and a convergent light converting optical system 104. In the deflecting means 105, there are disposed horizontal scanning means 105a and vertical scanning means 105b, and these are designed to be capable of deflecting the incident beam in a two-dimensional direction. The deflected beam deflected by the deflecting means 105 travels toward a surface 107 to be scanned such as a screen or a wall through a scanning optical system 106 comprising two first and second scanning mirrors 106a and 106b.

Design is made such that the beam emitted from the light source means 101 is substantially condensed on the surface 107 to be scanned by the condensing lens 102, the convergent light converting optical system 104 and the scanning optical system 106, and forms a light source image. Accordingly, the light source image formed on the surface 107 to be scanned is optically scanned by the deflecting means 105.

The horizontal scanning means 105a in the deflecting means 105 is a micro mechanical mirror formed by a semiconductor process, and is designed to oscillate a mirror surface by a mechanical resonating operation. The vertical scanning means 105b is a motor such as a stepping motor having a rotary shaft. The horizontal scanning means 105a and the vertical scanning means 105b are connected to a horizontal scanning means driving portion 114, a horizontal scanning means driving circuit 119, a vertical scanning means driving portion 115 and a vertical scanning means driving circuit 120. Also, the light source means 101 is connected to a light source driving circuit 113, and the light source driving circuit 113, the horizontal scanning means driving circuit 119 and the vertical scanning means driving circuit 120 are connected to a control circuit 121, and a light emitting time and a deflecting operation are controlled while they are synchronized with one another. An image signal is inputted from signal inputting means, not shown, to the control circuit 121, which thus effects control on the basis of the input signal.

Arrow 117 indicates the oscillating direction of the horizontal scanning means 105*a*. The beam deflected by the horizontal scanning means 105*b* is optically scanned on the surface 107 to be scanned, and forms scanning lines like a forward path scanning line 108 and a backward path scanning line 109 in FIG. 11.

Arrow 118 indicates the deflecting direction of the vertical scanning means 105*b*, and the vertical scanning means 105*b* is rotated in the direction of arrow 118 to thereby scan on the surface 107 to be scanned in the direction of arrow 112. Accordingly, scanning lines reciprocated like the scanning lines 108 and 109 are formed downwardly on the surface 107 to be scanned. When it comes to the lower portion of the surface 107 to be scanned, the vertical scanning means 105*b* is returned to the upper end of the surface 107 to be scanned, and thereafter effects scanning repetitively.

The deflected beam is scanned to the outside of the effective portion 110 of the surface 107 to be scanned, and is optically detected by a portion thereof and adjusts the timing of synchronization.

For example, in the case of an image of SAGA having 800 pixels in a horizontal direction and 600 pixels in a vertical direction in the effective portion 110 of the surface 107 to be scanned, when driving is effected at 60 Hz in the vertical direction, the number of horizontal scanning lines becomes 300 in each of the forward path and the backward path and therefore, a resonance frequency of 18 kHz becomes necessary. In FIG. 11, the scanning lines are shown in a thinned form to make them easily understood.

Figure 12:
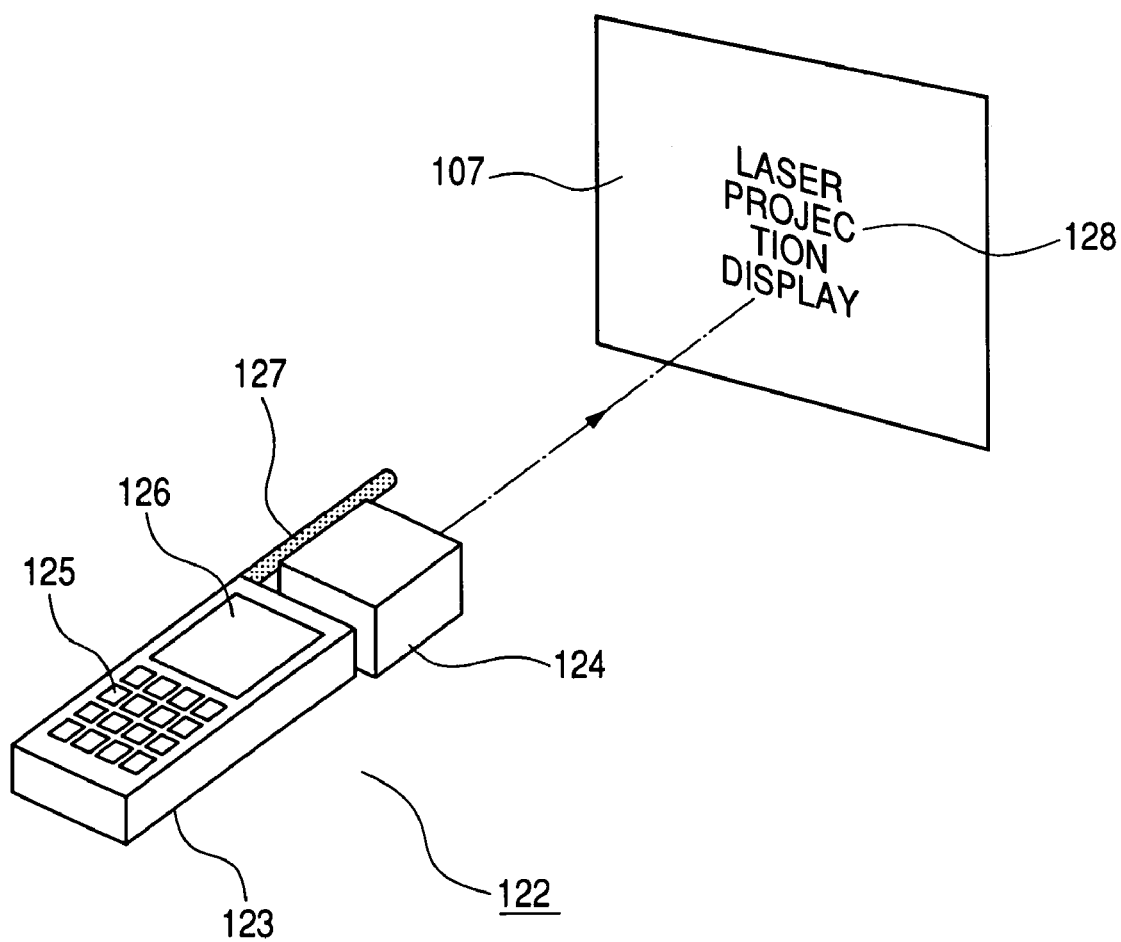
FIG. 12 is a schematic view of the essential portions of the scanning type image displaying apparatus of the present invention.

FIG. 12 is a schematic view of the essential portions of the scanning type image displaying apparatus using the two-dimensional scanning apparatus of the present invention.

In FIG. 12, a projection displaying portion 124 is connected to the main body portion 123 of a portable apparatus 122, and the two-dimensional scanning apparatus according to the present embodiment is carried on the projection displaying portion 124. The portable apparatus 122 has an inputting portion 125, and design is made such that all operations are performed by the inputting portion 125. The portable apparatus 122 is provided with an antenna 127, and can effect the transmission and reception of data. The main body portion 123 is provided with a displaying portion 126 such as a liquid crystal panel or an organic EL. Regarding character information, a simple image, etc., a user, not shown, can directly see the displaying portion 126 while holding the portable apparatus 122 in his hand. However, when it is desired to observe on a larger screen or when it is impossible to see on the area of the displaying portion, an image can be projected from the projection displaying portion 124 by the user's operation. For example, an image is projected toward the surface 107 to be scanned such as a wall to thereby display a scanning image 128.

Figure 13:
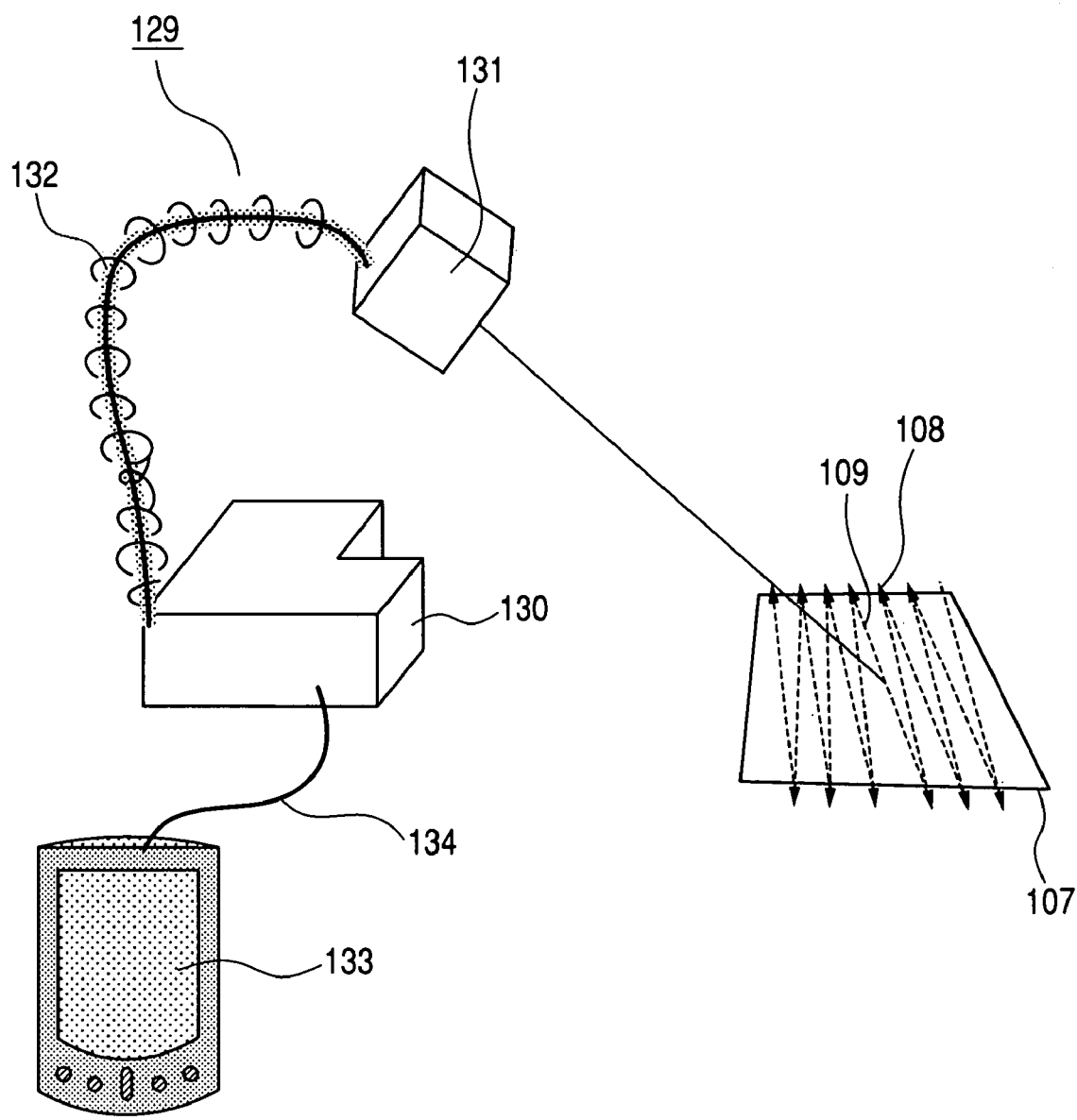
FIG. 13 is a schematic view of the essential portions of the scanning type image displaying apparatus of the present invention.

FIG. 13 is a schematic view of the essential portions of the scanning type image displaying apparatus using the two-dimensional scanning apparatus of the present invention.

In FIG. 13, the scanning type image displaying apparatus 129 comprises three constituents, namely, a main body portion 130, a head portion 131 and a connecting portion 132. The main body portion 130 has light source means and a condensing lens system, and the head portion 131 is provided with a convergent light converting optical system, deflecting means and a scanning optical system. The connecting portion 132 connecting the main body portion 130 and the head portion 131 together comprises, for example, an optical fiber, and supplies a beam emitted from the light source means to the head portion 131. Thereby, for example, scanning lines 108 and 109 are described with the upper portion of a desk or the like as the surface 107 to be scanned, and an image is displayed. If at this time, for example, a portable information terminal 133 such as PDA and the scanning type image displaying apparatus 129 are connected together by a cable 134, the small screen of the portable information terminal 133 can be seen on a large screen onto which it has been projected by the scanning type image displaying apparatus 129.

Second Embodiment

Figure 14A:
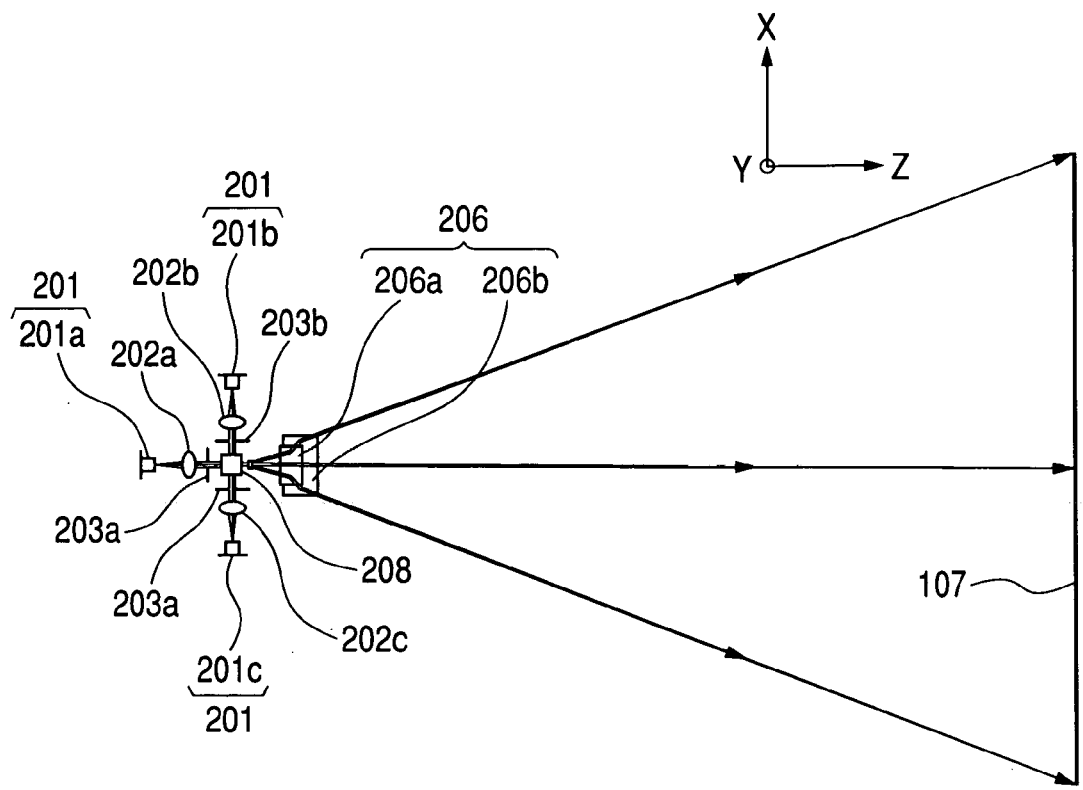
FIGS. 14A and 14B are cross-sectional views of the essential portions of a two-dimensional scanning apparatus according to Second Embodiment of the present invention.
Figure 14B:
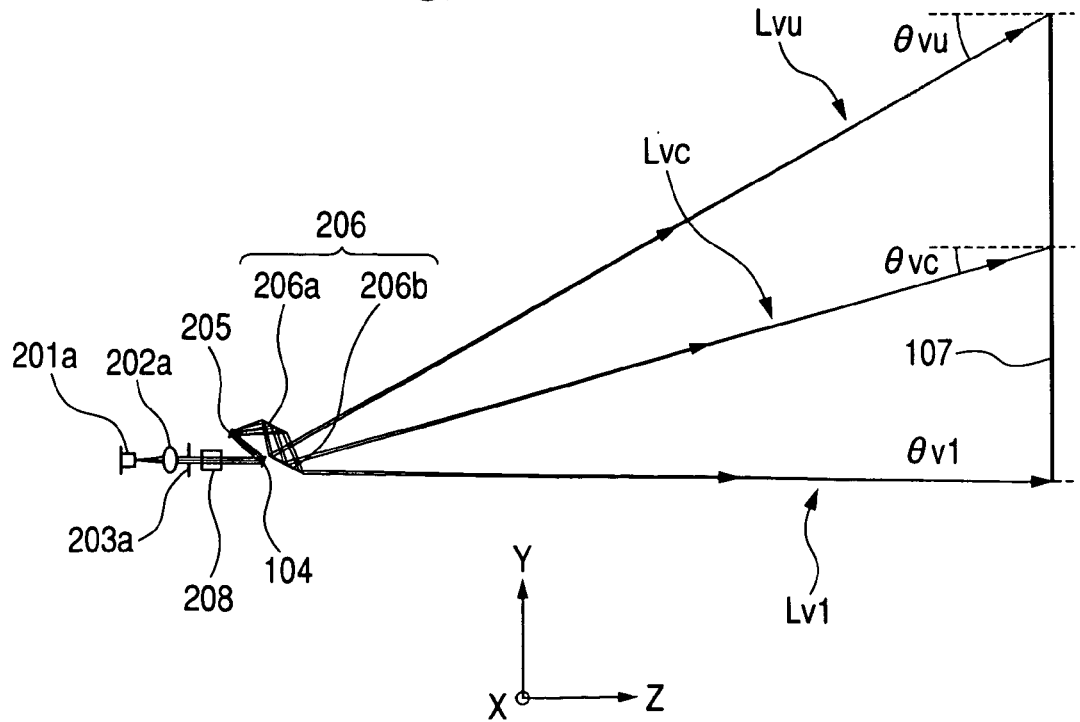

FIG. 14A is a horizontal scanning sectional view of Second Embodiment of the present invention, and FIG. 14B is a vertical scanning sectional view of Second Embodiment of the present invention. In FIGS. 14A and 14B, the same elements as the elements shown in FIGS. 2A and 2B are given the same reference characters.

The differences of the present embodiment from the aforedescribed First Embodiment are that light source means 201 are constituted by three light sources (semiconductor lasers) 201*a*, 201*b* and 201*c* emitting beams of different wavelengths, and that two-dimensional deflecting means is constituted by a single deflector 205 having a reflecting surface and capable of resonating in a two-dimensional direction. In the other points, the construction and optical action of the present embodiment are substantially similar to those of the First Embodiment, whereby a similar effect is obtained.

That is, in FIGS. 14A and 14B, the reference numeral 201 designates light source means comprising laser light sources (light emitting elements) of three colors, i.e., a green semiconductor laser 201*a*, a red semiconductor laser 201*b* and a blue semiconductor laser 201*c* capable of effecting light modulation independently of one another. In the present embodiment, divergent beams of three colors emitted from the light source means 201 are converted into parallel beams by condensing lenses 202*a*, 202*b* and 202*c* corresponding thereto, and have their beam widths limited by aperture stops 203*a*, 203*b* and 203*c*. Thereafter, the three red, green and blue laser beams are combined into a white beam by a dichroic prism 208 which is beam combining means. The combined white beam is converted into a convergent beam having a desired degree of convergence, and becomes an incident beam incident on deflecting means 205.

The reference numeral 205 denotes deflecting means (two-dimensional deflecting means) constituted by a deflector having, for example, a reflecting surface and capable of resonating in a two-dimensional direction. It deflects the divergent beams of three colors emitted from the light source means 201 in a horizontal scanning direction (second scanning direction) and a vertical scanning direction (first scanning direction) by the deflector 205 to thereby deflect them in the two-dimensional direction. Here, the resonance frequency is set so as to be high in the horizontal scanning direction and low in the vertical scanning direction, and scanning lines are described in the horizontal scanning direction.

The reference numeral 206 designates a scanning optical system (two-dimensional scanning optical system) which has two first and second scanning mirrors 206*a* and 206*b*, and causes the deflected beam deflected in the two-dimensional direction by the deflecting means 205 to be imaged as a spot near a surface 107 to be scanned. Also, the two first and second scanning mirrors 206*a* and 206*b* are tilted (and shifted) only in the vertical scanning section, and in the vertical scanning direction, they are disposed so as to fold the optical path of the deflected beam.

The deflected beam deflected by the deflecting means 205 is directed onto the screen surface 107 as the surface to be scanned through the scanning optical system 206, and optically scans on the screen surface 107. Optical scanning is thus effected in the two-dimensional direction by the deflecting means 205, and a two-dimensional image is displayed on the screen surface 107.

Again in the present embodiment, as in the aforedescribed First Embodiment, in the vertical scanning direction in which the reference ray Lvc is inclinedly incident on the screen surface 107, the first scanning mirror 206a and the second scanning mirror 206b are tilted (and shifted) to thereby fold the optical path of the deflected beam.

Figure 15:
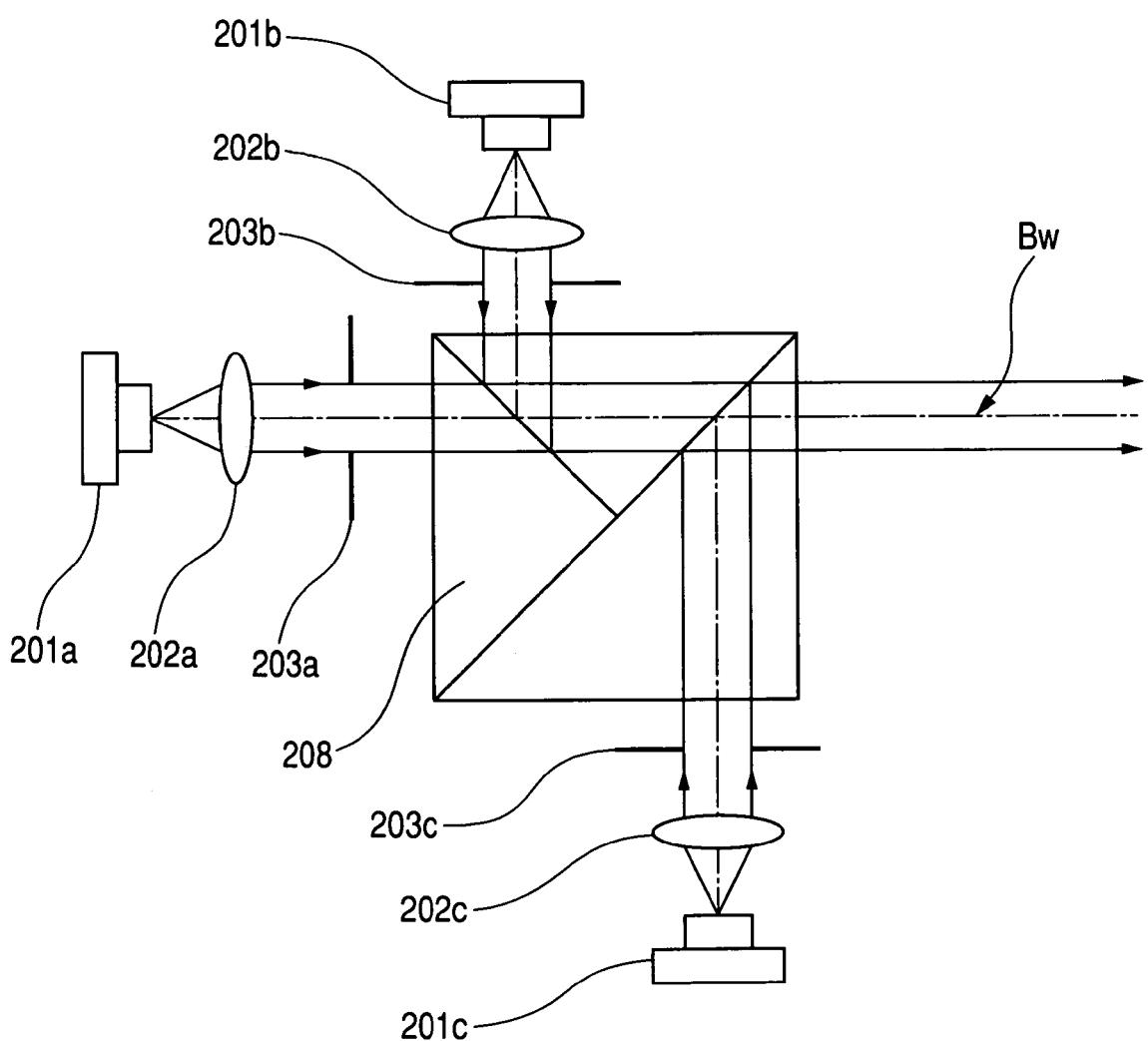
FIG. 15 is a schematic view of the essential portions of three color light sources for color display.

FIG. 15 is a schematic view of essential portions showing color combining means using the light sources of three colors for color display and a dichroic prism. In FIG. 15, the same elements as the elements shown in FIGS. 14A and 14B are given the same reference characters.

In FIG. 15, the divergent beam emitted from the green semiconductor laser 201a is converted into a substantially parallel beam by the collimator lens 202a, and has its beam width limited by the aperture stop 203a and is incident on the dichroic prism 208. The divergent beam emitted from the red semiconductor laser 201b is likewise converted into a parallel beam by the collimator lens 202b, and has its beam width limited by the aperture stop 203b and is incident on the dichroic prism 208. At this time, the green beam and the red beam are combined together by the dichroic prism 208, and a yellow beam is formed. The divergent beam emitted from the blue semiconductor laser 201c is likewise converted into a parallel beam by the collimator lens 202c, and has its beam width limited by the aperture stop 203c and is incident on the dichroic prism 208. The yellow beam and the blue beam are combined together to thereby form a white beam, which is directed to the deflecting means 205, not shown.

Figure 16:
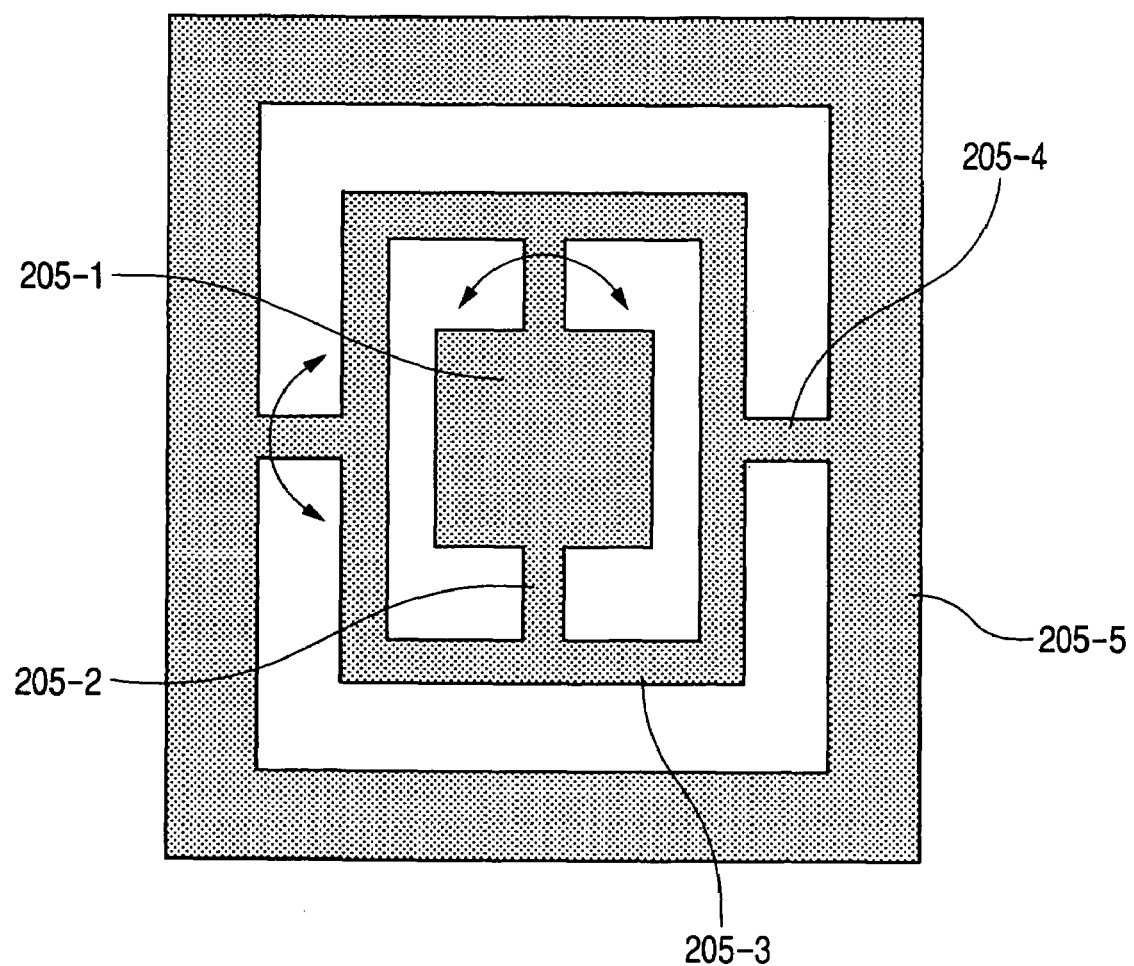
FIG. 16 is a schematic view of the essential portions of an MEMS device capable of resonating in a two-dimensional direction.

FIG. 16 is a schematic view of the essential portions of a deflector (MEMS device) capable of resonating in the two-dimensional direction.

In FIG. 16, a reflecting surface 205-1 is supported by a torsion bar 205-2, and is connected to an intermediate housing 205-3. Also, the intermediate housing 205-3 is supported by a torsion bar 205-4, and is connected to a housing 205-5. Here, the torsion bar 205-2 is distorted, whereby the reflecting surface 205-1 is deflected in the horizontal scanning direction, and the torsion bar 205-4 is distorted, whereby the reflecting surface 205-1 supported by the intermediate housing 205-3 is deflected in the vertical scanning direction. Thereby, the deflector 205 can deflect the reflecting surface 205-1 in the two-dimensional direction.

Again in the present embodiment, as in the aforedescribed First Embodiment, a scanning image is displayed on the screen surface 107 by the oblique projecting process. At this time, the reference ray Lvc is made incident on the screen surface 107 while being inclined by 15.9 (deg.) in the vertical scanning direction. The angle θvu at which the deflected beam Lvu arriving at the upper portion of the screen surface 107 is incident on the screen surface 107 is 29.44 (deg.), and the angle θv1 at which the deflected beam Lv1 arriving at the lower portion of the screen surface 107 is incident on the screen surface 107 is 0.00 (deg.).

Also, the beam emitted from the light source means 201 is obliquely incident on the reflecting surface of the two-dimensional deflector 205 at an incidence angle of 14 (deg.) in the vertical scanning direction, and widens its deflectable beam width as compared with the First Embodiment.

Thus, in the present embodiment, the scanning direction in which the reference ray Lvc is inclinedly incident on the screen surface 107 and the direction in which the reference ray Lvc is made obliquely incident on the deflector 205 are made into the same scanning direction, whereby it is made easy to correct the TV distortion and trapezoid distortion by the scanning optical system 206.

In the present embodiment, three red, green and blue laser beams are oscillated from the light source means 201, and light modulation is effected on the basis of respective image signals to thereby display a color image on the screen surface 107.

When the color image is to be displayed, there is the problem that color misregister occurs and deteriorates the quality of image. Particularly when the scanning optical system is constituted by only a plastic lens, the correction of chromatic aberration is difficult because the range of dispersion of plastics is narrow, and the problem of color misregister arises greatly. The scanning optical system 206 in the present embodiment, however, is constituted by the two first and second scanning mirrors 206a and 206b and therefore, chromatic aberration does not occur, and this leads to the merit that color misregister does not occur to the color image.

As described above, when in the present embodiment, use is made of the light source means 201 generating a plurality of beams, it is preferable to use a plurality of scanning mirrors 206a and 206b for the scanning optical system 206, and an image of high dignity free of color misregister can always be displayed. Further, by constituting the scanning optical system 206 by two scanning mirrors, it is possible to suppress the loss of the light amount very small. Also, the small number of parts leads to the achievement of a reduction in cost.

Table 4 below shows the construction of the scanning optical system 206 in the present embodiment.

TABLE 4

Construction of Scanning Optical System

| | | | | | | | | | surface vertex coordinates | | | | | |
| --- | --- | --- | --- | --- | --- | --- | --- | --- | --- | --- | --- | --- | --- | --- |
| | | | | | | | | | coordinates | | | inclination | | |
| lens | surface | surface shape | Ry | Rx | thickness | Nd | vd | | x | y | z | a | b | c |
| convergent light converting optical system 204 | incidence surface | spherical surface | 141.65 | 141.65 | | | | | | | | | | |
| | emergence surface | flat surface | flat | flat | 2.00 | 1.51633 | 64.1 | | | | | | | |

TABLE 4-continued

| | | | | | | | | | | |
|---|---|---|---|---|---|---|---|---|---|---|
| deflecting means 205 | reflecting surface | flat surface | flat | flat | | 0.00 | 0.00 | 0.00 | 8.28 | 0.00 | 0.00 |
| first scanning mirror 206a | reflecting surface | XY polynominal | flat* | flat* | | 0.00 | −0.22 | 18.47 | 63.22 | 0.00 | 0.00 |
| second scanning mirror 206b | reflecting surface | XY polynominal | flat* | flat* | | 0.00 | −17.73 | 27.80 | 55.45 | 0.00 | 0.00 |
| surface to be scanned 207 | | flat surface | flat | flat | | 0.00 | 72.31 | 315.55 | 0.00 | 0.00 | 0.00 |

The mark * is an aspherical surface shape, and indicates the radius of the base curved surface.

Aspherical Surface Coefficients

| lens | surface | surface shape | K | $C_{01}$ | $C_{20}$ | $C_{02}$ |
|---|---|---|---|---|---|---|
| first scanning mirror 206a | reflecting surface | XY polynominal surface | 0.0000E+00 | 8.6827E−02 | −1.9631E−03 | −2.9407E−03 |
| | | | $C_{04}$ −1.9872E−05 | $C_{41}$ 4.0299E−07 | $C_{23}$ −4.9616E−07 | $C_{05}$ 1.7403E−06 |
| lens second scanning mirror 206b | surface reflecting surface | surface shape XY polynominal surface | K 0.0000E+00 | $C_{01}$ −1.0334 − 02 | $C_{20}$ −2.7739E−03 | $C_{02}$ −6.6030E−03 |
| | | | $C_{04}$ −2.1636E−05 | $C_{41}$ 2.1434E−07 | $C_{23}$ 6.8655E−07 | $C_{05}$ 8.6432E−07 |
| | | | $C_{61}$ −4.0464E−10 | $C_{43}$ −5.3725E−10 | $C_{25}$ 3.6327E−10 | $C_{07}$ 7.4643E−12 |
| | | | $C_{08}$ −3.3572E−12 | | | |

| lens | surface | surface shape | $C_{21}$ | $C_{03}$ | $C_{40}$ | $C_{22}$ |
|---|---|---|---|---|---|---|
| first scanning mirror 206a | reflecting surface | XY polynominal surface | 7.7772E−07 | 1.0521E−04 | 1.0898E−05 | 1.3624E−05 |
| | | | $C_{60}$ −1.1123E−07 | $C_{42}$ −1.8619E−07 | $C_{24}$ 1.6588E−07 | $C_{06}$ −5.3654E−08 |
| lens second scanning mirror 206b | surface reflecting surface | surface shape XY polynominal surface | $C_{21}$ 2.7900E−08 | $C_{03}$ 2.6623E−04 | $C_{40}$ 1.4921E−06 | $C_{22}$ 1.5170E−09 |
| | | | $C_{60}$ 3.8584E−09 | $C_{42}$ −2.3298E−08 | $C_{24}$ −1.6699E−08 | $C_{06}$ −1.1011E−08 |
| | | | $C_{80}$ −3.1929E−11 | $C_{62}$ 2.5855E−11 | $C_{44}$ 1.9481E−11 | $C_{26}$ −1.8710E−12 |

Again in the scanning optical system 206 in the present embodiment, as in the aforedescribed First Embodiment, the two first and second scanning mirrors 206a and 206b are shifted and tilted in the vertical scanning direction. The reflecting surfaces thereof are of a non-rotation symmetrical shape symmetrical with respect to the reference axis BA in the horizontal scanning direction and asymmetrical in the vertical scanning direction. Thereby, in the present embodiment, the trapezoid distortion is corrected well even when oblique projection is effected.

Figure 17A:
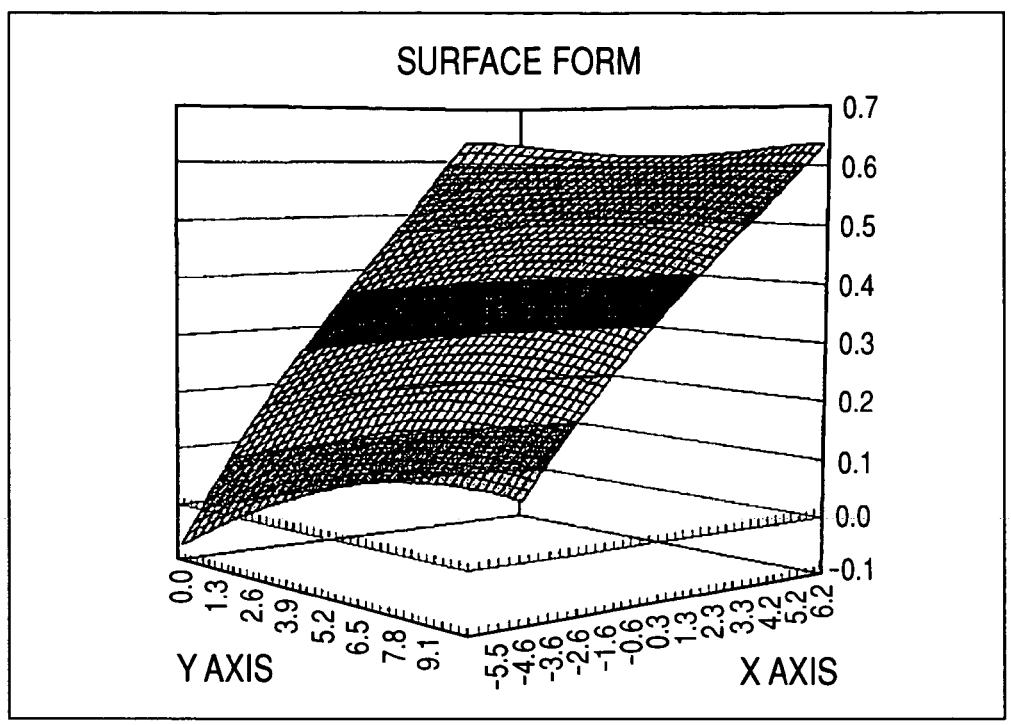
FIGS. 17A and 17B are illustrations of the shapes of scanning mirrors in Second Embodiment of the present invention.
Figure 17B:
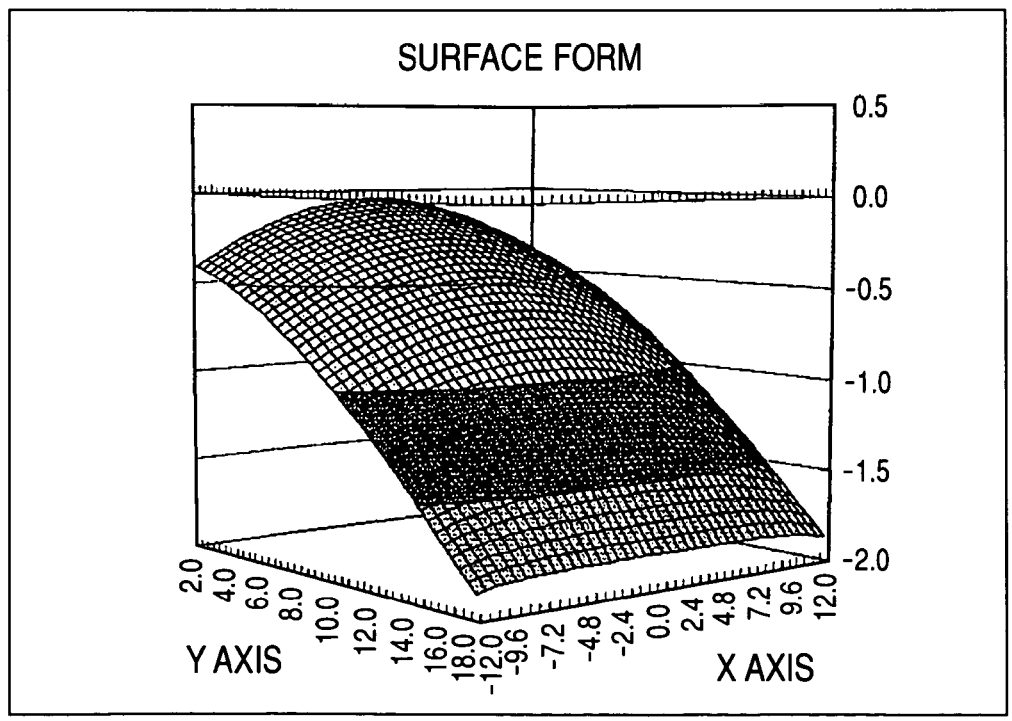

FIG. 17A is an illustration typically showing the shape of the first scanning mirror 206a, and FIG. 17B is an illustration typically showing the shape of the second scanning mirror 206b. The shape of the first scanning mirror 206a of FIG. 17A is a shape as it is viewed from the deflecting means 205 side, and the lower surface thereof is a reflecting surface. The shape of the second scanning mirror 206b of FIG. 17B is a shape as it is viewed from the deflecting means 205 side, and the upper surface thereof is a reflecting surface.

Figure 18A:
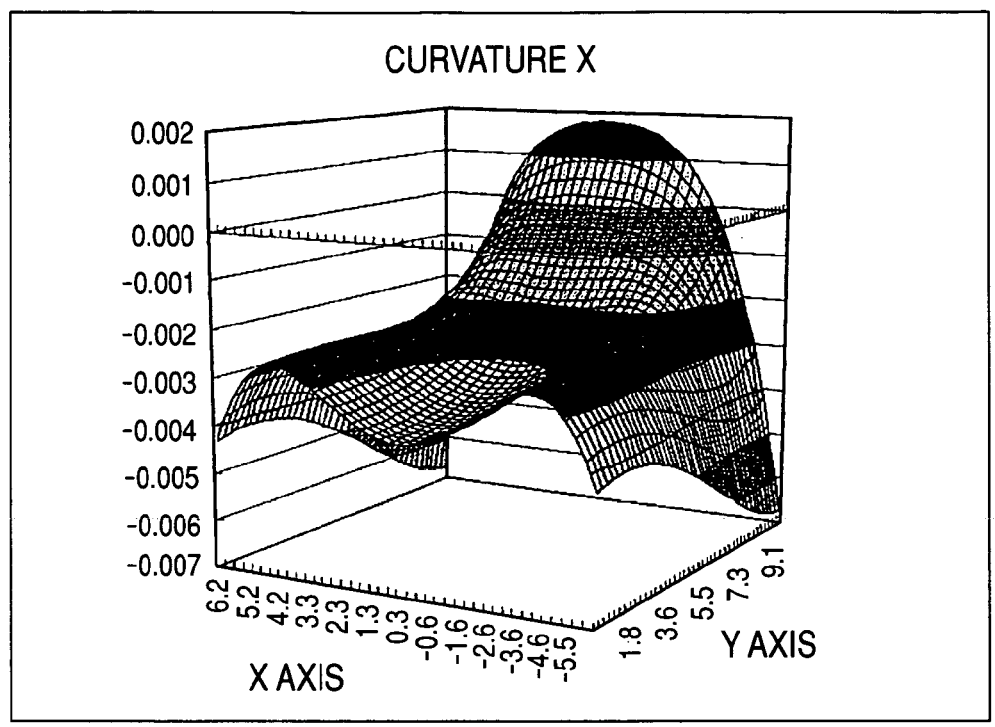
FIGS. 18A and 18B are illustrations of a change in the curvature of a first scanning mirror in Second Embodiment of the present invention.
Figure 18B:
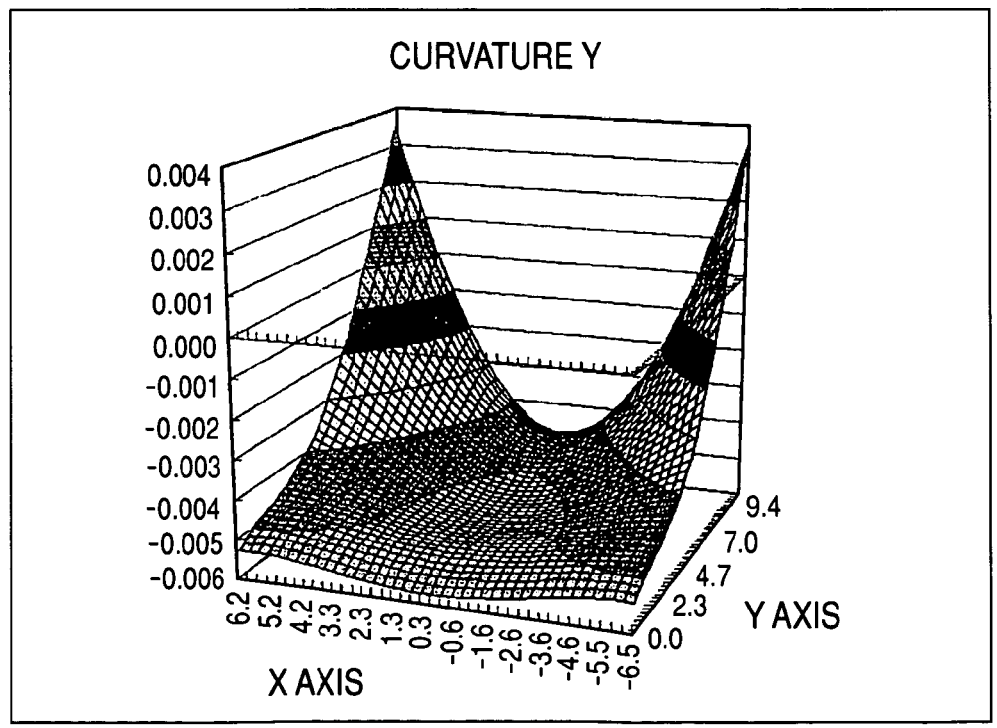

FIG. 18A is an illustration showing a change in the curvature of the first scanning mirror 206a in the horizontal scanning direction (the direction of the X-axis), and FIG. 18B is an illustration showing a change in the curvature of the first scanning mirror 206a in the vertical scanning direction (the direction of the Y-axis).

Figure 19A:
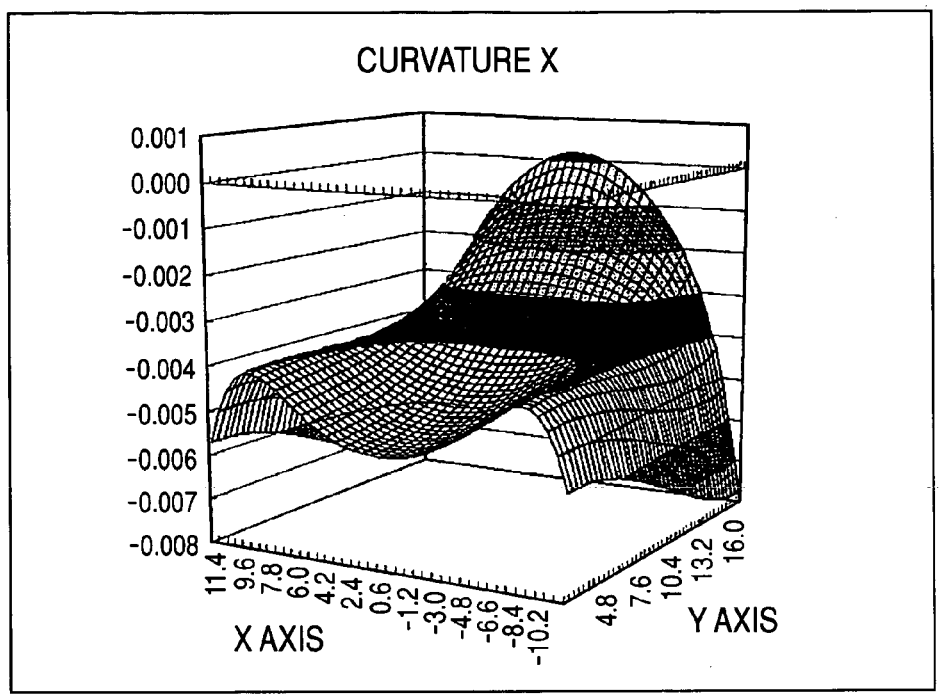
FIGS. 19A and 19B are illustrations of a change in the curvature of a second scanning mirror in Second Embodiment of the present invention.
Figure 19B:
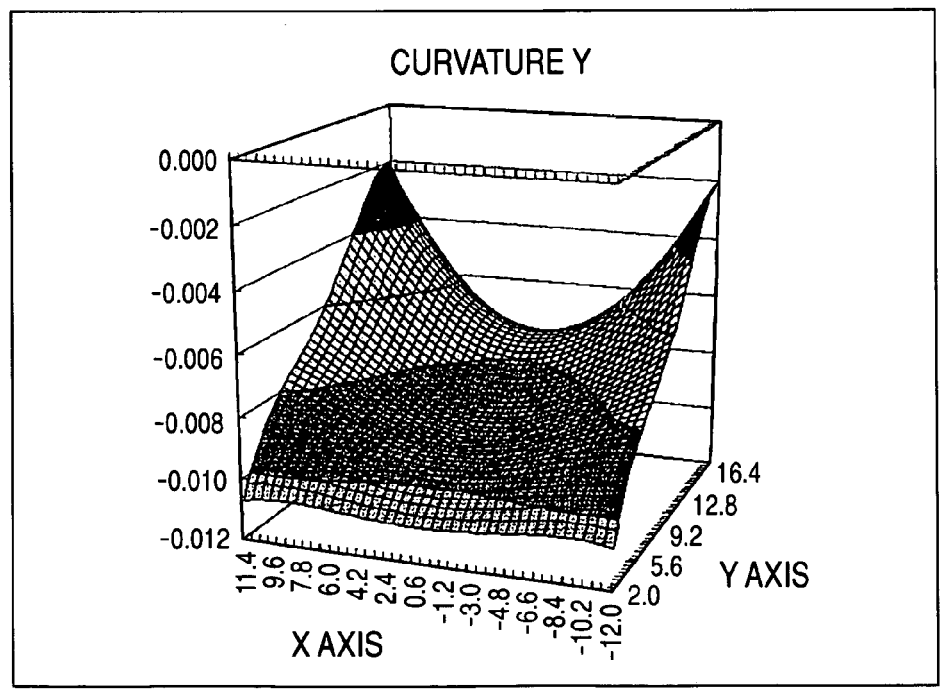

FIG. 19A is an illustration showing a change in the curvature of the second scanning mirror 206b in the horizontal direction (the direction of the X-axis), and FIG. 19B is an illustration showing a change in the curvature of the second scanning mirror 206b in the vertical scanning direction (the direction of the Y-axis).

Again in the present embodiment, as in the aforedescribed First Embodiment, the reflecting surfaces of the first and second scanning mirrors 206a and 206b are formed into a non-rotation symmetrical shape to thereby effect the correction of the TV distortion and trapezoid distortion.

Description will now be made of the surface shape of the first scanning mirror 206a.

The first scanning mirror 206a, in the vertical scanning section containing the reference axis BA, is negative in the curvature thereof in the vertical scanning direction (the direction of the Y-axis), and the shape of the reflecting surface thereof is a concave surface, and it has positive power. In the vertical scanning section containing the reference axis BA, the curvature in the horizontal scanning direction (the direction of the X-axis), when it moves along the vertical scanning direction, changes and the shape of the reflecting surface is also deformed from the concave surface to a flat surface, and is further deformed to a convex surface. That is, the reflecting surface of the first scanning mirror 206a is a curvature monotonously changing anamorphic surface of which the curvature monotonously increases from small to great (or decreases from great to small) from one end to the other thereof end in the vertical scanning direction.

Description will now be made of the surface shape of the second scanning mirror 206b.

The second scanning mirror 206b, in the vertical scanning section containing the reference axis BA, is negative in the curvature thereof in the vertical scanning direction (the direction of the Y-axis), and the shape of the reflecting surface thereof is a convex surface, and it has negative power. In the vertical scanning section containing the reference axis BA, the curvature in the horizontal scanning direction (the direction of the X-axis), when it moves along the vertical scanning direction, changes from negative to positive, and the shape of the reflecting surface is also deformed from the convex surface to a flat surface, and is further deformed to a concave surface. That is, the reflecting surface of the second scanning mirror 206b is a curvature monotonously changing anamorphic surface of which the curvature monotonously increases from small to great (or decreases from great to small) from one end to the other end thereof in the vertical scanning direction. Thereby, in the present embodiment, the TV distortion and trapezoid distortion are corrected well.

The scanning optical system 206 in the present embodiment is such that a side on which the curvature of the first scanning mirror 206a in the horizontal scanning direction in the vertical scanning section containing the reference axis BA is great and a side on which the curvature of the second scanning mirror 206b in the horizontal scanning direction in the vertical scanning section containing the reference axis BA is great are arranged properly in the same direction in the vertical scanning direction. Therefore, design is made such that the beam reflected by the convex surface of the first scanning mirror 206a is reflected by a concave surface in the second scanning mirror 206b, and the beam reflected by the concave surface of the first scanning mirror 206a is reflected by a convex surface in the second scanning mirror 206b, and the correcting effect for the TV distortion and trapezoid distortion is made great.

Figure 20:
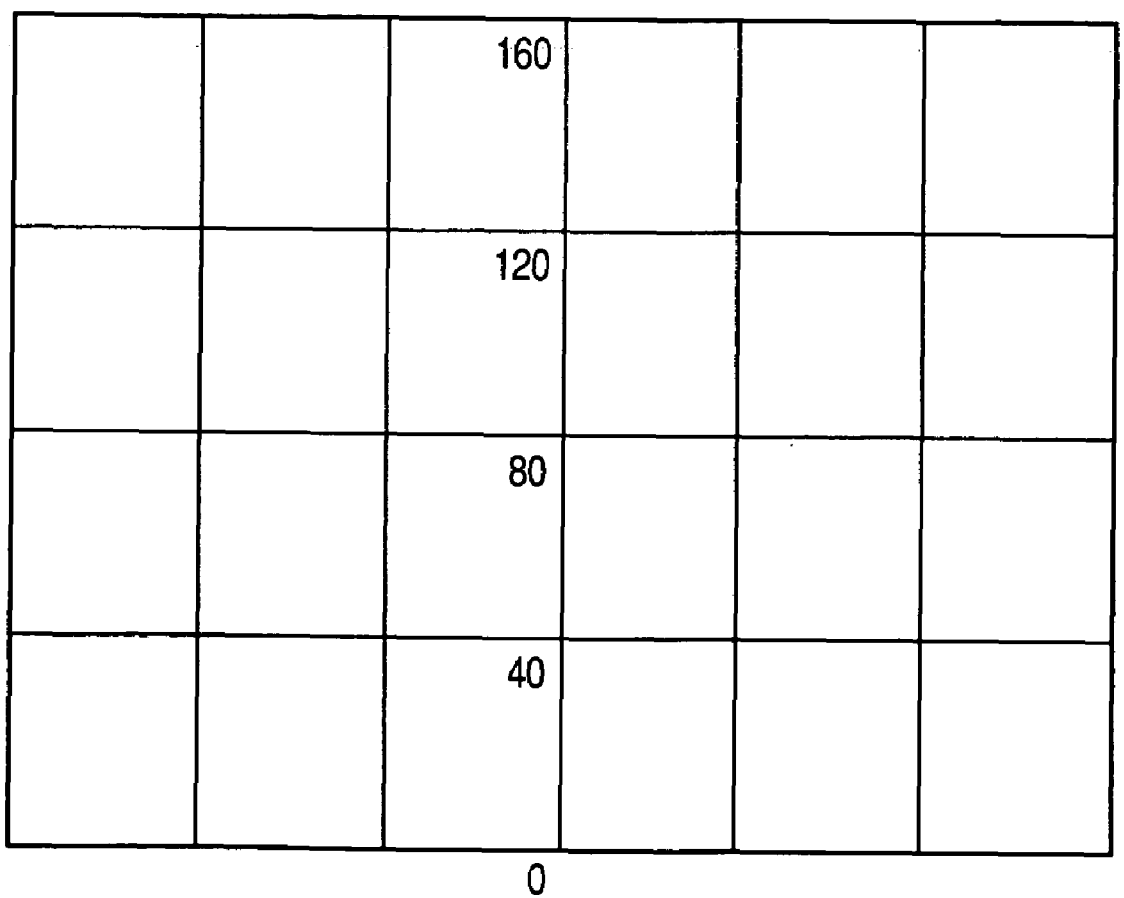
FIG. 20 is an illustration of a scanning image (grating) in Second Embodiment of the present invention.

FIG. 20 is an illustration showing a scanning image (grating) in the two-dimensional scanning apparatus according to the present embodiment. Table 5 below shows the values of the TV distortion and trapezoid distortion.

TABLE 5

|  | TV Dist. | Trapezoid Dist. |  |
| --- | --- | --- | --- |
| Upper side | 0.21 | 0.00 | (%) |
| Lower side | 0.04 | 0.00 | (%) |
| Left side | 0.06 | 0.05 | (%) |
| Right side | −0.06 | −0.05 | (%) |

As shown in FIG. 20, in the two-dimensional scanning apparatus according to the present embodiment, the TV distortion and trapezoid distortion are corrected well by the use of the aforedescribed scanning optical system 206.

The TV distortion is corrected into a very small curvature in which the upper side is 0.21(%), the lower side is 0.04(%), and the right side and the left side are 0.06(%). Also, the trapezoid distortion is corrected into very small distortion in which the upper side and the lower side are 0.00(%), the right side is 0.05(%) and the left side is −0.05(%). By thus using the aforedescribed scanning optical system 206, it is possible to correct the TV distortion and trapezoid distortion of the scanning image well, and always display an image of high dignity on the surface 107 to be scanned.

Even when as in the present embodiment, a deflector 205 capable of deflecting in the two-dimensional direction is used as the deflecting means, the oblique projecting process is adopted and at least two non-rotation symmetrical reflecting surfaces are provided, whereby the TV distortion and trapezoid distortion of the scanning image can be corrected well.

Also, when the incident beam from the light source means 201 is made to be incident on the reflecting surface of the deflector 205, the incident beam is made obliquely incident on the reflecting surface of the deflector 205 from the same scanning direction as the scanning direction in which the beam is made obliquely incident on the screen surface 107, whereby the TV distortion and trapezoid distortion of the scanning image can be corrected better by the scanning optical system 206.

Again in the present embodiment, the direction of oblique incidence is the vertical scanning direction, and when viewed in the optical path from the deflector 205 to the scanning optical system 206, the incident beam is made obliquely incident on the deflector 205 from a side (the lower side in FIG. 14B) on which the deflected beam which is small in the incidence angle onto the screen surface 107 in contrast with the reference beam Lvc passes. Thereby, the TV distortion is corrected still better.

In the present embodiment, as in the aforedescribed First Embodiment, oblique projection in which in the vertical scanning direction, the reference beam Lvc is inclinedly incident on the screen surface 107 is effected, and the vertical scanning direction is a first scanning direction. That is, the angle of view in the vertical scanning direction is $\theta_{d1}=19.86$ (deg.), the angle of view in the horizontal scanning direction (second scanning direction) is $\theta_{d2}=37.80$ (deg.), the width of the displayed image in the vertical scanning direction is Wi1=176.99 (mm), and the width thereof in the horizontal scanning direction is Wi2=239.70 (mm), and $$\frac{\theta_{d1}}{\theta_{d2}} = 0.712 \times \frac{Wi1}{Wi2},$$

and this satisfies the aforementioned conditional expression (1).

As described above, in the present embodiment, the angle of view in the vertical scanning direction which is the first scanning direction is set small to thereby achieve the downsizing of the scanning optical system 206 and also, the angle of view in the vertical scanning direction is set to a small ratio relative to the horizontal scanning direction which is the second scanning direction to thereby set the substantial focal length in the vertical scanning direction short, and facilitate the correction of the TV distortion and trapezoid distortion of the scanning image.

When as in the aforedescribed First Embodiment, the width of the scanning optical system 206 in the horizontal scanning direction is defined as Dx, and the width thereof in the vertical scanning direction is defined as Dy, and the width thereof in the direction of the Z-axis perpendicular to the horizontal scanning direction and the vertical scanning direction is defined as Dz, Dx=23.72 (mm)

Dy=21.29 (mm)

Dz=16.27 (mm), and these satisfy all of the aforementioned conditional expressions (2), (3) and (4).

Further, when as in the aforedescribed First Embodiment, the distance in the direction of the Z-axis from the deflector 205b of the deflecting means 205 which is nearest to the surface 107 to be scanned to the position of the scanning optical system 206 which is nearest to the surface to be scanned is defined as Ld, Ld=26.05 (mm), and this satisfies the aforementioned conditional expression (5).

In the present embodiment, these conditional expressions are satisfied, whereby the two-dimensional scanning apparatus becomes very compact, and this leads to the merit that the scanning type image displaying apparatus carrying this two-dimensional scanning apparatus thereon can be downsized.

As described above, in the two-dimensional scanning apparatus according to the present embodiment, the scanning optical system 206 is constituted by the two scanning mirrors 206a and 206b and therefore, chromatic aberration does not occur, and even when use is made of the light source means 201 emitting beams of a plurality of wavelengths, there can always be displayed a color image free of color misregister.

Even if as the semiconductor laser used in the light source means 201, use is made, for example, of a wavelength converting laser which makes a laser beam emitted from an infrared semiconductor laser incident on an optical crystal having polarization inverting structure attached thereto and converts the wavelength thereof into a half and generates green and blue laser beams, the present invention can sufficiently obtain an effect similar to that of the above-described embodiment.

Third Embodiment

Figure 21:
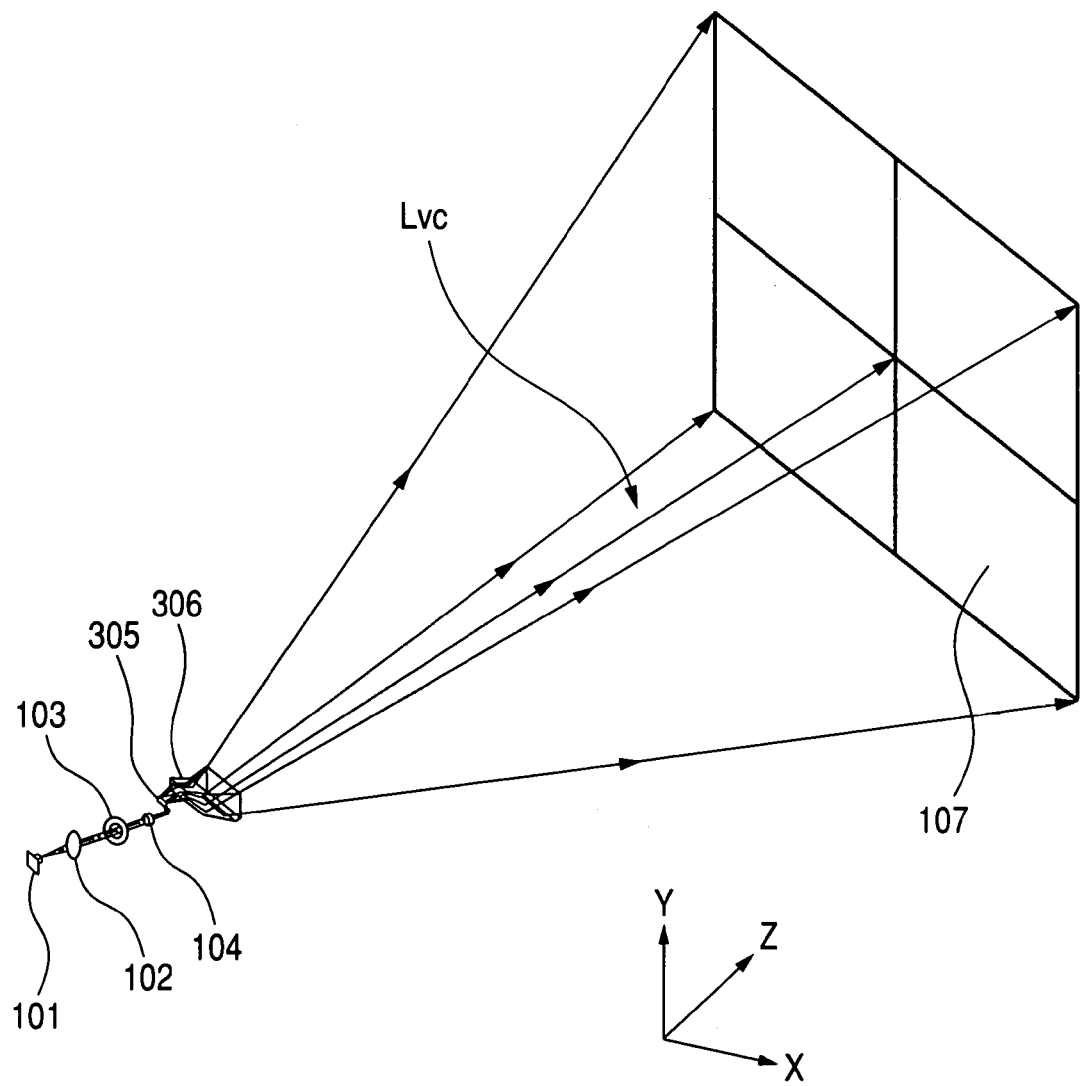
FIG. 21 is a perspective view of the essential portions of a two-dimensional scanning apparatus according to Third Embodiment of the present invention.
Figure 22A:
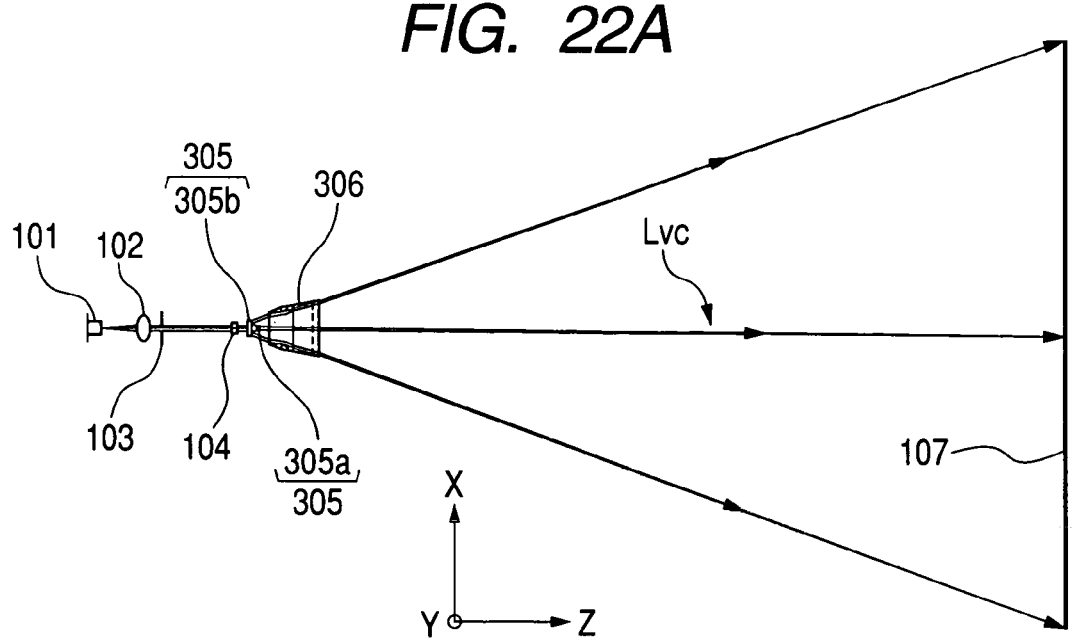
FIGS. 22A and 22B are cross-sectional views of the essential portions of the two-dimensional scanning apparatus according to Third Embodiment of the present invention.
Figure 22B:
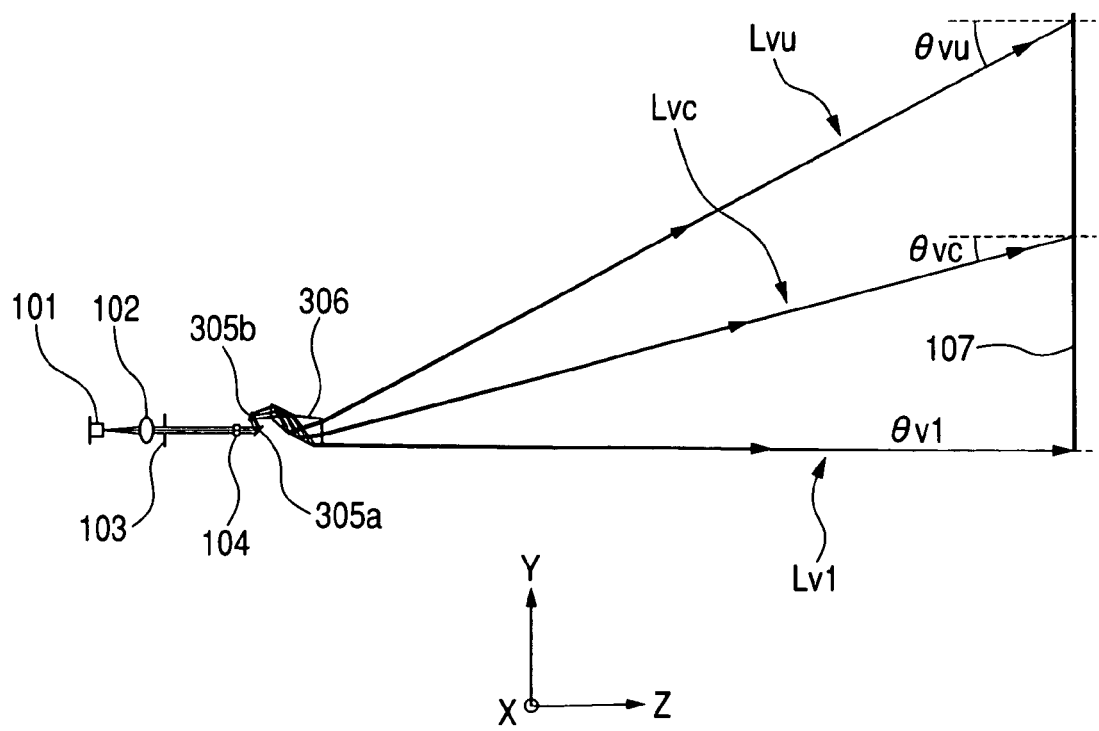

FIG. 21 is a perspective view of the essential portions of a two-dimensional scanning apparatus according to Third Embodiment of the present invention. FIG. 22A is a horizontal scanning sectional view of the two-dimensional scanning apparatus according to the Third Embodiment of the present invention, and FIG. 22B is a vertical scanning sectional view of the two-dimensional scanning apparatus according to The Third Embodiment of the present invention. In FIGS. 21, 22A and 22B, the same elements as the elements shown in FIGS. 2A and 2B are given the same reference characters.

The difference of the present embodiment from the aforedescribed First Embodiment is that the scanning optical system is constituted by a single prism 306 including at least two reflecting surfaces of a non-rotation symmetrical shape. In the other points, the construction and optical action of the present embodiment are substantially similar to those of First Embodiment, whereby a similar effect is obtained.

That is, in FIGS. 21, 22A and 22B, the reference numeral 306 designates the scanning optical system which comprises a prism of which the four surfaces are formed integrally with one another, and causes a deflected beam deflected in a two-dimensional direction by deflecting means 305 to be imaged as a spot near a surface 107 to be scanned.

In the present embodiment, a divergent beam emitted from light source means 101 is converted into a parallel beam by a condensing lens 102, and has its beam width limited by an aperture stop 103. The beam passed through the aperture stop 103 is converted into a convergent beam having a desired degree of convergence by a convergent light converting optical system 104, and becomes an incident beam incident on the deflecting means 305.

The reference numeral 305 denotes the deflecting means (two-dimensional deflecting means) constituted by a first deflector 305a and a second deflecting mirror 305b each having a reflecting surface and capable of resonating in a one-dimensional direction as in the aforedescribed First Embodiment, and a second deflecting mirror 305b. The beam emitted from the light source means 101 is deflected in a horizontal scanning direction by the first deflector 305a, and the deflected beam from the first deflector 305a is deflected in a vertical scanning direction, whereby the incident beam emitted from the light source means 101 is deflected in a two-dimensional direction by the deflecting means 305.

The deflected beam deflected by the deflecting means 305 is then directed onto a screen surface 107 as the surface to be scanned through the scanning optical system 306, and optically scans on the screen surface 107. As described above, the beam is optically scanned at a high speed in the horizontal scanning direction by the first deflector 305a and describes a scanning line, and is optically scanned at a low speed in the vertical scanning direction by the second deflector 305b to thereby display a two-dimensional image on the screen surface 107.

Again in the present embodiment, as in the aforedescribed First and Second Embodiments, the reference beam Lvc is inclinedly incident on the screen surface 107, and the incidence angle thereof is 15.3 (deg.). Also, the incidence angle θvu of the deflected beam Lvu arriving at the upper portion of the screen surface 107 is 26.64 (deg.), and the incidence angle θvl of the deflected beam Lvl arriving at the lower portion of the screen surface 107 is 0.00 (deg.).

Figure 23:
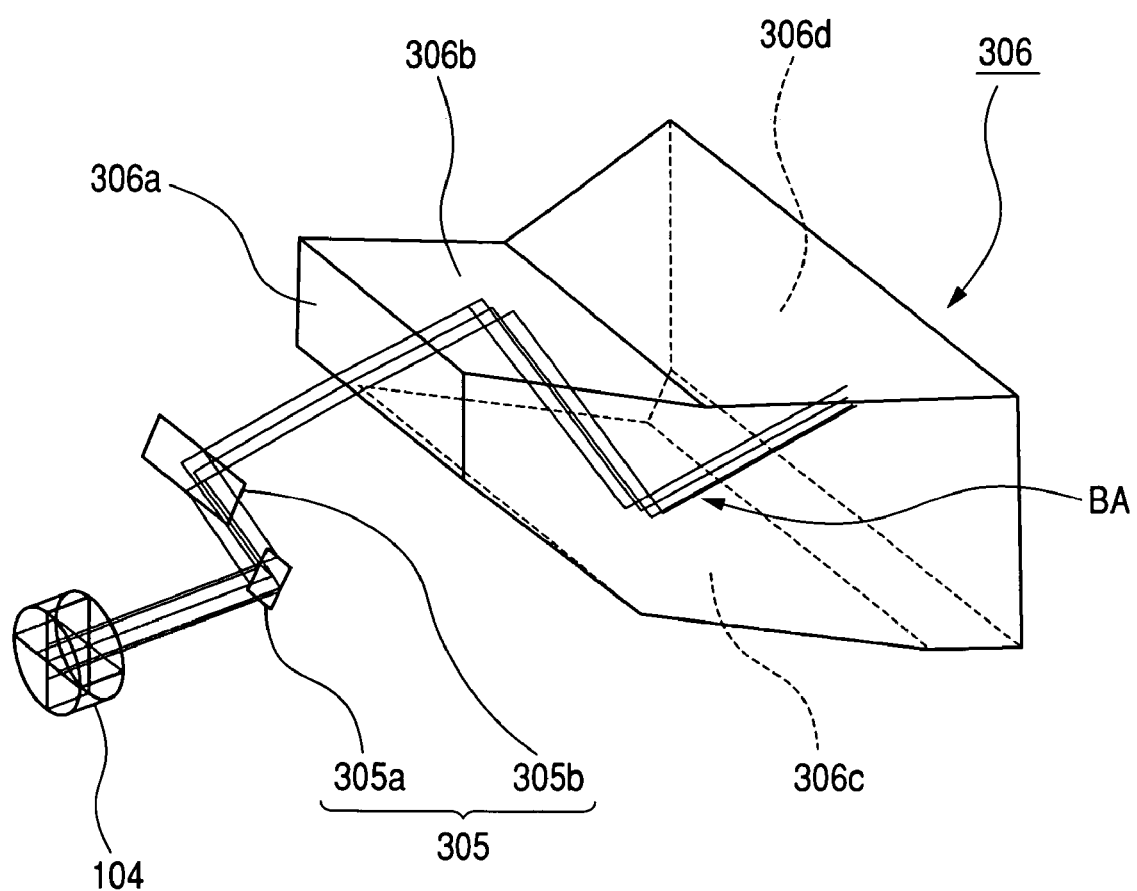
FIG. 23 is a schematic view of the essential portions of a scanning optical system in Third Embodiment of the present invention.

FIG. 23 is a schematic view of the essential portions of the two-dimensional scanning apparatus according to the present embodiment. In FIG. 23, the same elements as the elements shown in FIGS. 22A and 22B are given the same reference characters.

In the present embodiment, as described above, the scanning optical system is constituted by a single prism 306. The prism 306 is constructed with its four surfaces, i.e., an incidence surface 306a (refractive surface), two first and second reflecting surfaces 306b and 306c, and an emergence surface 306d (refractive surface) formed integrally with one another. The deflected beam deflected by the deflecting means 305 enters from the incidence surface 306a into the interior of the prism 306, and is internally reflected by the first reflecting surface 306b, and is internally reflected by the second reflecting surface 306c, and thereafter emerges from the emergence surface 306d and is directed onto the screen surface 107.

Table 6 below shows the construction of the prism 306 which is the scanning optical system in the present embodiment.

TABLE 6

Construction of Scanning Optical System

| lens | surface | surface shape | Ry | Rx | thickness | Nd | vd | coordinates x | y | z | inclination a | b | c |
|---|---|---|---|---|---|---|---|---|---|---|---|---|---|
| convergent light converting optical system 304 | incidence surface | spherical surface | 85.22 | 85.22 | 2.00 | 1.51633 | 64.1 | | | | | | |
| | emergence surface | flat surface | flat | flat | | | | | | | | | |
| first deflector 305a | reflecting surface | flat surface | flat | flat | | | | 0.00 | −6.06 | 3.50 | −30.00 | 0.00 | 0.00 |
| second deflector 305b | reflecting surface | flat surface | flat | flat | | | | 0.00 | 0.00 | 0.00 | 24.24 | 0.00 | 0.00 |
| prism 306 | incidence surface 306a | XY polynominal | flat* | flat* | | 1.52500 | 55.5 | 0.00 | −0.53 | 8.46 | −0.01 | 0.00 | 0.00 |
| | first reflecting surface 306b | XY polynominal | flat* | flat* | | | | 0.00 | −0.56 | 19.37 | 64.18 | 0.00 | 0.00 |
| | second reflecting surface 306c | XY polynominal | flat* | flat* | | | | 0.00 | −15.04 | 31.91 | 60.17 | 0.00 | 0.00 |
| | emergence surface 306d | XY polynominal | flat* | flat* | | | | 0.00 | −0.56 | 19.37 | 64.18 | 0.00 | 0.00 |
| surface to be scanned 307 | | flat surface | flat | flat | | | | 0.00 | 76.55 | 336.78 | 0.00 | 0.00 | 0.00 |

The mark * is an aspherical surface shape, and indicates the radius of the base curved surface.

Aspherical Surface Coefficients

| lens | surface | surface shape | K | $C_{01}$ | $C_{20}$ | $C_{02}$ |
|---|---|---|---|---|---|---|
| prism 306 | incidence surface 306a | XY polynominal surface | 0.0000E−00 | −4.9078E−03 | −3.0579E−04 | 2.0805E−04 |
| | | | $C_{04}$ −9.8480E−07 | | | |
| prism 306 | first reflecting surface 306b | XY polynominal surface | 0.0000E+00 | 2.3385E−02 | −1.8820E−03 | −2.6290E−03 |
| | | | $C_{04}$ −2.2290E−05 | $C_{41}$ 3.5617E−07 | $C_{23}$ 1.3276E−06 | $C_{05}$ 1.7842E−06 |
| prism 306 | second reflecting surface 306c | XY polynominal surface | 0.0000E+00 | 1.1061E−02 | −4.7273E−03 | −6.3456E−03 |
| | | | $C_{04}$ −1.8197E−05 | $C_{41}$ −3.9048E−07 | $C_{23}$ 7.5083E−07 | $C_{05}$ 6.8958E−07 |
| | | | $C_{80}$ 8.4331E−12 | | | |
| prism 306 | emergence surface 306d | XY polynominal surface | 0.0000E+00 | 2.3385E−02 | −1.8820E−03 | 2.6290E−03 |
| | | | $C_{04}$ −2.2290E−05 | $C_{41}$ −3.5617E−07 | $C_{23}$ 1.3276E−06 | $C_{05}$ 1.7842E−06 |

| lens | surface | surface shape | $C_{21}$ | $C_{03}$ | $C_{40}$ | $C_{22}$ |
|---|---|---|---|---|---|---|
| prism 306 | incidence surface 306a | XY polynominal surface | 2.3506E−05 | 1.9737E−06 | 4.4642E−06 | 1.9930E−06 |
| prism 306 | first reflecting surface 306b | XY polynominal surface | 1.8943E−04 | 1.4589E−04 | 4.6822E−07 | 5.7944E−06 |
| | | | $C_{60}$ −4.6462E−09 | $C_{42}$ −6.7877E−08 | $C_{24}$ −1.9039E−08 | $C_{06}$ −5.1074E−08 |
| prism 306 | second reflecting surface 306c | XY polynominal surface | 1.8798E−04 | 2.7231E−04 | 6.2609E−07 | −3.3481E−06 |
| | | | $C_{60}$ 1.6046E−09 | $C_{42}$ −3.9766E−09 | $C_{24}$ −1.3247E−08 | $C_{06}$ −1.0075E−08 |
| prism 306 | emergence surface 306d | XY polynominal surface | 1.8943E−04 | 1.4589E−04 | 4.6822E−07 | 5.7944E−06 |
| | | | $C_{60}$ −4.6462E−09 | $C_{42}$ −6.7877E−08 | $C_{24}$ −1.9039E−8 | $C_{06}$ −5.1074E−08 |

Each surface of the prism 306 adopts a free curved surface expressed by the aforementioned expression (A), and is formed by a non-rotation symmetrical surface shape symmetrical with respect to the reference axis BA in the horizontal scanning direction, and asymmetrical in the vertical scanning direction. Also, each surface is given shift and tilt in the vertical scanning direction, and is disposed so as to fold the optical path of the deflected beam in the vertical scanning direction.

As in the present embodiment, the oblique projecting process is adopted, and two non-rotation symmetrical reflecting surfaces 306b and 306c are provided, and are disposed so as to fold the optical path of the deflected beam in the scanning direction in which the beam is made obliquely incident, whereby the TV distortion and trapezoid distortion of the scanning image can be corrected well.

Also, when the beam emitted from the light source means 101 is to be made incident on the reflecting surface of the first deflector 305a, it is made obliquely incident on the reflecting surface of the first deflector 305 from the same scanning direction as the scanning direction in which it was made obliquely incident on the screen surface 107, whereby the TV distortion and trapezoid distortion of the scanning image can be corrected well by the scanning optical system 306. The angle of oblique incidence is 30 (deg.).

Again in the present embodiment, as in the aforedescribed First and Second Embodiments, the direction of oblique incidence is the vertical scanning direction, and when viewed in the optical path from the deflecting means 305 to the scanning optical system 306, the incident beam is made obliquely incident on the first deflector 305a from a side (the lower side in FIG. 22B) on which the deflected beam Lv1 which is small in the incidence angle onto the screen surface 107 in contrast with the reference beam Lvc passes. Thereby, the TV distortion is corrected better.

Figure 24A:
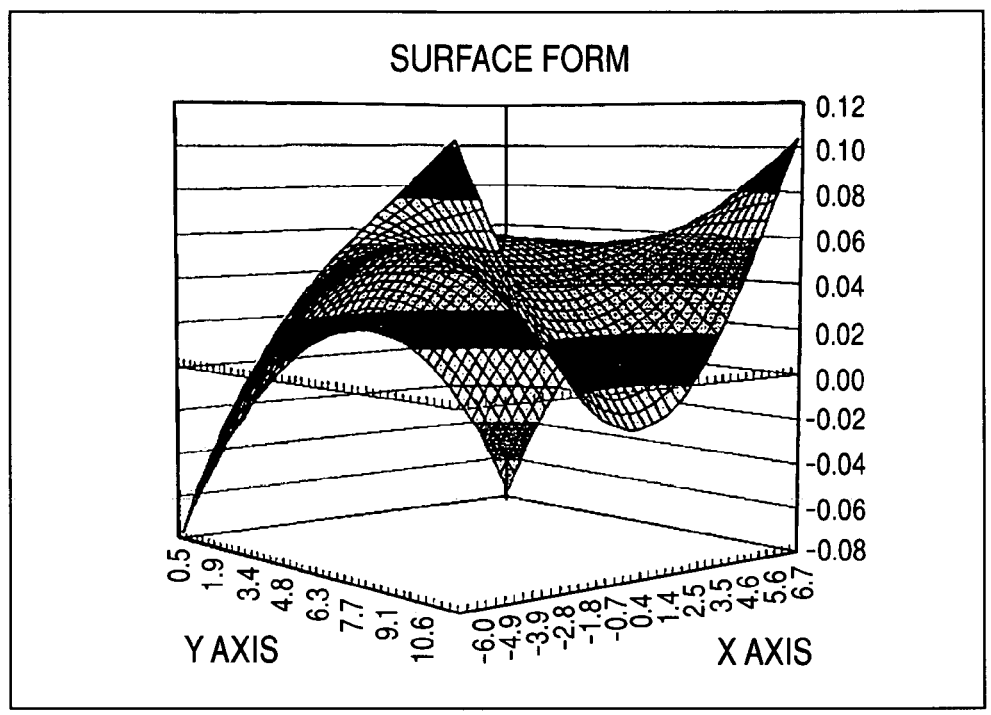
FIGS. 24A and 24B are illustrations of the shapes of scanning mirrors in Third Embodiment of the present invention.
Figure 24B:
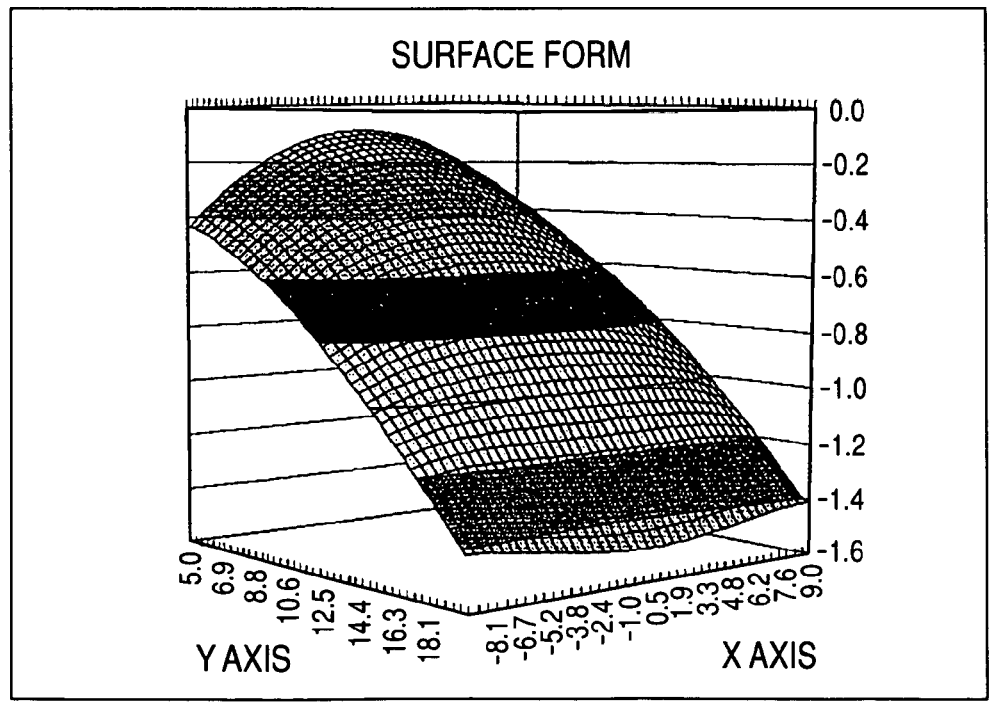
Figure 25A:
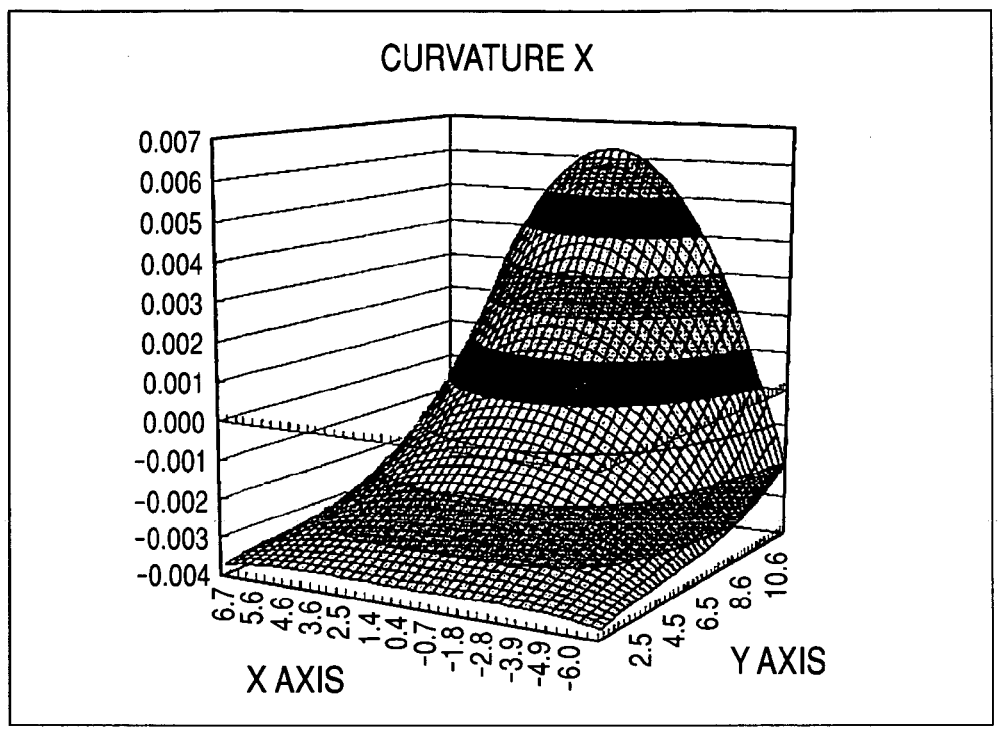
FIGS. 25A and 25B are illustrations of a change in the curvature of a first reflecting surface of a prism in Third Embodiment of the present invention.
Figure 25B:
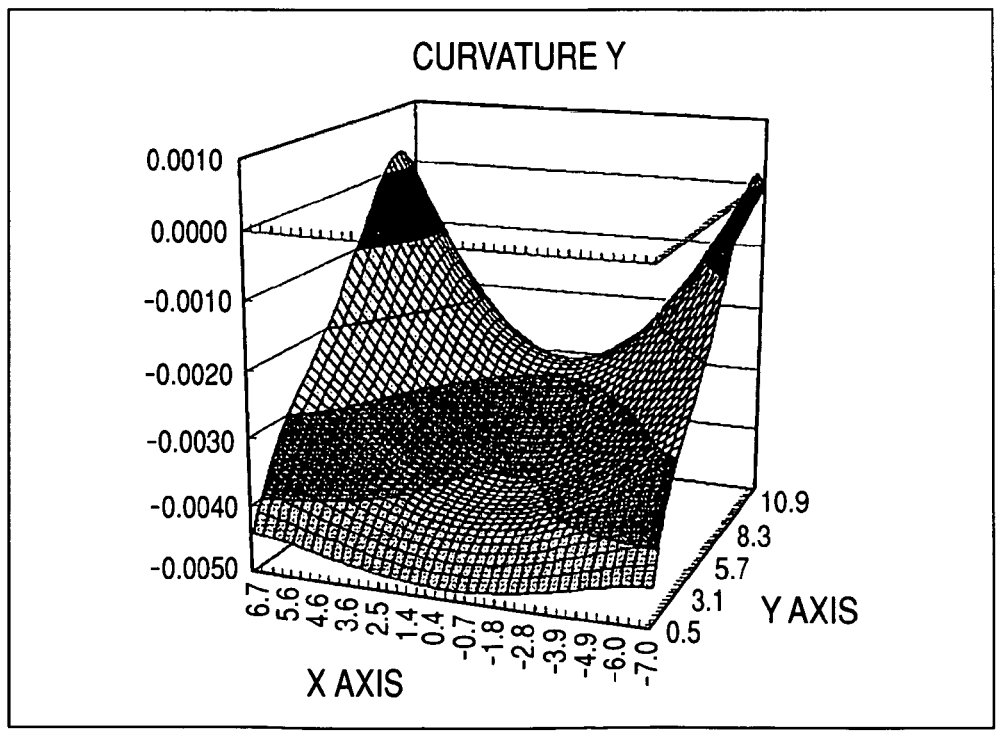

FIG. 24A is an illustration showing the shape of the first reflecting surface 306b of the prism 306, and FIG. 24B is an illustration showing the shape of the second reflecting surface 306c of the prism 306. FIG. 25A is an illustration showing the state of a change in the curvature of the first reflecting surface 306b of the prism 306 in the horizontal scanning direction, and FIG. 25B is an illustration showing the state of a change in the curvature of the first reflecting surface 306b of the prism in the vertical scanning direction.

Description will now be made of the shape of the first reflecting surface 306b of the prism 306.

The first reflecting surface 306b of the prism 306 is an anamorphic surface of which the curvature in the horizontal scanning direction and the curvature in the vertical scanning direction differ from each other. Also, it is a curvature monotonously changing anamorphic surface of which the curvature in the horizontal scanning direction gradually changes from one end thereof to the other end in the vertical scanning direction.

In the vertical scanning section containing the reference axis BA, the curvature in the vertical scanning direction (the direction of the Y-axis) is negative, and the shape of the reflecting surface is a concave surface, and it has positive power. In the vertical scanning section containing the reference axis BA, the curvature in the horizontal scanning direction (the direction of the X-axis), when it moves along the vertical scanning direction, changes from negative to positive, and the shape of the reflecting surface is also deformed from the concave surface to a flat surface, and is further deformed to a convex surface. That is, the first reflecting surface 306b is a curvature monotonously changing anamorphic surface of which the curvature in the horizontal scanning direction monotonously changes from small to great (or from great to small) when it moves from one end of the reflecting surface 306b in the vertical scanning direction to the other end thereof. Therefore, the shape of the reflecting surface in the first scanning direction is an anamorphic surface which is of an asymmetrical shape with respect to the reference axis and differs in curvature between the first scanning direction and the second scanning direction, and it is formed by a non-rotation symmetrical surface.

Figure 26A:
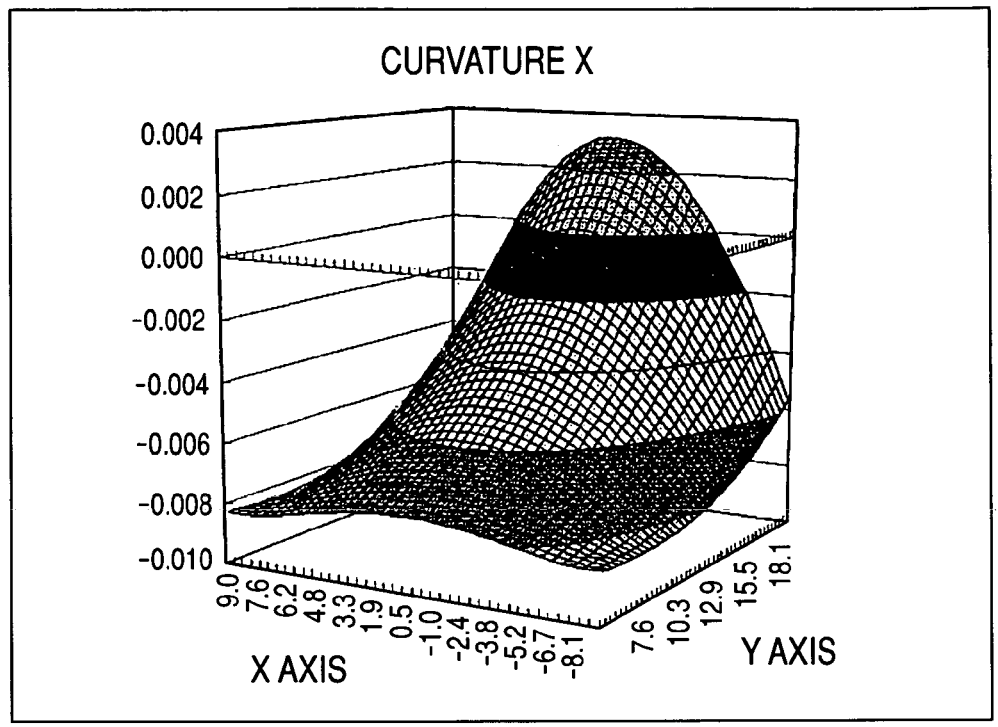
FIGS. 26A and 26B are illustrations of a change in the curvature of a second reflecting surface of the prism in Third Embodiment of the present invention.
Figure 26B:
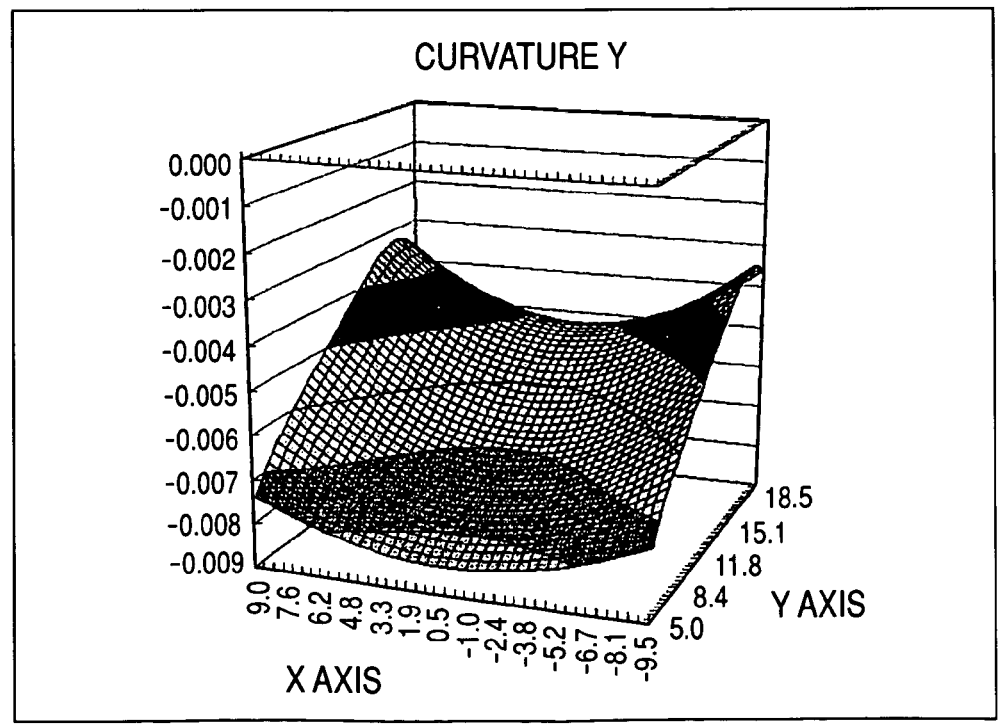

FIG. 26A is an illustration showing the state of a change in the curvature of the second reflecting surface 306c of the prism 306 in the horizontal scanning direction, and FIG. 26B is an illustration showing the state of a change in the curvature of the second reflecting surface 306c of the prism 306 in the vertical scanning direction.

Description will now be made of the shape of the second reflecting surface 306c of the prism 306.

The second reflecting surface 306c of the prism 306 is also a curvature monotonously changing anamorphic surface. In the vertical scanning section containing the reference axis BA, the curvature in the vertical scanning direction (the direction of the Y-axis) is negative, and the shape of the reflecting surface is a convex surface, and it has negative power.

In the vertical scanning section containing the reference axis BA, the curvature in the horizontal scanning direction, when it moves along the vertical scanning direction, changes from negative to positive, and the shape of the reflecting surface is also deformed from the convex surface to a flat surface, and is further deformed to a concave surface. That is, the second reflecting surface 306c is a curvature monotonously changing anamorphic surface in which the curvature of the reflecting surface 306c in the horizontal scanning direction monotonously changes from negative to positive when it moves from one end thereof in the vertical scanning direction to the other end thereof.

In the present embodiment, the deflected beam deflected by the deflecting means 305 is reflected between the first reflecting surface 306b and the second reflecting surface 306c and is directed onto the surface 107 to be scanned. Therefore, the first reflecting surface 306b becomes a downwardly facing reflecting surface, whereas the second reflecting surface 306c becomes an upwardly facing reflecting surface. Therefore, even if the curvature is the same positive, the first reflecting surface 306b represents a convex surface shape, and the second reflecting surface 306c represents a concave surface shape.

Figure 27:
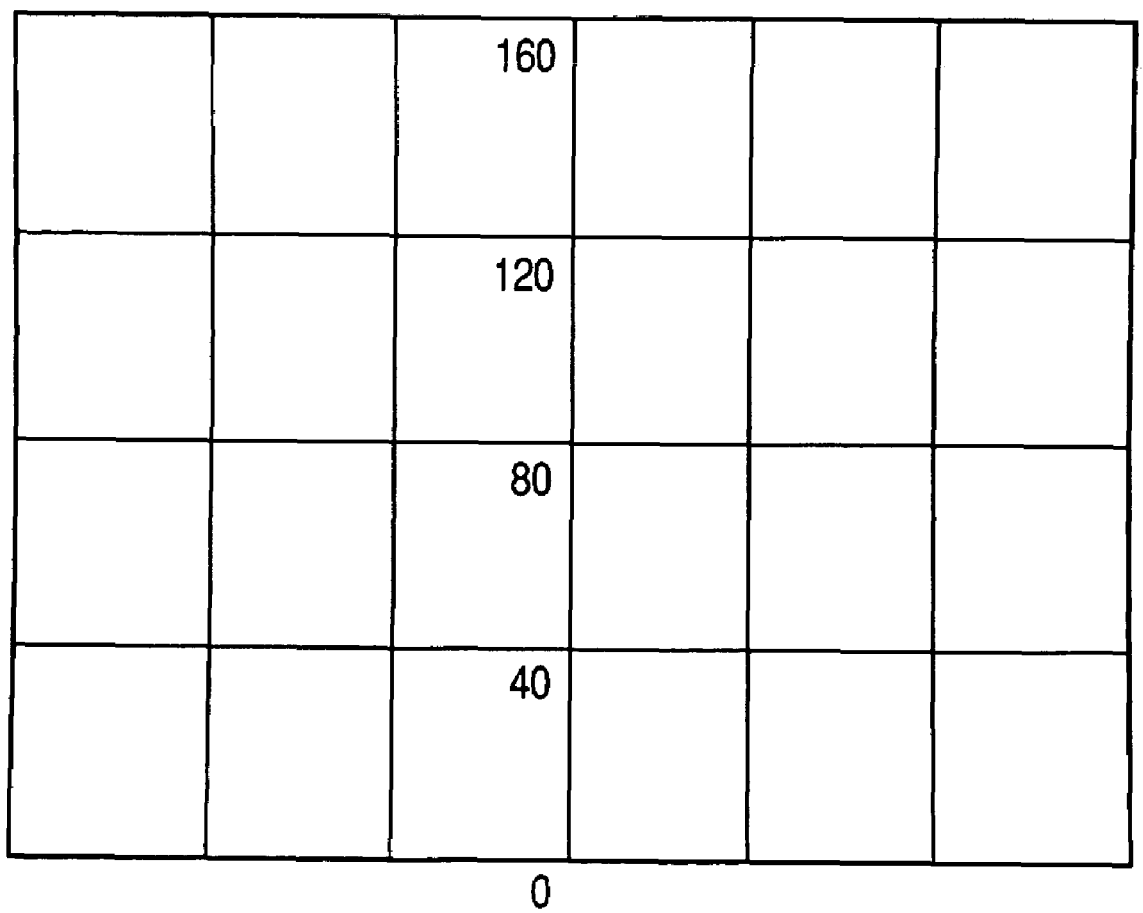
FIG. 27 is an illustration of a scanning image (grating) in Third Embodiment of the present invention.

FIG. 27 is an illustration showing the scanning image (grating) in the two-dimensional scanning apparatus according to the present embodiment. Table 7 below shows the values of the TV distortion and trapezoid distortion.

TABLE 7

|  | TV Dist. | Trapezoid Dist. |  |
|---|---|---|---|
| Upper side | 0.22 | 0.00 | (%) |
| Lower side | 0.19 | 0.00 | (%) |
| Left side | 0.42 | 0.02 | (%) |
| Right side | 0.42 | −0.02 | (%) |

By thus constructing, it is possible to well correct the TV distortion occurring due to two-dimensional scanning and the trapezoid distortion occurring due to the oblique projecting process.

The correction of chromatic aberration is difficult in an optical element formed of an optical material such as a prism as in the present embodiment. If at this time, great power is given to a refractive surface, chromatic aberration will occur greatly, and color ooze may occur to the image displayed on the screen surface 107 to thereby deteriorate the quality of image.

So, in the present embodiment, two reflecting surfaces 306b and 306c are provided on the prism 306, and the respective reflecting surfaces are made into curvature monotonously changing anamorphic surfaces to thereby correct the TV distortion and trapezoid distortion well. Particularly in each of the first reflecting surface 306b and the second reflecting surface 306c, the curvature in the horizontal scanning direction in the vertical scanning section containing the reference axis is changed from one end in the vertical scanning direction to the other end, and an end in the vertical scanning direction at which the curvature of the first reflecting surface 306b in the horizontal scanning direction is great and an end in the vertical scanning direction at which the curvature of the second reflecting surface 306c in the horizontal scanning direction is great are arranged properly on the same side, and a portion by which the deflected beam travelling toward the upper portion of the screen surface 107 is reflected is defined as the end in the vertical scanning direction at which the curvature in the horizontal scanning direction is great, and a portion by which the deflected beam travelling toward the lower portion of the screen surface 107 is reflected is defined as the end in the vertical scanning direction at which the curvature in the horizontal scanning direction is small.

In the present embodiment, as in the aforedescribed First and Second Embodiments, oblique projection in which in the vertical scanning direction, the reference ray is inclinedly incident on the screen surface is effected, and the vertical scanning direction is a first scanning direction. That is, the angle of view in the vertical scanning direction is $\theta_{d1}=20.17$ (deg.), and the angle of view in the horizontal scanning direction is $\theta_{d2}=37.80$ (deg.), and the width of the displayed image in the vertical scanning direction is Wi1=0.00 (mm), and the width thereof in the horizontal scanning direction is Wi2=118.55 (mm), and $$\frac{\theta_{d1}}{\theta_{d2}} = 0.715 \times \frac{Wi1}{Wi2},$$

and this satisfies the aforementioned conditional expression (1).

By thus setting the angle of view in the vertical scanning direction which is the first scanning direction small, the downsizing of the scanning optical system 306 is achieved and also, by setting the angle of view in the vertical scanning direction to a small ratio in contrast to the horizontal scanning direction which is a second scanning direction, the substantial focal length in the vertical scanning direction is set short to thereby facilitate the correction of the TV distortion and trapezoid distortion of the scanning image.

Also, when as in the aforedescribed First and Second Embodiments, the width of the scanning optical system 306 in the horizontal direction is defined as Dx, and the width thereof in the vertical scanning direction is defined as Dy, and the width thereof in the direction of the Z-axis perpendicular to the horizontal scanning direction and the vertical scanning direction is defined as Dz, Dx=22.58 (mm)

Dy=17.07 (mm)

Dz=21.17 (mm)

and these satisfy all of the aforementioned conditional expressions (2), (3) and (4).

Further, when the distance in the direction of the Z-axis from the deflector 305b of the deflecting means 305 which is nearest to the surface 107 to be scanned to the position of the scanning optical system 306 which is nearest to the surface to be scanned is defined as Ld, Ld=29.61 (mm)

and this satisfies the aforementioned conditional expression (5).

In the present embodiment, these conditional expressions are satisfied, whereby the two-dimensional scanning apparatus becomes very compact, and this leads to the merit that the image displaying apparatus carrying this two-dimensional scanning apparatus thereon can be downsized.

In the present embodiment, the light emission timing is changed depending on the scanning position in the horizontal scanning direction to thereby correct the deviation of the scanning position due to the resonating motion of the first deflector 305a. The correction of this light emission timing is likewise effected by each scanning line.

While in the present embodiment, the oblique projecting process is adopted in the vertical scanning direction, this is not restrictive, but for example, the oblique projecting process may be adopted in the horizontal scanning direction. In that case, if use is made of a scanning optical system including two or more non-rotation symmetrical reflecting surfaces tilted in the horizontal scanning direction, there can be obtained an effect equal to that of the present invention.

Also, in the scanning direction in which the reference ray is inclinedly incident on the screen surface by the oblique projecting process, the angles at which all deflected beams are incident on the screen surface need not be 0.00 (deg.) or greater, but even if there is, for example, a deflected beam incident at a minus angle, the effect of the present invention can be sufficiently obtained.

According to the present embodiment, there can be achieved a two-dimensional scanning apparatus which adopts the oblique projecting process and in which provision is made of at least two reflecting surfaces formed into a non-rotation symmetrical shape, and the at least two reflecting surfaces are disposed so as to fold the optical path of a deflected beam in a scanning direction in which the deflected beam is obliquely projected, whereby the TV distortion and trapezoid distortion of a scanning image can be corrected well, and a scanning type image displaying apparatus using the same.

The above-described embodiments can be arbitrarily combined together within a consistent range. Also, the optical scanning apparatus (the scanning type image displaying apparatus) according to the present embodiment can be described as follows.

The optical scanning apparatus (the scanning type image displaying apparatus) according to the present embodiment is provided with:

deflecting means for deflecting a beam from a light source; and a scanning optical system for imaging the deflected beam from the deflecting means as a spot on a surface to be scanned;

wherein the scanning optical system has a scanning mirror and folds in a first direction, and positions at which beams arriving at the same position on the surface to be scanned in a second scanning direction orthogonal to the first scanning direction are reflected by the scanning mirror are disposed on a straight line when viewed in the second scanning direction, and also optical paths after emerging from the scanning optical system are made incident on the surface to be scanned in superposed relationship with one another.

By constructing so, the beams are reflected toward a predetermined position on the screen after the positions at which the beams are reflected by the scanning mirror with respect to the direction orthogonal to the direction in which the optical path is folded by the scanning mirror are arranged on a straight line and therefore, the optical paths of the upward and downward beams behind the scanning mirror overlap each other when viewed in a horizontal cross section. Thereupon, the scanning distortion (TV distortion and trapezoid distortion) in the horizontal direction can be corrected (or the amount of distortion can be reduced).

Also, when the present embodiment is viewed from another side, the optical scanning apparatus according to the present embodiment is an optical scanning apparatus for scanning a surface to be scanned by light from a light source, provided with:

deflecting means for deflecting a beam from light source means in a first scanning direction and a second scanning direction orthogonal to the first direction; and a scanning optical system including at least one reflecting surface of a non-rotation symmetrical shape and for directing the deflected beam deflected by the deflecting means onto the surface to be scanned by the use of the at least one reflecting surface of a non-rotation symmetrical shape, wherein the principal ray of the beam incident on the center of the angle of view of the surface to be scanned is incident while being inclined with respect to the surface to be scanned in at least the first scanning direction of the first and second scanning directions.

Here, the aforementioned at least one reflecting surface of a non-rotation symmetrical shape is such that optical power on one end side along the direction of a line of intersection between a plane including an optical path of the optical paths of the principal ray which is incident on the reflecting surface and an optical path emergent from the reflecting surface and the reflecting surface and in a plane perpendicular to the line of intersection is greater than optical power on the other end side and in the plane perpendicular to the line of intersection. Optical power (which may be the inverse number of curvature, and in the case of a free curved surface, the curved surface (curved line) is the inverse number of the curvature of an approximate curved surface (curved line) in a plane perpendicular to the line of intersection at one end of the line of intersection (one end in an area wherein the light incident within the angle of view of the surface to be scanned) along the direction of the line of intersection is greater than optical power in the plane perpendicular to the line of intersection at the other end. Preferably, the incidence angle at which the light incident on the aforementioned one end side is incident on the surface to be scanned may be greater than the incidence angle at which the light incident on the aforementioned other end side is incident on the surface to be scanned.

Here, the aforementioned at least one reflecting surface of a non-rotation symmetrical shape is formed so that along the direction of a line of intersection between a plane including an optical path of the optical paths of the principal ray which is incident on the reflecting surface and an optical path emergent from the reflecting surface and the reflecting surface, optical power in a plane perpendicular to the line of intersection may gradually become great. That is, it is desirable that along the direction of the line of intersection, optical power (which may be the inverse number of curvature) in the plane perpendicular to the line of intersection be substantially monotonously increased (or monotonously decreased). Here, it is desirable that in a case where the principal ray of the beam incident on a first point in the surface to be scanned is defined as a first main line of intersection and the principal ray of the beam incident on a second point differing from the first point is defined as a second main line of intersection, and the incidence angle of the first main line of intersection onto the surface to be scanned is greater than the incidence angle of the second main line of intersection onto the surface to be scanned, optical power in the plane perpendicular to the line of intersection at a position whereat the first main line of intersection in the aforementioned at least one reflecting surface of a non-rotation symmetrical shape is reflected be greater than optical power in the plane perpendicular) to the line of intersection at a position whereat the second main line of intersection in the aforementioned at least one reflecting surface of a non-rotation symmetrical shape.

Here, it is desirable that the aforementioned at least one reflecting surface of a non-rotation symmetrical shape include two reflecting surfaces of a non-rotation symmetrical shape. Here, it is desirable that the aforementioned two reflecting surfaces of a non-rotation symmetrical shape be disposed in opposed relationship with each other. In other words, the aforementioned two reflecting surfaces of a non-rotation symmetrical shape are disposed so as to fold the principal ray.

Also, the optical scanning apparatus according to the present embodiment can be expressed as follows. The optical scanning apparatus according to the present embodiment has an optical system for two-dimensionally scanning a surface to be scanned with light from a light source, wherein when the principal ray of a beam incident on the substantial center of an angle of view in the surface to be scanned is defined as a reference axis ray, the reference axis ray is obliquely incident on the surface to be scanned, and wherein in a case where the direction of a line of intersection between a plane including the reference axis ray incident on the surface to be scanned and a normal to the surface to be scanned at the incidence position of the reference axis ray and the surface to be scanned is defined as a first direction, a direction perpendicular to the first direction in the surface to be scanned is defined as a second direction, beams incident on two different points in the surface to be scanned which differ in the coordinates of the first direction from each other and substantially coincides with each other in the coordinates of the second direction are defined as a first beam and a second beam, and the principal ray of the first beam is defined as a first principal ray and the principal ray of the second beam is defined as a second principal ray, the first principal ray emergent from the optical system and the second principal ray emergent from the optical system substantially overlap each other when viewed from the first direction.

Here, the optical system includes:

a deflecting optical system for deflecting the light from the light source; and a scanning optical system including at least one reflecting surface and for directing the light deflected by the deflecting optical system to the surface to be scanned.

Figure 29:
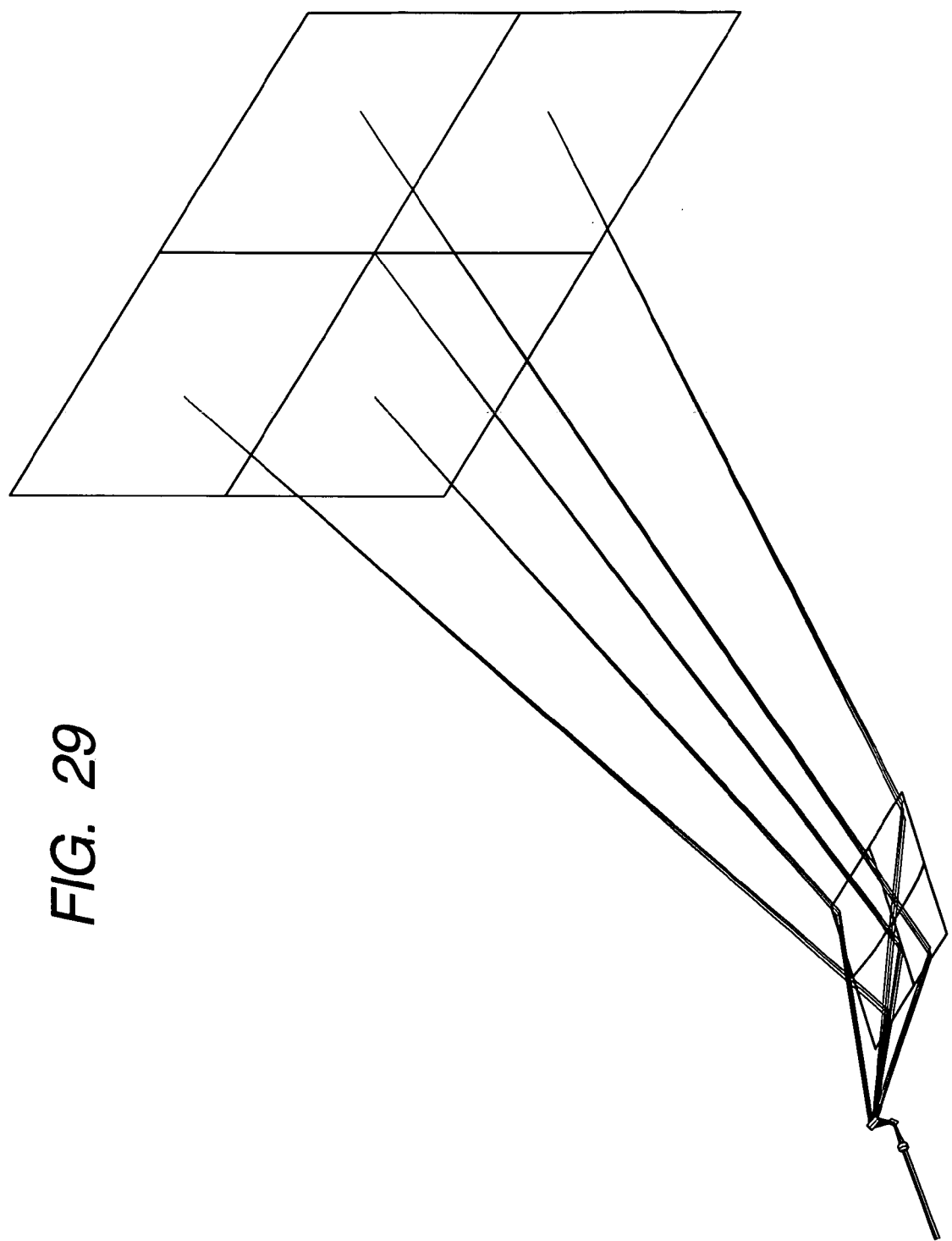
FIG. 29 is a perspective view of the essential portions of two-dimensional scanning apparatus according to the modified Embodiment of the present invention (numerical Embodiment).

Also, while the present embodiment has been described with respect to a case where the scanning optical system is comprised of two mirrors, the number of mirrors included in the scanning optical system may be one as shown in FIG. 29, or may be three or more. However, to reduce the amount of occurrence of TV distortion, etc., and yet downsize the apparatus and simplify the construction of a supporting mechanism for supporting constituents in the apparatus, it is desirable that the scanning optical system be comprised of two mirrors.

Also, as previously described, the present embodiment has been described with respect to a construction in which an image is obliquely upwardly projected (light is scanned) onto a vertically installed substantially flat surface to be scanned, but of course, this is not restrictive. If the surface to be scanned is a curved surface, design can be made such that the free curved surface shape of the scanning optical system is brought into accord with the curved surface shape of the surface to be scanned so that the TV distortion can be suppressed, whereby an image in which the amount of occurrence of the TV distortion is suppressed can also be displayed on the curved surface. Also, the surface to be scanned need not always be parallel to the vertical direction, but the surface to be scanned may be set on a ceiling or a floor surface, or may be a surface obliquely inclined with respect to the vertical direction and/or the horizontal direction.

According to the two-dimensional scanning apparatus (optical scanning apparatus) according to the present embodiment, there can be obtained the effect that the amount of occurrence of the TV distortion and the trapezoid distortion can be reduced.

This application claims priority from Japanese Patent Application No. 2004-042278 filed on Feb. 19, 2004, which is hereby incorporated by reference herein.

What is claimed is:

1. A two-dimensional scanning apparatus comprising:
   deflecting means for deflecting a beam emitted from light source means in a first scanning direction and a second scanning direction orthogonal to said first scanning direction; and
   a scanning optical system including, in order from the deflecting means, a first reflecting surface and a second reflecting surface, the first and second reflecting surfaces having rotationally asymmetrical shapes, and directing the deflected beam deflected by said deflecting means onto a surface to be scanned, said first and second reflecting surfaces being disposed so as to fold an optical path of said deflected beam in said first scanning direction;
   wherein a principal ray of a beam incident on the center of an angle of view of said surface to be scanned is inclined incident on said surface to be scanned in at least the first scanning direction of said first and second scanning directions, and
   wherein when the principal ray is set as a reference axis, said first scanning direction is in parallel with a plane containing the reference axis,
   wherein the first reflecting surface includes a first concave surface of which shape in a section in parallel with said second scanning direction is concave, and a first convex surface of which shape in a section in parallel with said second scanning direction is convex,
   wherein the second reflecting surface includes a second concave surface of which shape in a section in parallel with said second scanning direction is concave, and a second convex surface of which shape in a section in parallel with said second scanning direction is convex,
   wherein the beam emitted from the first concave surface is incident into said surface to be scanned through the second convex surface, and
   wherein the beam emitted from the first convex surface is incident into said surface to be scanned through the second concave surface.

2. A two-dimensional scanning apparatus according to claim 1, wherein the beam emitted from said light source means is made obliquely incident from said first scanning direction onto a deflecting surface of said deflecting means.

3. A two-dimensional scanning apparatus according to claim 2, wherein when in said first scanning direction, it is viewed in the optical path from said deflecting means to said scanning optical system, the beam emitted from said light source means is made obliquely incident from a side on which a deflected beam having a small incidence angle onto the surface to be scanned passes onto the deflecting surface of said deflecting means.

4. A two-dimensional scanning apparatus according to claim 1, wherein said scanning optical system has negative power as a whole, and a convergent beam having a natural converging point between said deflecting means and said surface to be scanned is condensed near said surface to be scanned by said scanning optical system.

5. A two-dimensional scanning apparatus according to claim 1, wherein a pupil of said scanning optical system is disposed near said deflecting means to thereby form a virtual image of said pupil.

6. A two-dimensional scanning apparatus according to claim 1, wherein said scanning optical system has a prism including at least two reflecting surfaces of a non-rotation symmetrical shape.

7. A two-dimensional scanning apparatus according to claim 1, wherein when an angle of view in said first scanning direction is defined as θd1, and an angle of view in said second scanning direction is defined as θd2, and a width of the beam incident on said surface to be scanned in said first scanning direction is defined as Wi1, and the width thereof in said second scanning direction is defined as Wi2, a condition that $$0.1 \times \frac{Wi1}{Wi2} < \frac{\theta d1}{\theta d2} < 0.9 \times \frac{Wi1}{Wi2}$$

be satisfied.

8. A two-dimensional scanning apparatus according to claim 1, wherein when a width of said scanning optical system in said second scanning direction is defined as Dx, and the width thereof in said first scanning direction is defined as Dy, and the width thereof in the direction of the Z-axis perpendicular to a horizontal scanning direction and a vertical scanning direction is defined as Dz, conditions that Dx≦40 (mm)

Dy≦30 (mm)

Dz≦35 (mm)

be satisfied.

9. A two-dimensional scanning apparatus according to claim 1, wherein said light source means emits a plurality of beams of different wavelengths.

10. A two-dimensional scanning apparatus according to claim 1, wherein said light source means has a light emitting element capable of effecting light modulation.

11. A scanning type image displaying apparatus comprising:
    light source means; and
    a two-dimensional scanning apparatus according to claim 1 for forming an image on said surface to be scanned by the use of light from said light source means.

12. A two-dimensional scanning apparatus in accordance with claim 1, wherein a beam, of which incident angle with respect to said surface to be scanned is larger than that of the principal ray with respect to said surface to be scanned, is incident into said surface to be scanned through the first convex surface and the second concave surface, and
    a beam, of which incident angle with respect to said surface to be scanned is smaller than that of the principal ray with respect to said surface to be scanned, is incident into said surface to be scanned through the first concave surface and the second convex surface.

* * * * *